United States Patent
Heilmann et al.

(10) Patent No.: US 7,440,558 B2
(45) Date of Patent: *Oct. 21, 2008

(54) TELEPHONY SECURITY SYSTEM

(75) Inventors: Craig Heilmann, San Antonio, TX (US); Mark D. Collier, Helotes, TX (US); Doug Conyers, San Antonio, TX (US); Keith S. Pickens, San Antonio, TX (US); David Buntin, San Antonio, TX (US); Greg Schmid, San Antonio, TX (US); Stephen Faustino, San Antonio, TX (US); Todd Beebe, Katy, TX (US); Michael Brysch, San Antonio, TX (US); Robert R. Applonie, San Antonio, TX (US)

(73) Assignee: SecureLogix Corporation, San Antonio, TX (US)

( * ) Notice: Subject to any disclaimer, the term of this patent is extended or adjusted under 35 U.S.C. 154(b) by 391 days.

This patent is subject to a terminal disclaimer.

(21) Appl. No.: 10/870,395

(22) Filed: Jun. 17, 2004

(65) Prior Publication Data

US 2004/0234056 A1 Nov. 25, 2004

Related U.S. Application Data

(63) Continuation of application No. 09/907,089, filed on Jul. 17, 2001, now Pat. No. 6,760,420.

(51) Int. Cl.
*H04M 1/66* (2006.01)
*H04M 3/22* (2006.01)
*H04M 15/00* (2006.01)

(52) U.S. Cl. .................. 379/189; 379/32.04; 379/93.02; 379/114.14; 379/196; 379/198; 379/200

(58) Field of Classification Search ............. 379/93.03, 379/93.09, 93.11, 114.14, 145, 189, 196, 379/198, 200, 93.02, 188, 197, 199, 32.04
See application file for complete search history.

(56) References Cited

U.S. PATENT DOCUMENTS 4,332,982 A 6/1982 Thomas (Continued)

FOREIGN PATENT DOCUMENTS

CA 2094412 6/1994

(Continued)

OTHER PUBLICATIONS

"Penetration Analysis Test", Technologic, Inc. Services, http://www.tlogic.com/penetration.html.

(Continued)

*Primary Examiner*—Harry S Hong
(74) *Attorney, Agent, or Firm*—Winstead PC

(57) ABSTRACT

A system and method of telephony resource management and security for monitoring and/or controlling and logging access between an enterprise's end-user stations and their respective circuits into the public switched telephone network (PSTN). One or more rules are defined which specify actions to be taken based upon at least one attribute of a call. Calls are detected and sensed to determine attributes associated with each call. Actions are then performed on selected calls based upon their attributes in accordance with the defined rules.

30 Claims, 37 Drawing Sheets

U.S. PATENT DOCUMENTS

| | | | |
|---|---|---|---|
| 4,639,557 A | 1/1987 | Butler et al. | |
| 4,653,085 A | 3/1987 | Chan et al. | |
| 4,783,796 A | 11/1988 | Ladd | |
| 4,866,762 A * | 9/1989 | Pintar | 379/200 |
| 4,866,773 A | 9/1989 | Lubarsky | |
| 4,876,717 A | 10/1989 | Barron et al. | |
| 4,905,281 A | 2/1990 | Surjaatmadja et al. | |
| 4,965,459 A * | 10/1990 | Murray | 379/189 |
| 5,003,599 A | 3/1991 | Landry | |
| 5,018,190 A | 5/1991 | Walker et al. | |
| 5,084,891 A | 1/1992 | Ariyavistakul et al. | |
| 5,161,191 A | 11/1992 | Gupta et al. | |
| 5,276,529 A | 1/1994 | Williams | |
| 5,276,687 A | 1/1994 | Miyamoto | |
| 5,276,731 A | 1/1994 | Arbel et al. | |
| 5,311,593 A | 5/1994 | Carmi | |
| 5,345,595 A | 9/1994 | Johnson et al. | |
| 5,351,287 A | 9/1994 | Bhattacharyya et al. | |
| 5,436,957 A | 7/1995 | McConnell | |
| 5,490,212 A | 2/1996 | Lautenschlager | |
| 5,495,521 A | 2/1996 | Rangachar | |
| 5,510,777 A | 4/1996 | Pilc et al. | |
| 5,535,265 A | 7/1996 | Suwandhaputra | |
| 5,557,742 A | 9/1996 | Smaha et al. | |
| 5,581,228 A | 12/1996 | Cadieux et al. | |
| 5,590,195 A | 12/1996 | Ryan | |
| 5,606,604 A | 2/1997 | Rosenblatt et al. | |
| 5,623,601 A | 4/1997 | Vu | |
| 5,627,886 A | 5/1997 | Bowman | |
| 5,684,957 A | 11/1997 | Kondo et al. | |
| 5,706,338 A | 1/1998 | Relyea et al. | |
| 5,745,555 A | 4/1998 | Mark | |
| 5,802,157 A | 9/1998 | Clarke et al. | |
| 5,805,686 A | 9/1998 | Moller et al. | |
| 5,805,803 A | 9/1998 | Birrell et al. | |
| 5,812,763 A | 9/1998 | Teng | |
| 5,826,014 A | 10/1998 | Coley et al. | |
| 5,838,682 A | 11/1998 | Dekelbaum et al. | |
| 5,854,889 A | 12/1998 | Liese et al. | |
| 5,864,613 A | 1/1999 | Flood | |
| 5,864,666 A | 1/1999 | Shrader | |
| 5,892,903 A | 4/1999 | Klaus | |
| 5,898,830 A | 4/1999 | Wesinger, Jr. et al. | |
| 5,907,602 A | 5/1999 | Peel et al. | |
| 5,918,019 A | 6/1999 | Valencia | |
| 5,923,849 A | 7/1999 | Venkatraman | |
| 5,926,533 A | 7/1999 | Gainsboro | |
| 5,931,946 A | 8/1999 | Terada et al. | |
| 5,944,823 A | 8/1999 | Jade et al. | |
| 5,946,386 A | 8/1999 | Rogers et al. | |
| 5,949,864 A | 9/1999 | Cox | |
| 5,950,195 A | 9/1999 | Stockwell et al. | |
| 5,960,177 A | 9/1999 | Tanno | |
| 5,970,095 A | 10/1999 | Hauris et al. | |
| 6,021,324 A | 2/2000 | Sizer, II et al. | |
| 6,061,798 A | 5/2000 | Coley et al. | |
| 6,098,172 A | 8/2000 | Coss et al. | |
| 6,134,310 A | 10/2000 | Swan et al. | |
| 6,154,775 A | 11/2000 | Coss et al. | |
| 6,226,372 B1 | 5/2001 | Beebe et al. | |
| 6,226,751 B1 | 5/2001 | Arrow et al. | |
| 6,249,575 B1 * | 6/2001 | Heilmann et al. | 379/189 |
| 6,320,948 B1 | 11/2001 | Heilmann et al. | |
| 6,760,420 B2 * | 7/2004 | Heilmann et al. | 379/189 |

FOREIGN PATENT DOCUMENTS

| | | |
|---|---|---|
| CA | 2221365 | 11/1998 |
| DE | 10048553 | 4/2002 |
| DE | 10048609 | 5/2002 |
| WO | WO-96/22000 | 7/1996 |
| WO | WO-98/17072 | 4/1998 |
| WO | WO-98/53635 | 11/1998 |

OTHER PUBLICATIONS

"External Penetration Tests", http://www.m-tech.ab.ca/security/penetration.

"SecMOD ©: A Security Risk Assessment Model", http://www.m-tech.ab.ca/products/secmod/.

"Introducing PhoneSweep™", Sandstorm Enterprises, Inc., http://www.sandstorm.net/phonesweep.

"Penetration Test", http://www.bruck-inc.com/html/security/pentesting.htm.

Babylon Standard Maximum Security for All ISDN Communications, Biodata, 4 pages.

Newton, Harry; "The Official Dictionary of Telecommunications, Networking and the Internet", Feb. 2001, pp. 751-752, 759, & 718.

* cited by examiner

308

| KEYWORD GROUPS | ELEMENTS | COMMENT |
|---|---|---|
| CONFIDENTIAL KEYWORD | CONFIDENTIAL SECRET PASSWORD PROPRIETARY CLASSIFIED | SPEECH DIGITAL DATA SEQUENCES REFERING TO OR INDICATING CONFIDENTIAL ISSUES |
| PROFANITY KEYWORD | #&!!@ !@#% %$&* | SPEECH DIGITAL DATA SEQUENCES REFERING TO OR INDICATING PROFANITY |
| VOICE KEYWORD | CONFIDENTIAL KEYWORD PROFANITY KEYWORD | SPEECH DIGITAL DATA SEQUENCES |
| FAX KEYWORD | CONFIDENTIAL SECRET TOP SECRET PROPRIETARY CLASSIFIED ORION GREENFLY IMAGE X | DIGITAL DATA SEQUENCES REFERING TO OR INDICATING CONFIDENTIAL MATERIAL |
| INTERNET KEYWORD | NASDAQ NYSE INDEX TRADE | UNAUTHORIZED URL, METATAG AND WEB PAGE CONTENT DIGITAL DATA SEQUENCES INDICATING NON-BUSINESS USE OF RESOURCES |
| ASCII KEYWORD | ROOT ADMINISTRATOR | UNAUTHORIZED ASCII DIGITAL DATA SEQUENCES INDICATING POSSIBLE HACKING ATTEMPT |
| MODEM KEYWORD | INTERNET KEYWORD ASCII KEYWORD | DATA DIGITAL DATA SEQUENCES INDICATING UNAUTHORIZED MODEM ACTIVITY |
| ALL KEYWORD | VOICE KEYWORD FAX KEYWORD MODEM KEYWORD | ALL DIGITAL DATA SEQUENCES IN SPEECH AND DATA KEYWORD LIBRARIES |

| EXTENSION GROUPS | ELEMENTS | COMMENT |
|---|---|---|
| DIAL-UP SYSTEMS | 210-402-7007<br>210-402-7008<br>210-402-7009 | PBX, HVAC, AND ROUTER MODEMS FOR REMOTE MAINTENANCE AND MONITORING |
| MAINTENANCE DIAL-UP | 512-402-3946<br>892-458-9194<br>210-435-7659 | APPROVED DIAL-UP SYSTEMS MODEM MAINTENANCE/ MONITOR CALL SOURCE |
| ENGINEERING MODEM | 210-402-7004<br>210-402-7005 | APPROVED ENGINEERING DEPT. MODEMS |
| ENGINEERING DIAL-UP | 210-402-8802<br>210-402-0917 | APPROVED, NON-ENTERPRISE CALL SOURCE & DESTINATION NUMBERS FOR ENG. MODEMS |
| VIDEO | 210-402-8001 | VTC LINE |
| SALES | 210-402-62XX - 65XX | SALES VOICE LINES |
| ENGINEERING | 210-402-66XX | ENGINEERING VOICE LINES |
| CUSTOMER SERVICE | 210-402-67XX | CUSTOMER SERVICE VOICE LINES |
| ADMINISTRATION | 210-402-68XX | ADMINISTRATION VOICE LINES |
| VOICE-ONLY | SALES<br>ENGINEERING<br>CUSTOMER SERVICE<br>ADMINISTRATION | ALL VOICE-ONLY EXTENSIONS IN THE SAN ANTONIO FACILITY |
| FAX-ONLY | 210-402-7000<br>210-402-7001<br>210-402-7002 | ALL FAX-ONLY EXTENSIONS IN THE SAN ANTONIO FACILITY |
| BRANCH OFFICES AUTH. MODEM | (ELEMENTS NOT SHOWN) | APPROVED MODEM EXTENSIONS AT BRANCH OFFICES |
| BRANCH OFFICES VOICE-ONLY | (ELEMENTS NOT SHOWN) | VOICE-ONLY EXTENSIONS AT BRANCH OFFICES |
| BRANCH OFFICES FAX-ONLY | (ELEMENTS NOT SHOWN) | FAX-ONLY EXTENSIONS AT BRANCH OFFICES |
| AUTHORIZED MODEM | DIAL-UP SYSTEMS<br>ENGINEERING MODEM | APPROVED AND PROPERLY CONFIGURED MODEMS |
| AUTHORIZED DIAL-UP | MAINTENANCE DIAL-UP<br>ENGINEERING DIAL-UP<br>RESEARCH DIAL-UP | APPROVED NON-ENTERPRISE MODEM CALL SOURCE/DESTINATION |

| | | |
|---|---|---|
| MODEM CONTENT VIOLATION | 210-402-7006<br>210-402-7012<br>210-402-7013 | MODEM EXTENSIONS WITH KEYWORDS IN CALL CONTENT - NO CALLS ALLOWED |
| VOICE CONTENT VIOLATION | 210-402-6602<br>210-402-6749 | VOICE EXTENSIONS WITH KEYWORDS IN CALL CONTENT - NO CALLS ALLOWED |
| FAX CONTENT VIOLATION | 210-402-7004 | FAX EXTENSIONS WITH KEYWORDS IN CALL CONTENT - NO CALLS ALLOWED |
| UNAUTHORIZED MODEM | 210-402-6612<br>210-402-6737<br>210-402-6782<br>210-402-6845 | UNKNOWN, UNAPPROVED MODEMS & MODEMS THAT HAVE VIOLATED SOURCE/DESTINATION POLICY - NO CALLS ALLOWED |

| SRB RULE | SOURCE | DESTINATION | CALL TYPE | CALL CONTENT | ACTION | TRACK | DATE | TIME | INSTALL ON | COMMENT |
|---|---|---|---|---|---|---|---|---|---|---|
| 1 | MAINT. DIAL-UP | DIAL-UP SYSTEMS | MODEM | MODEM KEYWORD | ALLOW | RECORD, AUTHENTICATE, MONITOR CONT., EMAIL, LOG | ANY | ANY | ALL | ALLOW, BUT AUTHENTICATE ACCESS FOR INBOUND CALL TO DIAL-UP SYSTEMS MODEM. |
| 2 | !MAINT. DIAL-UP | DIAL-UP SYSTEMS | MODEM | - | DENY | EMAIL, PAGE, LOG | ANY | ANY | ALL | DENY INBOUND MODEM CALL FROM UNAUTHORIZED SOURCE. POSSIBLE HACKING ATTEMPT. |
| 3 | DIAL-UP SYSTEMS | ANY | MODEM | - | DENY | EMAIL, PAGE, LOG | ANY | ANY | ALL | DENY OUTBOUND USE OF DIAL-UP SYSTEM MODEM. |
| 4 | VOICE-ONLY, FAX-ONLY, AUTH. MODEM | BRANCH OFFICES VOICE-ONLY, BRANCH OFFICES FAX-ONLY, BRANCH OFFICES AUTH. MODEM | VOICE, FAX, MODEM | - | ALLOW | VPSTN MODE, LOG | ANY | ANY | ALL | ALLOW CALL AND USE VPSTN FOR OUTBOUND VOICE, FAX AND MODEM CALLS TO BRANCH OFFICES. |

| | | | | | | | |
|---|---|---|---|---|---|---|---|
| 5 | BRANCH OFFICES VOICE-ONLY, BRANCH OFFICES FAX-ONLY, BRANCH OFFICES AUTH. MODEM | VOICE-ONLY, FAX-ONLY, AUTH. MODEM | VOICE, FAX, MODEM | - | ALLOW | VPSTN MODE, MONITOR PATTERN, LOG | ANY | ANY | ALL | ALLOW CALL AND USE VPSTN FOR INBOUND VOICE, FAX AND MODEM CALLS TO BRANCH OFFICES. |
| 6 | ENG. MODEM | !ENG. DIAL-UP | MODEM | - | DENY | ADJUST POLICY, EMAIL, PAGE, LOG | ANY | ANY | ALL | DENY OUTBOUND MODEM CALL TO UNAUTHORIZED DESTINATION. |
| 7 | ENG. MODEM | ENG. DIAL-UP | MODEM | MODEM KEYWORD | ALLOW | RECORD, MONITOR CONT., LOG | ANY | ANY | ALL | ALLOW OUTBOUND MODEM CALL TO AUTHORIZED DESTINATION. |
| 8 | AUTH. DIAL-UP | AUTH. MODEM | MODEM | MODEM KEYWORD | ALLOW | RECORD, MONITOR CONT., LOG | ANY | ANY | ALL | ALLOW INBOUND MODEM FROM AUTHORIZED SOURCE. |

FIG. 7B

| | | | | | | | |
|---|---|---|---|---|---|---|---|
| 9 | ANY | ! AUTH. MODEM | MODEM | - | DENY | EMAIL, PAGE, LOG | ANY | ANY | ALL | DENY INBOUND CALL TO UNAUTHORIZED MODEM. |
| 10 | ! AUTH. MODEM | ANY | MODEM | - | DENY | EMAIL, PAGE, LOG | ANY | ANY | ALL | DENY OUTBOUND CALL FROM UNAUTHORIZED MODEM. |
| 11 | FAX-ONLY | ANY | FAX | FAX KEYWORD | ALLOW | RECORD, MONITOR CONT., LOG | ANY | ANY | ALL | ALLOW OUTBOUND FAX CALL FROM AUTHORIZED FAX EXTENSION. |
| 12 | ANY | FAX-ONLY | FAX | FAX KEYWORD | ALLOW | RECORD, MONITOR CONT., LOG | ANY | ANY | ALL | ALLOW INBOUND FAX CALL TO AUTHORIZED FAX EXTENSION. |
| 13 | ANY | CUSTOMER SERVICE | BUSY, UNAN- SWERED | | . | MONITOR PATTERN, REPORT WEEKLY, LOG | ANY | ANY | ALL | LOG INBOUND BUSY AND UNANSWERED CALLS. GENERATE SCHEDULED REPORT WEEKLY. POSSIBLE RESOURCE/ PERSONNEL MANAGEMENT ISSUE. |

FIG. 7C

| | | | | | | | |
|---|---|---|---|---|---|---|---|
| 14 | ANY | CUSTOMER SERVICE | VOICE | PROFANITY KEYWORD | ALLOW | RECORD, MONITOR CONT., LOG | ANY ANY ANY ALL | ALLOW AND RECORD INBOUND CUST. SERVICE CALL. |
| 15 | CUSTOMER SERVICE | ANY | VOICE | PROFANITY KEYWORD | ALLOW | RECORD, MONITOR CONT., LOG | ANY ANY ANY ALL | ALLOW AND RECORD OUTBOUND CUST. SERVICE CALL. |
| 16 | ANY | VOICE-ONLY | VOICE | - | ALLOW | LOG | ANY ANY ANY ALL | ALLOW INBOUND VOICE CALL TO VOICE-ONLY EXTENSION. |
| 17 | VOICE-ONLY | ANY | VOICE | - | ALLOW | LOG | ANY ANY ANY ALL | ALLOW OUTBOUND VOICE CALL FROM VOICE-ONLY EXTENSION. |
| 18 | FAX-ONLY | ANY | !FAX | - | DENY | EMAIL, LOG | ANY ANY ANY ALL | DENY OUTBOUND NON-FAX CALL ON FAX-ONLY EXTENSION. |
| 19 | ANY | VOICE-ONLY | !VOICE | - | DENY | EMAIL, LOG | ANY ANY ANY ALL | DENY INBOUND NON-VOICE CALL ON VOICE EXTENSION. POTENTIAL HACKING ATTEMPT. |
| 20 | ANY | ANY | ANY | - | DENY | EMAIL, LOG | ANY ANY ANY ALL | DENY AND LOG ALL OTHER CALLS |

FIG. 7D

| RRP RULE | CURRENT GROUP | ADJ. POL. ATTRIBUTE CAT. / ATTRIBUTE | TA ATTEMPT | TA RESULT | ACTION | TRACK | ADJUST POLICY? | MOVE TO | INSTALL ON | COMMENT |
|---|---|---|---|---|---|---|---|---|---|---|
| 1 | MAINT. DIAL-UP | N/A | AUTHENTI-CATE | SUCCESS | ALLOW | EMAIL, LOG | NO | N/A | ALL | ALLOW AUTHENTICATED SOURCE TO ACCESS EXTENSION IN MAINT. DIAL-UP GROUP. |
| | | | | FAILED | DENY | PAGE, LOG | NO | N/A | | DENY UNAUTHENTICATED SOURCE ACCESS TO EXTENSION IN MAINT. DIAL-UP GROUP. POSSIBLE HACKING ATTEMPT. |
| 2 | DIAL-UP SYSTEMS | N/A | MODEM KEYWORD | FAILED | ALLOW | LOG | NO | N/A | ALL | NO MODEM KEYWORD ON DIAL-UP SYSTEMS EXTENSION. |
| | | | | SUCCESS | DENY | EMAIL, PAGE, LOG | YES | MODEM CONTENT VIOLATION | | MODEM KEYWORD ON DIAL-UP SYSTEMS EXTENSION. EXTENSION CALL DENIED. EXTENSION MOVED TO MODEM CONTENT VIOLATION GROUP. |

| | | DESTINATION / | | | | | |
|---|---|---|---|---|---|---|---|
| 3 | ENG. MODEM | ! ENG. DIAL-UP | N/A | N/A | - | EMAIL, LOG | YES | UNAUTH. MODEM | ALL | UNAUTHORIZED DESTINATION FROM ENG.MODEM GROUP EXT. EXTENSION MOVED TO UNAUTHORIZED MODEM GROUP. |
| 4 | AUTH. MODEM | N/A | MODEM KEYWORD | FAILED | ALLOW | LOG | NO | N/A | | NO MODEM KEYWORD ON AUTHORIZED MODEM EXTENSION. |
| | | | | SUCCESS | DENY | EMAIL, PAGE, LOG | YES | MODEM CONTENT VIOLATION | ALL | MODEM KEYWORD ON AUTHORIZED MODEM EXTENSION. CALL DENIED. EXTENSION MOVED TO MODEM CONTENT VIOLATION GROUP. |
| 5 | FAX-ONLY | N/A | FAX KEYWORD | FAILED | ALLOW | LOG | NO | N/A | | NO FAX KEYWORD ON FAX-ONLY EXTENSION. |
| | | | | SUCCESS | DENY | EMAIL, PAGE, LOG | YES | FAX CONTENT VIOLATION | ALL | FAX KEYWORD ON FAX-ONLY EXTENSION. CALL DENIED. EXTENSION MOVED TO FAX CONTENT VIOLATION GROUP. |

FIG. 8B

| # | | | | | | | | | Description |
|---|---|---|---|---|---|---|---|---|---|
| 6 | CUSTOMER SERVICE | ANY / ANY | PROFANITY KEYWORD | FAILED | ALLOW | LOG | NO | N/A | ALL | NO PROFANITY KEYWORD ON CUSTOMER SERVICE EXTENSION. |
| | | | | SUCCESS | ALLOW | REDIRECT THROUGH LISTEN. STATION, EMAIL, PAGE, LOG | NO | N/A | | PROFANITY KEYWORD IDENTIFIED ON CUSTOMER SERVICE EXTENSION. IN-PROGRESS COPY REDIRECTED THROUGH LISTENING STATION. |
| 7 | ANY | ANY / ANY | ANY | FAILED | DENY | EMAIL, LOG | NO | N/A | ALL | DENY AND LOG ALL OTHER CALLS. |
| | | | | SUCCESS | DENY | EMAIL, LOG | NO | N/A | | DENY AND LOG ALL OTHER CALLS. |

FIG. 8C

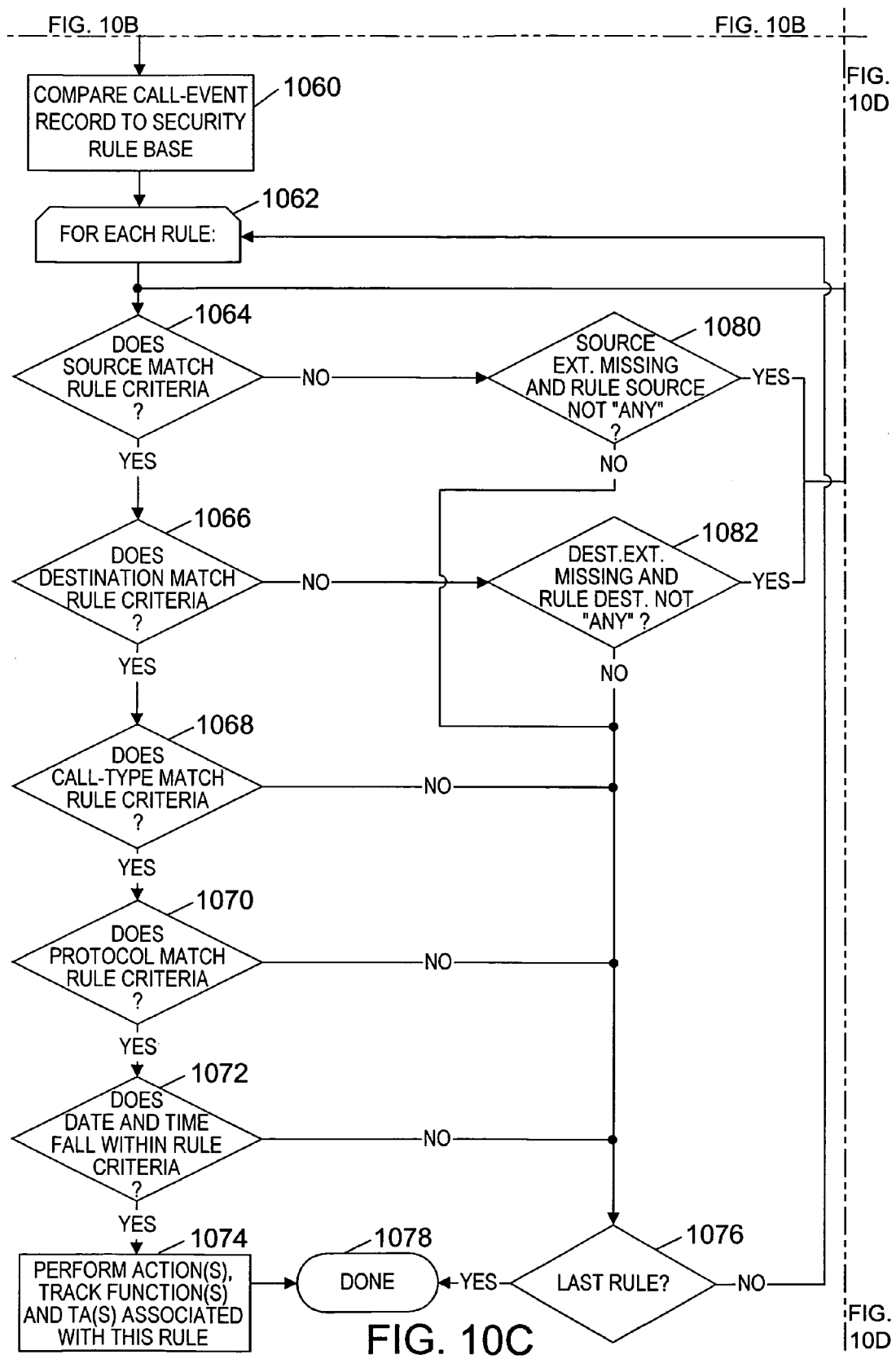

| SRB RULE | CLASS | SOURCE | DESTINATION | CALL TYPE | CALL CONTENT | ACTION | TRACK | DATE | TIME | INSTALL ON | COMMENT |
|---|---|---|---|---|---|---|---|---|---|---|---|
| 1 | R | MAINT. DIAL-UP | DIAL-UP SYSTEMS | MODEM | MODEM KEYWORD | ALLOW | RECORD, AUTHENTICATE, MONITOR CONT., EMAIL, LOG | ANY | ANY | ALL | ALLOW, BUT AUTHENTICATE ACCESS FOR INBOUND CALL TO DIAL-UP SYSTEMS MODEM. |
| 2 | R | !MAINT. DIAL-UP | DIAL-UP SYSTEMS | MODEM | - | DENY | ROUTE, EMAIL(F), PAGE(F), LOG | ANY | ANY | ALL | DENY INBOUND MODEM CALL FROM UNAUTHORIZED SOURCE. POSSIBLE HACKING ATTEMPT. |
| 3 | R | DIAL-UP SYSTEMS | ANY | MODEM | - | DENY | ROUTE, EMAIL(F), PAGE(F), LOG | ANY | ANY | ALL | DENY OUTBOUND USE OF DIAL-UP SYSTEM MODEM. |

FIG. 14A

| | | | | | | | | |
|---|---|---|---|---|---|---|---|---|
| 4 | R | VOICE-ONLY, FAX-ONLY, AUTH. MODEM | BRANCH OFFICES VOICE-ONLY, BRANCH OFFICES FAX-ONLY, BRANCH OFFICES AUTH. MODEM | VOICE, FAX, MODEM | - | ALLOW | VPSTN MODE, LOG | ANY | ANY | ALL | ALLOW CALL AND USE VPSTN FOR OUTBOUND VOICE, FAX AND MODEM CALLS TO BRANCH OFFICES. |
| 5 | R | BRANCH OFFICES VOICE-ONLY, BRANCH OFFICES FAX-ONLY, BRANCH OFFICES AUTH. MODEM | VOICE-ONLY, FAX-ONLY, AUTH. MODEM | VOICE, FAX, MODEM | - | ALLOW | VPSTN MODE, MONITOR PATTERN, LOG | ANY | ANY | ALL | ALLOW CALL AND USE VPSTN FOR INBOUND VOICE, FAX AND MODEM CALLS TO BRANCH OFFICES. |
| 6 | R | ENG. MODEM | ! ENG. DIAL-UP | MODEM | - | DENY | ADJUST POLICY, EMAIL, PAGE, LOG | ANY | ANY | ALL | DENY OUTBOUND MODEM CALL TO UNAUTHORIZED DESTINATION. |

| | | | | | | | | | |
|---|---|---|---|---|---|---|---|---|---|
| 7 | R | ENG. MODEM | ENG. DIAL-UP | MODEM | MODEM KEYWORD | ALLOW | RECORD, MONITOR CONT., LOG | ANY | ANY | ALL | ALLOW OUTBOUND MODEM CALL TO AUTHORIZED DESTINATION. |
| 8 | R | AUTH. DIAL-UP | AUTH. MODEM | MODEM | MODEM KEYWORD | ALLOW | RECORD, MONITOR CONT., LOG | ANY | ANY | ALL | ALLOW INBOUND MODEM FROM AUTHORIZED SOURCE. |
| 9 | R | ANY | !AUTH. MODEM | MODEM | - | DENY | ROUTE, EMAIL(F), PAGE(F), LOG | ANY | ANY | ALL | DENY INBOUND CALL TO UNAUTHORIZED MODEM. |
| 10 | R | !AUTH. MODEM | ANY | MODEM | - | DENY | ROUTE, EMAIL(F), PAGE(F), LOG | ANY | ANY | ALL | DENY OUTBOUND CALL FROM UNAUTHORIZED MODEM. |
| 11 | R | FAX-ONLY | ANY | FAX | FAX KEYWORD | ALLOW | RECORD, MONITOR CONT., LOG | ANY | ANY | ALL | ALLOW OUTBOUND FAX CALL FROM AUTHORIZED FAX EXTENSION. |
| 12 | R | ANY | FAX-ONLY | FAX | FAX KEYWORD | ALLOW | RECORD, MONITOR CONT., LOG | ANY | ANY | ALL | ALLOW INBOUND FAX CALL TO AUTHORIZED FAX EXTENSION. |

FIG. 14C

| | | | | | | | | |
|---|---|---|---|---|---|---|---|---|
| 13 | O | ANY | CUSTOMER SERVICE | BUSY, UNAN-SWERED | - | - | MONITOR PATTERN, REPORT WEEKLY, LOG | ANY | ANY | ALL | LOG INBOUND BUSY AND UNANSWERED CALLS. GENERATE SCHEDULED REPORT WEEKLY. POSSIBLE RESOURCE/ PERSONNEL MANAGEMENT ISSUE. |
| 14 | O | ANY | CUSTOMER SERVICE | VOICE | PROFAN-ITY KEYWORD | ALLOW | RECORD, MONITOR CONT., LOG | ANY | ANY | ALL | ALLOW AND RECORD INBOUND CUST. SERVICE CALL. |
| 15 | O | CUSTOMER SERVICE | ANY | VOICE | PROFAN-ITY KEYWORD | ALLOW | RECORD, MONITOR CONT., LOG | ANY | ANY | ALL | ALLOW AND RECORD OUTBOUND CUST. SERVICE CALL. |
| 16 | O | ANY | VOICE-ONLY | VOICE | - | ALLOW | LOG | ANY | ANY | ALL | ALLOW INBOUND VOICE CALL TO VOICE-ONLY EXTENSION. |

| | | | | | | | | | | | |
|---|---|---|---|---|---|---|---|---|---|---|---|
| 17 | O | VOICE-ONLY | ANY | VOICE | - | ALLOW | LOG | ANY | ANY | ALL | ALLOW OUTBOUND VOICE CALL FROM VOICE-ONLY EXTENSION. |
| 18 | R | FAX-ONLY | ANY | !FAX | - | DENY | ROUTE, EMAIL(F), PAGE(F), LOG | ANY | ANY | ALL | DENY OUTBOUND NON-FAX CALL ON FAX-ONLY EXTENSION. |
| 19 | R | ANY | VOICE-ONLY | !VOICE | - | DENY | ROUTE, EMAIL(F), PAGE(F), LOG | ANY | ANY | ALL | DENY INBOUND NON-VOICE CALL ON VOICE EXTENSION. POTENTIAL HACKING ATTEMPT. |
| 20 | R | ANY | ANY | ANY | - | DENY | ROUTE, EMAIL(F), LOG | ANY | ANY | ALL | DENY AND LOG ALL OTHER CALLS |

FIG. 14E

TELEPHONY SECURITY SYSTEM

CROSS-REFERENCE TO RELATED APPLICATION

This application is a continuation of U.S. patent application Ser. No. 09/907,089 entitled TELEPHONY SECURITY SYSTEM filed Jul. 17, 2001, now U.S. Pat. No. 6,760,420 assigned to the assignee of the present application and incorporated by reference herein.

TECHNICAL FIELD

The invention relates generally to telecommunications monitoring and/or access control systems and particularly to a telephony resource and security management system for controlling and logging access between end-user stations and their respective circuits into the public switched telephone network (PSTN).

BACKGROUND

"Policy-based security management" refers to the application of a governing set of rules at strategically located points (chokepoints) for the purpose of enforcing security boundaries between two or more networks, such that only those events meeting certain criteria may pass between them, while all other events are denied passage. For data network operations, this filtering process selectively discards packets in order to control access to the network, or to resources such as files and devices. Variations and improvements of this basic theme have resulted in devices known as firewalls today—network components that provide a security barrier between networks or network segments. Much like a guard at a checkpoint, the firewall strictly enforces rules designated within an established policy for what shall pass the firewall on a case-by-case basis. The policy may alternatively designate that other actions may apply as well, such as logging the event and/or sending an urgent electronic mail message notifying appropriate personnel of the event.

Security professionals consider firewalls to be essential in the protection of an enterprise's private data network or virtual private data network from access to the enterprise's computers by unauthorized personnel or "hackers." Like any security measure, however, firewalls are not foolproof. Firewalls provide no protection for traffic routed around them, as is often the case when modems are used while connected to internal data networks; i.e., circumvention of the firewall through unprotected channels, such as through telephone lines or extensions normally used for voice or fax. Clearly, there is a need for a telephony security system and method for controlling access to an enterprise's data network through telephony resources that otherwise cannot be sufficiently protected by traditional firewall technology.

In addition to security needs relevant to computer networks, there are issues in the toll fraud, phone misuse, call accounting, and bill reconciliation arenas that warrant similar protections. Currently, a need exists to address the full spectrum of resource and security issues across all locations of an enterprise that may span the entire globe. A need exists for a scalable and manageable telephony security system and a method for controlling and logging access to an enterprise's telephony resources.

SUMMARY OF THE INVENTION

The present invention, accordingly, provides a system and method for performing telephony resource management and security access monitoring and/or control functions for an enterprise's telephone circuits between end-user stations and their respective circuits into the PSTN. In the most basic configuration, inbound and outbound calls are allowed or denied (i.e., blocked or "hung up") according to a rule-set that is managed by a system administrator. The rule-set for monitoring and control of call traffic is part of the enterprise's telephony resource management and security policy that governs how telephony resources may be used within the enterprise. Each rule, upon meeting certain criteria, initiates appropriate action(s), assessment(s), alert(s) and response(s).

The system and method of the present invention performs centrally managed, enterprise-wide enforcement of the enterprise's telephony resource management and security policy with real-time notification in instances of policy violation and attempted security breach. The system utilizes a specialized device to monitor and/or control access to every telephone station, fax machine, modem, STU-III device, and video teleconference (VTC) station line, for all locations within the enterprise having telephony resources that are routed through the device.

The telephony access monitoring and/or control device identifies specific attributes pertaining to all inbound and outbound calls, and determines, according to the rule-set, whether certain inbound and outbound calls are allowed or denied, content-monitored for keywords, recorded, redirected, authorized for remote access, monitored for the presence of patterns of interest, encrypted and conducted within a Virtual Private Switched Telephone Network (VPSTN), transported using Voice over Internet Protocol (VoIP), logged and/or reported. The rule-set may also designate that the system adjust the security policy, and/or generate alerts which include, as examples: electronic mail notification, pager notification, console messaging, and/or a Simple Network Management Protocol (SNMP) trap notification. The rule-set may designate responsive actions including, for example, performing additional designated threat assessment(s) (TA), logging the call event, generating alerts and/or reports, and adjusting the security policy. Attributes captured by the device include, as examples: station extension, inbound caller-ID information (when available), outbound number dialed, digits entered after call connection, call-type (i.e., voice, fax, modem, VoIP, STU-III-voice, STU-III-data, STU-III unspecified, Wideband, Wideband video, busy, unanswered, and undetermined), call content such as keywords detected via speech recognition, or demodulated and decoded modem and/or fax data, call time and date, and call duration (in seconds).

In one aspect of the invention, the disclosed system and method combines call-progress monitoring, caller-id (CND) and/or automatic number identification (ANI) decoding, digital line protocol reception, decoding, demodulation, pulse dial detection, tone detection (DTMF and MF, referring to Dual Tone Multi-Frequency and Multi-Frequency signaling tones respectively), pattern matching, speech recognition, foreign language recognition, voice compression, voice decompression, companding law transcoding, encryption and decryption, call address translation, echo cancellation, voice activity detection and silence suppression with microprocessor control, access-control logic, and call-interrupt circuitry.

As used herein, the following terms carry the connotations described below:

"Keyword" is understood to refer to a predefined sequence of digital data.

"STU-III-voice" call-type is understood to refer to the encrypted voice transmission from a Secure Telephone Unit-III (STU-III) encryption device used by some government agencies, the military and some NATO agencies to conduct classified conversations.

"STU-III-data" call-type is understood to refer to the encrypted data transmission from the STU-III encryption device when it is used as a modem to transmit data to another STU-III location.

"STU-III-unspecified" call-type is understood to refer to transmissions from the STU-III devices, but due to the early version of the device, a determination of STU-III-voice or STU-III-data can not be made.

"Wideband" call-type is understood to refer to any non-voice grade data transmission using multiple channels on an Integrated Services Digital Network/Primary Rate Interface (ISDN/PRI) trunk (except video which is referenced separately; i.e., the bearer channel information transfer capability attribute is "speech," "3.1 kHz audio," "restricted data," "unrestricted data," or "unrestricted data with tones/announcements").

"Wideband video" call-type is understood to refer to any video transmission using multiple channels on a ISDN/PRI trunk (i.e., the bearer channel information transfer capability attribute is "video").

"Unanswered" call-type is understood to refer to the call wherein the call source hangs up before the call destination answers.

"Undetermined" call-type is understood to refer to the call wherein the called or calling party hangs up after the call is answered but before the call-type is determined.

In one embodiment, a system and method of telephony security is provided that monitors and/or controls call access into and out of the enterprise on a per line (station extension or trunk line) basis, a per call basis, or any combination thereof. A security policy, i.e., a set of access rules, are defined for each line connected through the system; the rules designating actions to be taken based upon at least one attribute of the call present on the line. In this embodiment, calls are tracked and sensed on a per line and/or a per call basis, by determining specific attributes (e.g., identifier for the trunk, extension, or line carrying the call, call type, call start time, etc.) that are available at the time of the call. Actions are then performed based upon the determined call attributes, in accordance with the rule that applies to the call on that line and/or the call itself. Actions may include performing various designated assessments. Additional actions may be performed based upon the assessment results and the call attributes, including automatically adjusting and updating the security policy by removing the source or destination extension of the call from one group of extensions and placing it into another group of extensions.

BRIEF DESCRIPTION OF THE DRAWINGS

FIG. 5 is a table illustrating a portion of an example keyword group list within an example security policy for use by the system of FIG. 1;

FIGS. 6A and 6B are a table illustrating a portion of an example extension group list within an example security policy for use by the system of FIG. 1;

FIGS. 7A, 7B, 7C, and 7D are a table illustrating a portion of an exemplary security rule base within an example security policy for use by the system of FIG. 1;

FIGS. 8A, 8B, and 8C are a table illustrating a portion of an exemplary result response policy within an example security policy for use by the system of FIG. 1;

FIGS. 10A, 10B, 10C, and 10D are a process flow diagram illustrating detection and analysis of call activity, resolution of missing extension information, and execution of the security policy by the system of FIG. 1;

FIGS. 14A, 14B, 14C, 14D, and 14E are a table illustrating a portion of an exemplary security rule base for use in implementing multi-tiered policy-based enforcement of the security policy by the system of FIGS. 13A and 13B;

DETAILED DESCRIPTION

Figure 1:
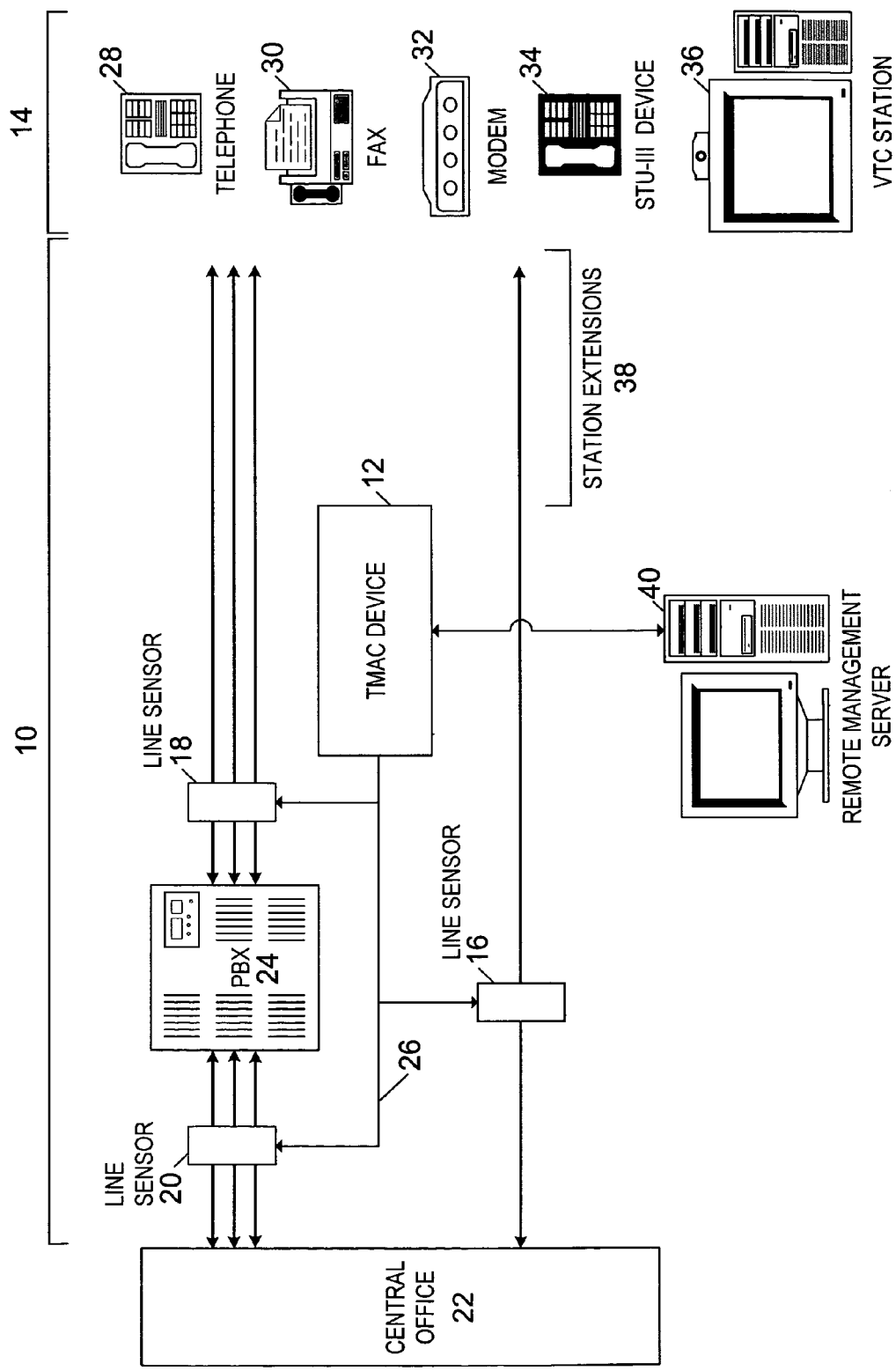
FIG. 1 is a schematic block diagram illustrating an exemplary telephony security system of the present invention.

In FIG. 1, the reference numeral 10 represents a telephony resource management and security system of the present invention. The system 10 consists primarily of a Telephony Monitoring and/or Access Control (TMAC) device 12 connected in-line between end-user stations 14 at one or more locations of an enterprise, and the stations' circuits into the PSTN, by any combination of one or more line sensor(s) 16 (direct lines from a central office 22), 18 (lines on the station-side of a Public Branch exchange (PBX) 24), and 20 (lines on the trunk-side of the PBX 24). Cabling 26 connects the TMAC device 12 and the line sensor(s) 16, 18, and 20. The combination of cable connection equipment, the associated switches and/or the associated control logic (as required), are collectively referred to herein as the line sensor. Line sensors are not required at all of these locations (16, 18, and 20), but can be installed in accordance with the configuration of lines and the enterprise's desired level of resource and security management.

Figure 19:
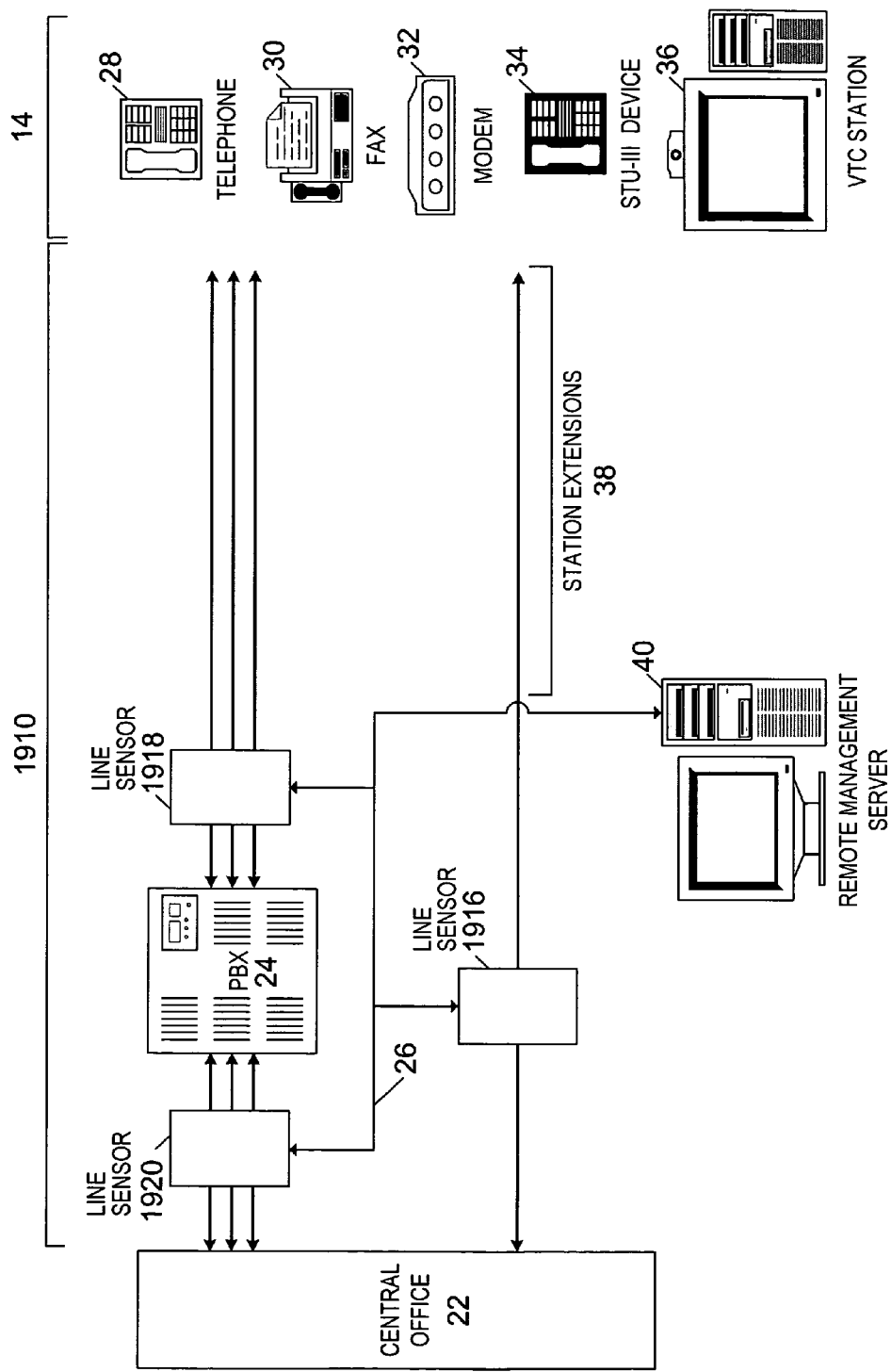
FIG. 19 is a schematic block diagram illustrating the preferred embodiment wherein the TMAC device is consolidated within the line sensors.

While not shown, it is understood that more than one network-addressable TMAC device 12 and associated line sensor(s) 16, 18, and 20 may be utilized at geographically separated locations within an enterprise, whereby resource management and access security is provided by the TMAC device(s) 12 for traffic into and out of a private network or virtual private network of the enterprise. It is further understood by those skilled in the art that while shown as a separate box in FIG. 1, all functions of the TMAC device 12 may be inserted into the system 10 (i.e., collocated) with the line sensor(s) 16, 18, and 20 (FIG. 19).

Also in FIG. 1, numeral 14 represents at least one of a group of end-user stations connected through the TMAC device 12, representing as examples, one or more telephones 28, fax machines 30, modems 32, STU-III devices 34, and VTC stations 36. The modems 32 may support, for example, desktop or portable personal computers, or systems requiring modems for remote dial-up monitoring or maintenance access, including for example, PBXs, routers, Heating, Ventilation and Air Conditioning (HVAC) systems, and alarm systems.

Individual station extensions 38 connect each of the stations 14 through the TMAC device 12, via the line sensor(s) 16 or 18, to the central office 22 or the PBX 24. As represented by the line sensor 18 and its corresponding lines, it is understood that the TMAC device 12 maps the individual station extensions 38 through the device 12 to their respective wire pairs (not shown) within the PBX 24, and also to one or more telephone lines directly connected to the central office 22, as indicated with corresponding lines at the line sensor 16.

Numeral 40 represents at least one of a group of network-accessible computers and processors connected to the TMAC device(s) 12, herein referred to singly as a remote management server 40, that may include for example, a client which serves as a user-interface with the system 10; a management server which processes the security policy and performs designated track functions; a database server which contains the security policy 202, libraries, and call logs; a report server which consolidates and manages reports and call logs; and/or a content server which stores recorded and reconstructed call content. A remote management server 40 is connected to the TMAC device 12 and serves as the primary point of user interface, whereupon the system administrator programs a security policy 202 (FIG. 2), and other operational features of the TMAC device 12. Each TMAC device 12 receives the security policy 202 from the remote management server 40, monitors incoming and outgoing calls, allows or denies each call, and may perform additional designated actions, pursuant to the security policy 202. Although not shown, it is understood that programming may include, as required, writing firmware instructions for the associated switches and/or the associated control logic for the line sensors 16, 18 and/or 20.

The remote management server 40 allows the system administrator to monitor system 10 operations and view ongoing call activity and call events, including changes in call attributes, flowing through one or more TMAC device(s) 12 in one or more locations, nearby or at a very remote distance therefrom. Call activity may be viewed in varying detail, ranging from detail as great as all call attributes, all call events, and all actions taken on all calls, to only selected call attributes, call events, and actions taken on selected calls.

The security administrator may preempt or complement actions the TMAC device 12 takes in enforcing the security policy 202, thereby manually allowing or denying a call, and/or causing the call to be redirected, recorded, content-monitored, authenticated for remote access, and/or conducted in encrypted mode within a VPSTN, either from the remote management server 40 or at the TMAC device 12.

The remote management server 40 receives call log event records from the TMAC device 12 and performs tracking events which include, for example: adjusting the security policy, and generating alert notifications, event logs and reports, pursuant to the security policy 202. The remote management server 40 provides consolidation, management, viewing, and printing of reports and call logs. The remote management server 40 also provides audio play-back of recorded voice call content, as well as viewing and printing of reconstructed data call content. Archiving of call logs, reports, and recorded and reconstructed call content may be accomplished on the remote management server 40 or another network-accessible server, pursuant to the security policy 202.

The system 10 is transparent to the central office 22, the PBX 24, and the end-user stations 14 unless the security policy 202 designates authentication of remote access or termination of a call (i.e., all wire-pairs terminate at the same points as prior to installation of the TMAC device 12, call traffic is uninterrupted if power is removed from the TMAC device 12, call traffic is uninterrupted if a call is in progress when the TMAC device 12 comes on-line, as described in U.S. Pat. No. 6,687,353, and the call content received by the destination is identical to the call content transmitted by the source).

The system 10 combines call-progress monitoring, caller-id (CND) and/or automatic number identification (ANI) decoding, digital line protocol reception, decoding, demodulation, pulse dial detection, tone detection (DTMF and MF), pattern matching, speech recognition, foreign language recognition, voice compression, voice decompression, companding law transcoding, encryption and decryption, call address translation, echo cancellation, voice activity detection and silence suppression with microprocessor control, access-control logic, and call-interrupt circuitry for implementing the desired monitoring and/or access control functions. The inventive functions performed by the system 10, as further described below, may be implemented with commercially available components as will be understood by those skilled in the art. While also not shown, it is understood that the TMAC device 12 is controlled by computer programming instructions stored in memory within the remote management server 40 and the TMAC device 12, and which may also be stored in memory within other components of the system 10 connected to the TMAC device 12.

The remote management server 40 detects a loss of power to, operation of, or communication with the TMAC device 12. Upon detection of such an event, the remote management server 40 logs the event, generates a report and/or notification alert to the designated personnel, pursuant to the security policy. If the connection between the remote management server 40 and the TMAC device 12 is lost, the device 12 continues to enforce the security policy. Policies also remain in effect if the TMAC device 12 reboots. Additionally, if a loss of telephony service on the line is detected, similar administrator-designated logging, report, and notification actions are performed.

Multiple configurations are contemplated, including those wherein: the functions of the TMAC device 12 may be inserted into the system 10 (i.e., collocated) at the line sensor(s) 16, 18 and 20 (FIG. 19); the functions of the remote management server 40 may be inserted into the system 10 at the TMAC device 12 (not shown); and the functions of the TMAC device 12 and the remote management server 40 may be inserted into the system 10 at the line sensors(s) 16, 18 and 20 (not shown).

Figure 2:
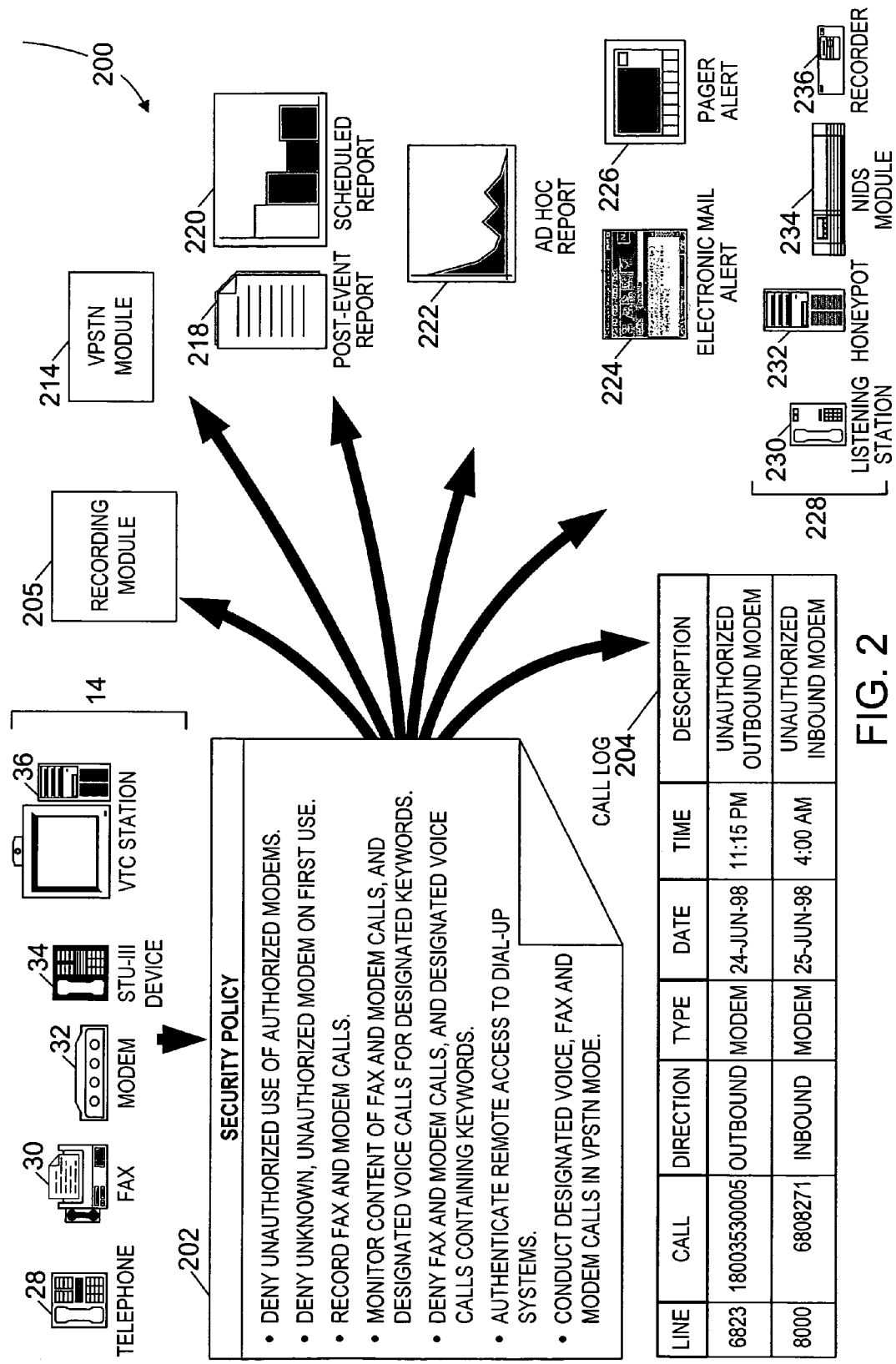
FIG. 2 is a functional block diagram illustrating a simplified example security policy and corresponding actions and features for use by the system of FIG. 1.

Referring to FIG. 2, a functional schematic 200 illustrates certain operational aspects of the system 10. An example (very simplified) security policy 202 is shown for monitoring and controlling the flow of calls through the TMAC device 12. The security policy 202 implements a rule-set that depends upon the type of equipment (phone 28, fax machine 30, modem 32, etc.) being used on the extension for either inbound or outbound calls. It is understood that the rule-sets implemented by software instructions within the TMAC device 12 may be programmed or modified at either the TMAC device 12 or at the remote management server 40 located nearby or at a very remote distance therefrom.

As exemplified in FIG. 2 and discussed below and in further detail later with reference to FIGS. 3, 4A-C, 7A-D and 8A-C, the security policy 202 designates the actions, threat assessments, and responses associated with individual or groups of calls (e.g., allow or deny the call, record call content, redirect the call, authenticate remote access, monitor call content for keywords, conduct the call in encrypted mode within a VPSTN, adjust the security policy, log call events, and generate notification alerts and reports), according to designated rules.

A call log 204, is constructed for each call, consisting of concatenated call event records, and stored in a database on the remote management server 40. Real-time ongoing and historical call log(s) 204 are viewed and printed from the remote management server 40. The call log 204 for each call is generated to an administrator-designated level of detail, ranging from very brief to verbose. While the call log 204 shown in FIG. 2 is a very simplified example, the detail of the call log 204 ranges from including all call attributes, all call events, and all actions taken on the call, to including only selected call attributes, call events, and actions taken the call.

Configuration of the call log 204 details and the security policy 202 rule-sets may include one or more of the following call attributes and rule criteria:

Call Key—a unique identifying key assigned to each call by the TMAC device 12;
Line—the identifier for the extension or direct connect line carrying the call;
Trunk—the PBX trunk group through which the call is processed;
Channel—the channel through which the call is processed;
TMAC Device Name—the designated alias of the TMAC device 12 processing the call and enforcing the rule;
TMAC Device Group—the designated alias of the group (or array of device(s) 12) to which the TMAC device 12 processing the call belongs;
Start Date—the start date of the call;
Start Time—the start time of the call;
Direction—whether the call is inbound or outbound;
Raw Destination Digits—the digits dialed prior to call connection, including prefix digits, the base phone number and suffix digits;
Prefix—all digits dialed before the base phone number, such as outside access number or long distance access code;
Suffix—all digits dialed after the base phone number, such as DTMF-based Personal Identification Number (PIN) code used in authentication for remote access, or calling card numbers;
Source—number, or mask (e.g., 210-402-XXXX) where the source number is the number of the party initiating the call; i.e., the extension assigned to a station for outbound calls, or the number extracted from caller-ID (or any other means) for inbound calls;
Source Name—caller ID alias or identifier;
Destination—number, or mask where the destination number is the number of the party receiving the call; i.e., the extension assigned to a station for inbound calls, or the number dialed (DTMF decoded or by any other means) for outbound calls;
Digit Comment—Comments included in the call log, for the benefit of the system administrator, which are associated with prefix and suffix digits dialed (e.g. long distance, operator assisted, international, emergency);
Connect Time—the time at which the call was answered (connected);
Security Policy—the designated alias of the security policy containing the matched (fired) rule;
Rule Number—the number of the rule that matched the call attributes and therefore fired;
Call-Type—the type of call, based either on equipment or call progress events (e.g., voice, fax, modem, VoIP, STU-III-data, STU-III-voice, STU-III-unspecified, wideband, wideband video, and busy, unanswered, undetermined);
Protocol—datacom protocols and/or characteristics of the protocol used;
Application—host-based software used for data communication;
Application Configuration—security configuration of host-based datacom software;
Call Content—designated keywords detected in voice, VoIP, and data calls;
Actions—designated actions executed by the TMAC device 12, pursuant to the security policy (i.e., allow or deny the call);
Tracks—additional actions and tracking functions executed, pursuant to the security policy (e.g., TMAC 12 device additional actions include: record call content, redirect the call, authenticate remote access, monitor call content for keywords, monitor for the presence of patterns of interest, monitor for the presence of data of interest, conduct the call in encrypted mode within a VPSTN, transport the call using VoIP, monitor for the presence of VoIP data of interest; remote management server 40 tracking functions include: adjust the security policy, log call events, and generate notification alerts and reports);
Redirect—the port and name of the peripheral device the call is redirected to;
Post-connect digits—digits dialed after the call is connected;
Log Time—the date and time a call event record is appended to the call log 204;
Call Log Comment—Comments included in the call log, for the benefit of the system administrator, which are associated with the fired rule and call event (e.g., unauthorized outbound modem; keyword detected in call content; call content recorded, etc.);
End Date—the date the call ended;
End Time—the time of day the call ended;
Duration—the duration of the call (in seconds).

A recording module 205, located within the TMAC device 12, records the raw binary stream (i.e., Time Division Multiplexed bit stream) of designated voice, fax, modem and VoIP calls, pursuant to the security policy 202, and archives the data on the remote management server 40, located nearby or a great distance therefrom. The TMAC device 12 temporarily caches the recorded content if the connection between the remote management server 40 and the device 12 is lost. Several configurations are contemplated, including those whereby the functions of the recording module 205 are accomplished within the TMAC device(s) 12, within the remote management server 40, or using a separate peripheral recorder 236 to which calls are redirected pursuant to the security policy 202.

Pursuant to the security policy 202, a VPSTN module 214, located within the TMAC device 12, encrypts and transmits, receives and decrypts designated voice, fax, modem, and video calls, thereby creating a virtual private switched telephone network across the PSTN between two TMAC device(s) 12, one located at each end of the call, as described in greater detail in U.S. Pat. No. 6,735,291.

A plurality of reports, including a post-event report 218, a schedule-generated report 220, or an ad hoc report 222 may be initiated, or scheduled for later generation and delivery via a graphical user interface-based report module (not shown) within the remote management server 40. The report module consolidates and manages designated call log 204 data for use in assessing an enterprise's telephony resource usage and/or security posture.

Reports are configuration-edited, generated, archived, displayed and printed via the remote management server 40. Report criteria includes: the date/time range for which call log data will be retrieved; call log 204 fields to be used; data organization (sorting, filtering, grouping, ordering); data presentation level (in detail or high level summary); and data display format (charts, graphs, or trends).

The post-event report 218 contains predefined information concerning a designated call event and is generated responsive to the call event, and pursuant to the security policy 202.

The schedule-generated report 220 contains previously designated categories of call log data and is automatically generated, displayed, printed, and delivered at previously designated, discrete or recurring times and/or days. The schedule-generated report 220 is delivered to the designated recipient(s) by electronic mail message, to the designated file directory on a network- or web-accessible server, and/or to the designated archival file directory.

The ad hoc report 222 is manually initiated by authorized personnel. Both the schedule-generated report 220 and the ad hoc report 222 may include, for example, batch analysis of call log data for trending or difference/comparison reporting, either in great detail or high-level summary.

In an example schedule-generated report 220 scenario, the system administrator creates a schedule-generated report 220 for the telecommunications manager and the customer service manager which identifies "all inbound calls to extensions in the customer service group during the previous week that are "hung up" before the call is connected, to be automatically generated a 12:01 a.m. each Monday morning, saved in .pdf format, and delivered via email to the telecommunications manager's and the customer service manager's workstations on workdays, and to their home workstations on holidays. This report shows both "busy" and "unanswered" call-types, and provides visibility into both the adequacy of telephony resources and the performance of the customer service staff.

Additional schedule-generated reports 220 might include weekly individual reports on "voice calls of duration exceeding 30 minutes," "outbound calls on voice mail lines," and "modem calls on voice-only lines," wherein each report contains the designated data from calls occurring the previous week, to be automatically generated at 12:00 p.m. each Sunday and placed in a designated directory on the enterprise's file server accessible only to the system 10 and designated personnel. It is understood that any configurable report, and any number of reports may be scheduled for generation and display, printing, or delivery at any discrete time or number of recurring time(s).

The remote management server 40 generates several types of alerts pursuant to the security policy 202, including, for example: electronic mail notification 224, pager alerting 226, console messaging, and SNMP trap notification. Alert contents are administrator-configurable, derived from call log 204 data, and may include, for example: rule number fired, call source, call destination, call-type, TMAC device 12 group and name, security policy name, designated keywords found in call content, date, and time.

The numeral 228 represents at least one of a group of peripheral devices to which the system 10 redirects a call or an in-progress copy of the call, pursuant to the security policy 202. The peripheral devices 228 include, for example: a security listening station 230, a honeypot 232, a data Network Intrusion Detection System (NIDS) 234, and the recorder 236. While not shown, it is understood that the security policy 202 can also be configured such that any call to or from one or more designated end-user stations 14 is redirected to a different end-user station 14 within the enterprise. Several configurations are contemplated, including those whereby all functions and operations of the NIDS 234 are accomplished within the TMAC device 12; or within the remote management server 40; or using a separate computer system(s), to which calls are redirected for analysis; located nearby or a great distance therefrom within the enterprise.

Security Policy

Figure 3:
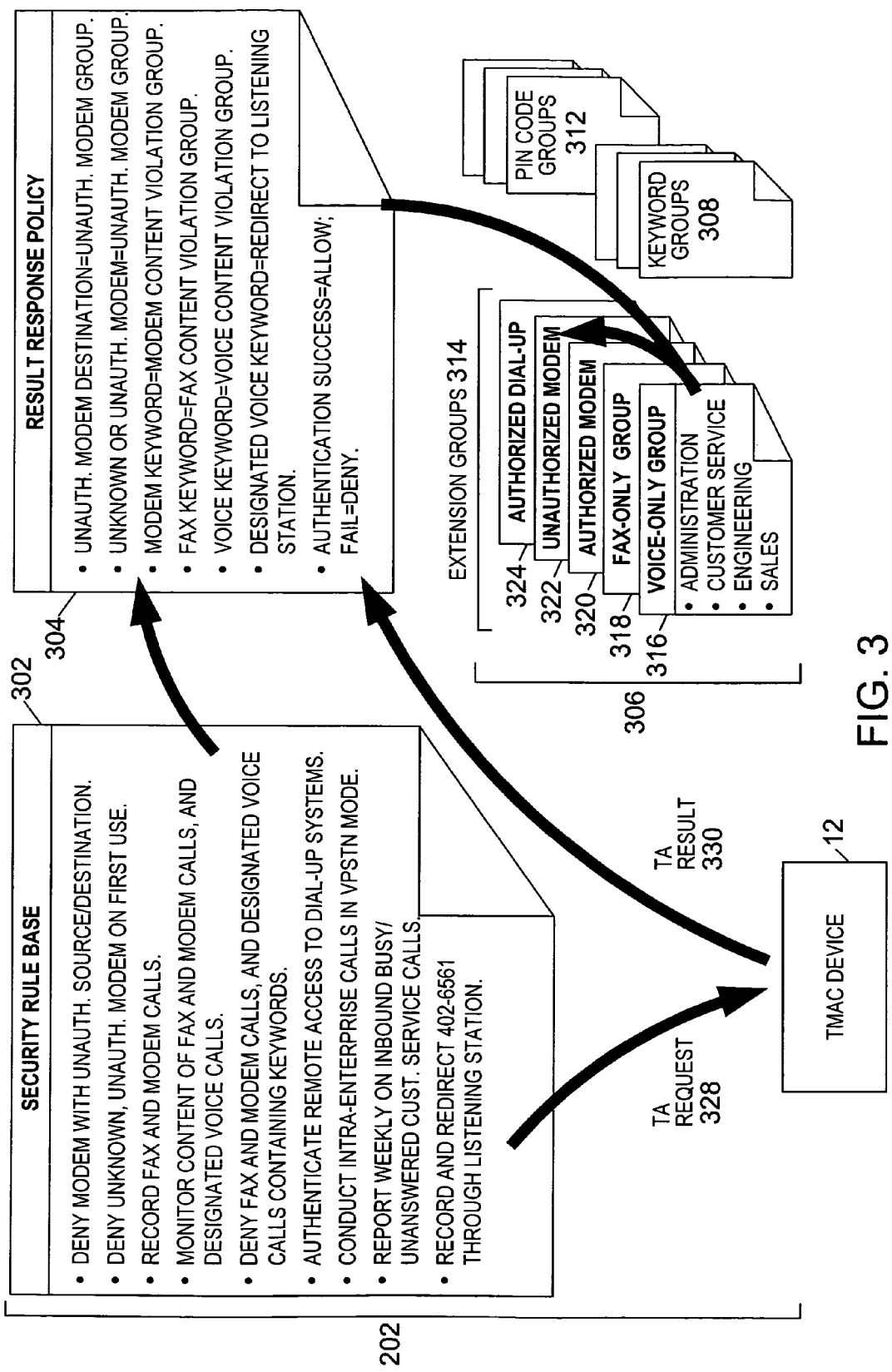
FIG. 3 is a functional block diagram illustrating simplified example security policy elements and interactions of a simplified example security policy for use by the system of FIG. 1.

FIG. 3 is a schematic block diagram of an exemplary security policy 202 for enforcement by the system 10 of FIG. 1. In a preferred embodiment, the security policy 202 includes one or more security rule base(s) 302, one or more result response policies 304, and one or more groups 306. The group 306 includes for example: keyword groups 308, protocol groups 310 (not shown), PIN code groups 312, and extension groups 314, each of which are schematically represented in FIG. 3 and discussed in more detail later with reference to FIGS. 5, 6A, and 6B. The security rule base 302, the result response policy 304, and the groups 306 are used by the system 10 to monitor and control calls. Although one or more security rule bases, such as the security rule base 302, with one or more corresponding result response policies, such as the result response policy 304, can be configured for a large globally distributed enterprise, for the sake of clarity and simplicity, only one of each component is shown in this diagram.

The security rule base 302 is a sequential listing of rules, residing in the remote management server 40 and the TMAC device 12, which define whether certain calls are allowed, denied, recorded, redirected, authenticated for remote access, content-monitored for keywords, monitored for the presence of patterns of interest, conducted in encrypted mode so as to be conducted in a VPSTN, transported using VoIP, monitored for the presence of data of interest, monitored for the presence of VoIP data of interest, and if additional tracking functions including generating a report, adjusting the security policy, logging the event and alerts are initiated. For example, a rule within the security rule base 302 might read "Allow authenticated remote access for any inbound modem call from any number in the maintenance dial-up group to any extension in the dial-up systems group, record call content, monitor call content for modem keywords, monitor for the presence of patterns of interest, monitor for the presence of data of interest, generate email, and log the event."

In the present example, the security rule base 302 designates: (1) deny any modem call using an unauthorized datacom protocol, unauthorized host-based datacom application, or insecurely configured host-based datacom application (not shown); (2) deny any modem call from/to an unauthorized source/destination; (3) deny unknown or unauthorized modems on their first use; (4) record call content of all authorized fax and modem calls; (5) monitor call content of any authorized fax and modem calls, and designated voice calls for designated keywords; (6) deny fax and modem calls, and designated voice calls containing designated keywords; (7) authenticate remote access to dial-up systems, deny unauthenticated access; (8) monitor any voice, fax, and modem calls for the presence of patterns of interest (not shown); (9) monitor any authorized modem call for the presence of data of interest (not shown); (10) conduct any intra-enterprise fax and modem call within a VPSTN (not shown); (11) conduct any intra-enterprise voice call within a VPSTN and transport using VoIP (not shown); (12) deny incoming VoIP calls from an unauthorized source (not shown); (13) generate and deliver a weekly scheduled report on all inbound busy and unanswered calls to extensions in the customer service group; and (14) record and redirect an in-progress copy of voice calls on extension 402-6561 to a designated listening station.

The TMAC device 12 performs threat assessments which include for example: authentication (via detection of dialed DTMF digits) of call sources attempting to remotely access enterprise telephony resources; monitoring the content of voice, fax, modem or VoIP calls for designated keywords; monitoring voice, fax, modem and VoIP calls for the presence of patterns of interest; monitoring modem calls for the presence of data of interest; and monitoring inbound VoIP calls for the presence of data of interest. A TA result 330 (i.e., the success or failure in authenticating call source attempting to remotely access telephony resources, identifying designated keywords, patterns of interest, and/or data of interest), is used to identify an appropriate response to the assessment, pursuant to the result response policy 304.

The result response policy 304 is a sequential listing of response rules (similar in construction to the security rule base 302), which define the appropriate response to call events and the TA result 330. The response policy 304 defines whether the call will be allowed or denied, if the TA result 330 will be logged, or whether other actions such as alerts or automatic adjustments to the contents of extension groups 314 (and hence to the security policy 202), will be performed.

In the present example, the result response policy 304 designates: (1) move the extension of any modem call using an unauthorized datacom protocol, unauthorized host-based datacom application or insecurely configured host-based datacom application into the modem protocol violation group (not shown); (2) move the extension of any modem call from/to an unauthorized source/destination into the unauthorized modem group; (3) move the extension of any unknown or unauthorized modem into the unauthorized modem group on their first use; (4) move the extension of any authorized modem call, found to contain designated keywords, into the modem content violation group; (5) move the extension of any authorized fax call, found to contain designated keywords, into the fax content violation group; (6) move the designated extension into the voice content violation group, if the call content is found to contain designated keywords; (7) redirect an in-progress copy of the call on the designated extension to a designated listening station, if the call content is found to contain designated keywords; (8) allow the call if authentication of the call source attempting to access dial-up systems is successful, deny unauthenticated access; (9) deny any voice, fax, modem, and VoIP call associated with patterns of interest (not shown); (10) deny any authorized modem call associated with data of interest (not shown); and (11) deny any VoIP call associated with data of interest (not shown).

Groups 306 are used by both the security rule base 302 and the result response policy 304 to indicate specific and/or groups of specific keywords, PIN codes, and extensions (as shown in groups 308, 312, and 314); as well as designated and/or groups of designated datacom protocols, datacom protocol host-based applications, datacom host-based application security configurations, (not shown). When the security rule base 302 or the result response policy 304 designate that the security policy is to be adjusted, the remote management server 40 removes an extension from its current extension group and places the extension into a different, designated extension group (e.g., removes an extension from the voice-only group 316 and places it in the unauthorized modem group 322), thereby altering the way in which the system 10 monitors and controls future calls to and from the moved extension.

Installation, Configuration and Operation

Figure 4A:
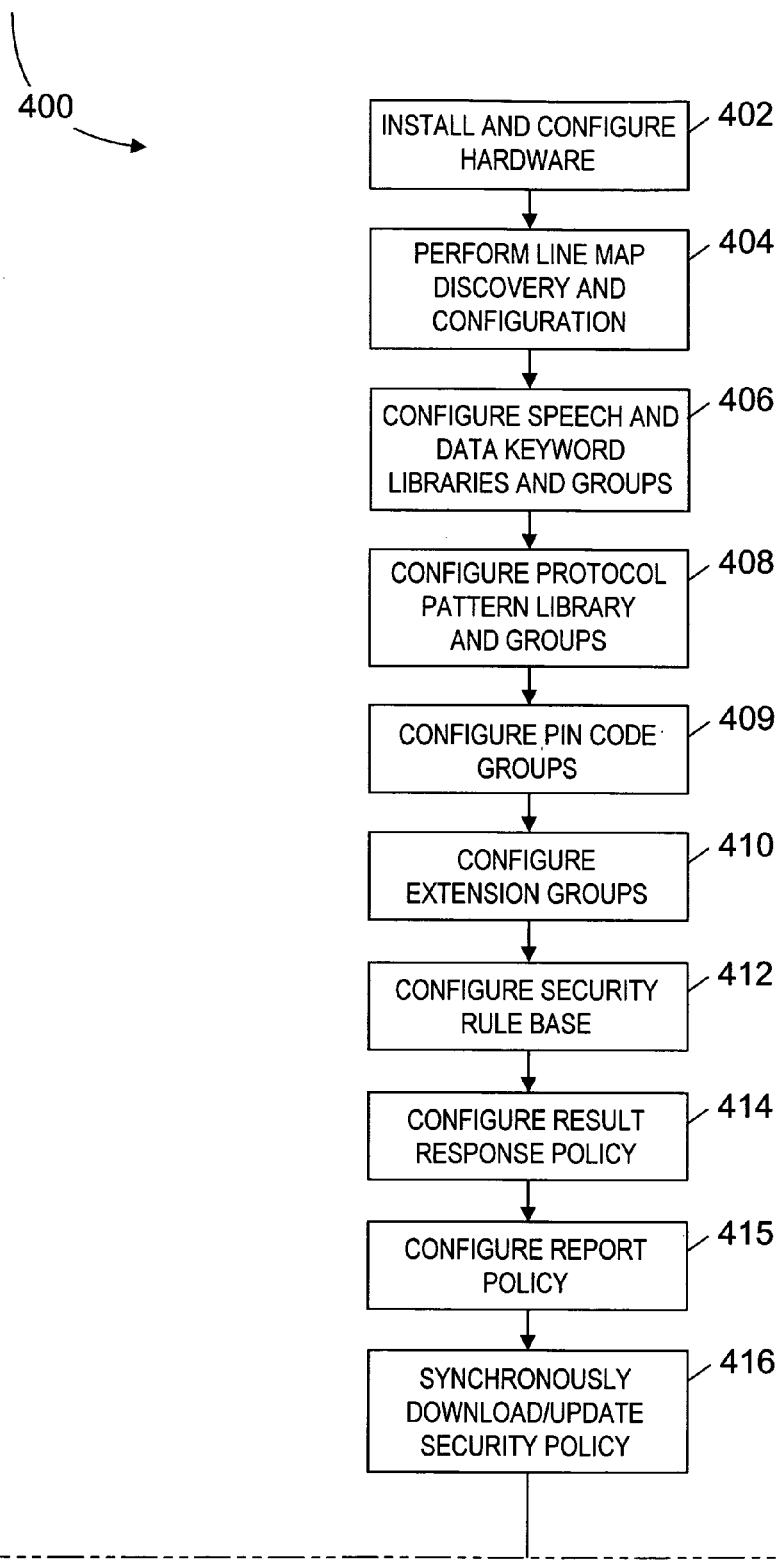
FIGS. 4A, 4B, and 4C are a process flow diagram illustrating installation, configuration and operational processes of the system of FIG. 1.
Figure 4B:
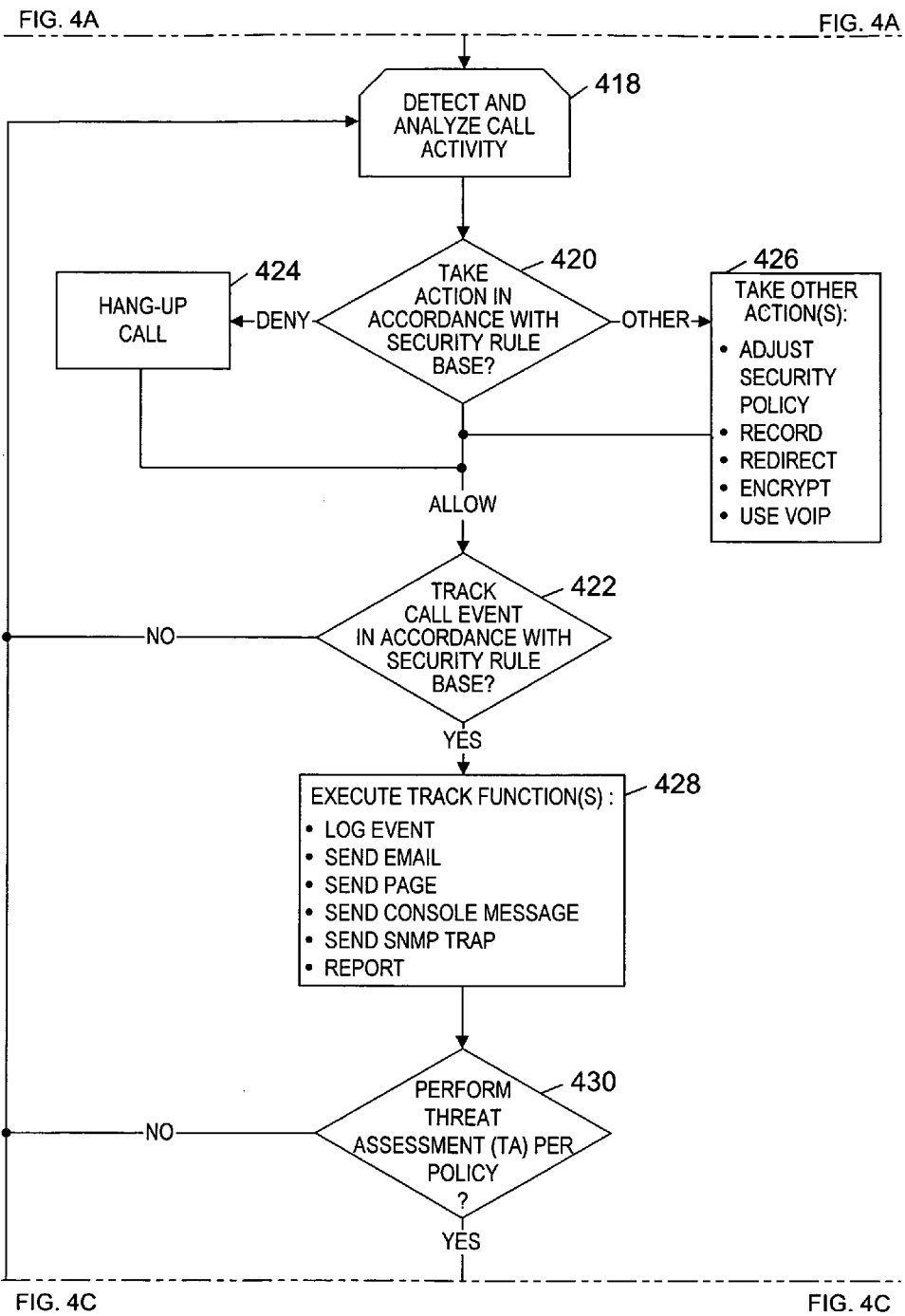
Figure 4C:
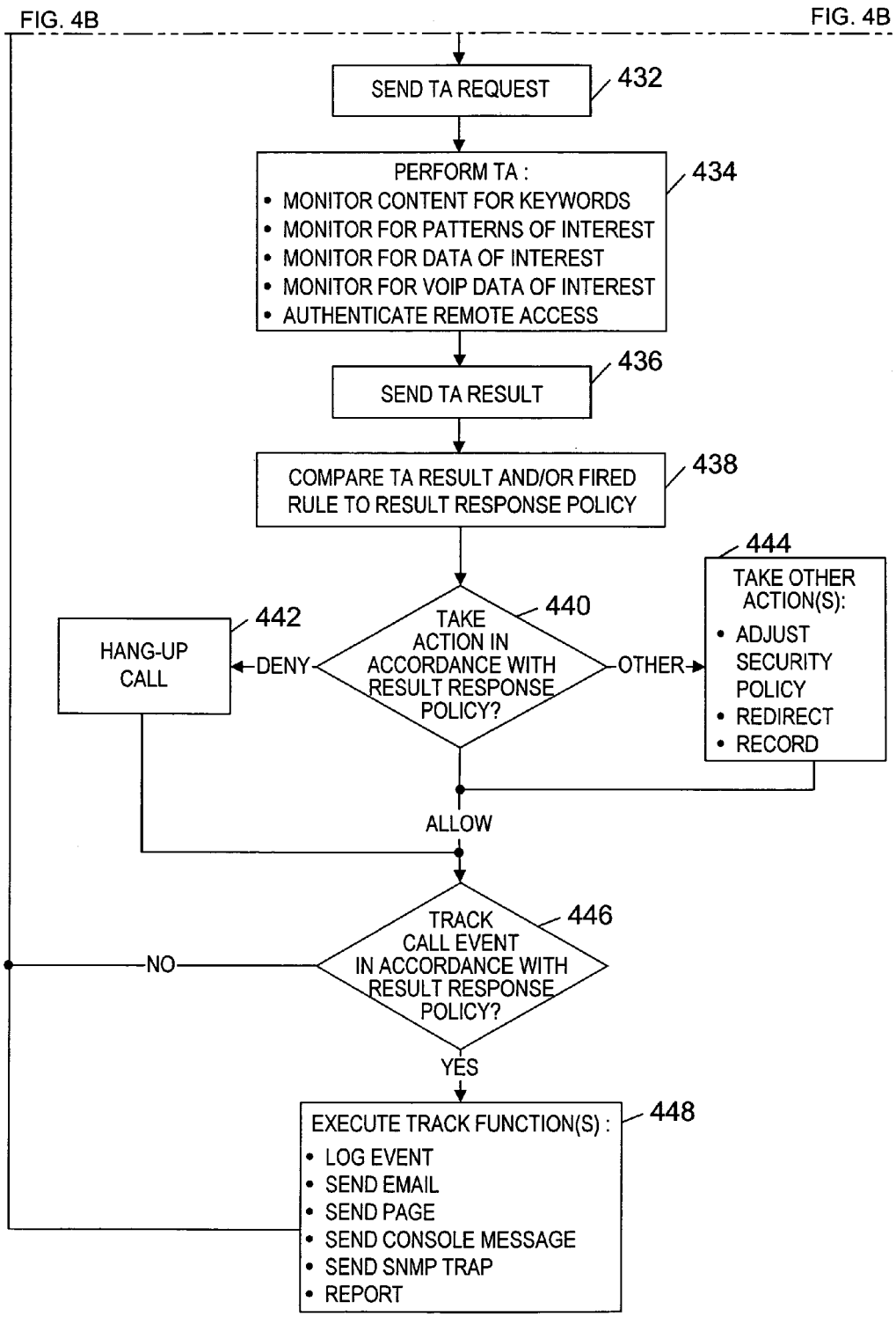

FIGS. 4A, 4B, and 4C together show a process flow diagram 400 illustrating installation, configuration and operation processes for the system 10 of FIG. 1. Once installed and configured, it is understood that the system 10 is capable of operating in a continuous loop, detecting and analyzing call activity and performing threat assessments while simultaneously performing appropriate actions, tracking functions, and responses in accordance with the rules in the security policy 202.

Referring to FIG. 4A, in steps 402 and 404, the process of system installation and hardware configuration, and the process of line map discovery and configuration are performed as described in U.S. Pat. No. 6,249,575. Step 406 refers to building speech, fax and modem keyword libraries and configuring the keyword groups 308, described below with reference to FIG. 5. Step 408 refers to building the protocol pattern library and configuring the protocol groups. In step 409, the PIN code groups 312 are configured. In step 410, the extension groups 314 are configured, as described below with reference to FIG. 6. Step 412 refers to security rule base 302 configuration, as described below with reference to FIGS. 7A-D. Step 414 refers to response policy 304 configuration, as described below with reference to FIGS. 10A-C. Although not shown, it is understood that the system administrator may perform steps 406-414 to configure the security policy 202 and the TMAC device 12 from the remote management server 40, and thereby download the configurations to one or more TMAC device(s) 12, or the system administrator may interact directly with the one selected TMAC device 12 via a terminal or terminal emulator connected to a serial port on the device 12 or via a Telnet connection over the network. The TMAC device 12 may be configured to allow direct administrator interaction via: (1) the serial port connection only; (2) the serial port and the remote management server 40 only; or (3) the serial port, remote management server 40, and Telnet.

In step 415, the report policy is configured, thereby formatting and designating report criteria, generation and delivery parameters for the post-event reports 218 and the schedule-generated reports 220. In step 416, the security policy 202, TMAC device 12 configurations, keyword and pattern libraries, modifications to each, and software upgrades are synchronously downloaded from the remote management server 40 to one or more device(s) 12 which are designated to receive the same groups, security policy, configurations, etc., in one or more locations within the enterprise. Conversely, any number of individually distinct groups, security policies, configurations, and modifications may be downloaded to designated device(s) 12 from the remote management server 40 or programmed and modified directly at the TMAC device 12.

Referring now to FIG. 4B, the process of call detecting and analyzing call activity begins in step 418, and is discussed below and in further detail later with reference to FIGS. 10A, 10B, 10C, and 10D. For each end-user station 14 connected through the TMAC device 12, the device 12 captures and analyzes call-activity, then consolidates and reports details of the activity for further processing.

An aspect of this process involves the ability of the TMAC device 12 to distinguish fax, modem, voice, VoIP, STU-III-voice, STU-III-data, STU-III-unspecified, Wideband, Wideband video, busy, unanswered, and undetermined call-types. Algorithms for call-type distinction are utilized that, in one implementation, distinguish the call-type based upon spectral analysis associated with typical fax and other data transmission protocols as described in greater detail in U.S. Pat. No. 6,718,024. If the source or destination number/extension is not available from the trunk or is not of sufficient fidelity to use in policy rule enforcement, the system 10 uses a weighted correlation algorithm and Station Message Detail Recording (SMDR) or Call Detail Recording (CDR), output by the PBX 24, to determine the missing information and enforce the security policy 202. Further analysis of call activity involves the ability of the TMAC device 12 to discriminate call data protocol, and to detect keywords in call content via speech recognition or demodulated modem/fax data. Because the system 10 operates in a continuous processing loop, analyzing call activity while simultaneously performing appropriate actions and responses, change in call-type during a call and digits entered after call connection are also detected.

In step 420, call attributes are compared to the rules in the security rule base 302, and pursuant to the security rule base 302, a determination is made whether to allow or deny the call. As previously described, the security rule base 302 is configured to meet the security needs of the enterprise, which may include allowing the call, in which case execution proceeds directly to step 422, denying the call, in which case execution proceeds to step 424 to "hang-up" the call, or performing other actions including adjusting the security policy, recording call content, redirecting the call to another end-user station 14 or peripheral device 228, conducting the call in encrypted mode so as to be conducted in a VPSTN, and transporting the call using VoIP, in which case execution proceeds to step 426. It is understood that the system administrator may manually perform preemptive or complementary actions at any time, including those described above, either at the TMAC device 12 or from the remote management server 40.

In step 422, a determination is made whether the security rule base 302 designates tracking functions to be performed. If so, in step 428, the remote management server 40 performs tracking functions, such as event logging, generating email, pager, console messaging and/or SNMP notifications, and/or generating designated reports. While not shown, it is understood that there are different levels of call detail in the log entries and notifications, configurable by the system administrator in the security rule base 302 and result response policy 304.

In step 430, a determination is made whether the security rule base 302 designates performance of an action that is a threat assessment, including for example: (1) monitoring call content for keywords; (2) monitoring for the presence of patterns of interest; (3) monitoring for the presence of data of interest; monitoring for the presence of VoIP data of interest; and/or (4) initiating an authentication for remote access, as shown in step 434, for example. If so, execution proceeds to FIG. 4C and step 432, in which the TA request 328, containing all necessary information to execute the assessment, is sent to the specific system module or component that performs the designated threat assessment. In step 434, the module or component executes the designated threat assessment, such as detecting and identifying designated keywords in call content. The assessing module or component sends the result of the assessment, the TA result 330, in step 436.

In step 438, the TMAC device 12 compares the TA result 330 and/or the criteria of the fired security rule base 302 rule with the rules in the result response policy 304, as described below with reference to FIGS. 11A and 11B. In step 440, a determination is made, pursuant to the result response policy 304, to either: (1) deny the call, in which case execution proceeds to step 442 to "hang-up" the call; or (2) allow the call and perform other actions including for example, adjusting the security policy 202, and redirecting the call to another extension 38 or peripheral device 228, in which case execution proceeds to step 444; or (3) allow the call with no additional actions, in which case execution proceeds directly to step 446. In step 446, a determination is made, pursuant to the result response policy 304, whether the remote management server 40 performs tracking functions, such as event logging, generating email, pager, console messaging and/or SNMP notifications, and/or generating designated reports in step 448. Although not shown, it is understood that additional threat assessments may be designated in step 444, in which case execution returns to step 430-436, in which case, in step 438, actions and responses are performed based upon the latest TA result 330.

Group List Configuration

It is contemplated that the system 10 will make extensive use of groups where objects including keyword digital data sequences, PIN codes, and extensions are "bundled" together by commonality and collectively referred to by meaningful aliases for ease of management and convenience in applying keyword-based, protocol-based, host-based application-based, application security configuration-based, and access authentication-based rules by the security policy 202. FIGS. 5, 6A, and 6B each illustrate a portion of exemplary group configurations for use by the system 10, and are described below.

FIG. 5 illustrates a portion of an exemplary group listing of the keyword groups 308 (FIG. 3), as previously discussed with respect to step 406 in FIG. 4A. The keyword groups 308 represent aliases for administrator-configured digital data sequences used in creating keyword-based rules within the security rule base 302 and the result response policy 304. Although the keyword groups 308 shown in FIG. 5 are configured in keyword libraries to facilitate detection of keywords in call content that indicate improper behavior, security issues, or inappropriate use of telephony resources, various categories and uses for keyword groups are contemplated, and it is understood that the keyword groups 308 may be expanded upon to meet these and other unrelated content monitoring needs, including automated order fulfillment, and call routing. As shown in FIGS. 5, 6A, and 6B, groups may overlap one another and even contain other groups entirely, as in the case of the "voice keyword" group which contains the "confidential keyword" group as well as the sequences within the "profanity keyword" group.

FIGS. 6A and 6B together illustrate a portion of an exemplary group listing of the extension groups 314 (FIG. 3), as previously mentioned with respect to step 410 in FIG. 4A.

The extension groups 314 represent aliases for: (1) an organizations' extensions; (2) dialing numbers of authorized and unauthorized sources and destinations outside the enterprise; and (3) categorizing a status or violation of an extension or dialing number; each of which are used in creating the security rule base 302 and the result response policy 304.

The system administrator can use the line map configured in step 404 to create a list of users and aliases so as to use the system 10 as an authentication mechanism that associates users and end-user stations with extensions, and extensions with privileges, thus controlling access to the system 10 in the same manner that operating systems control access to resources. It should be noted that numbers which will be dialed to contact specific entities outside the organization, or specific numbers that are expected to be dialing into the organization for business purposes are also included in the extension group 314. Specifically, the maintenance dial-up group, the engineering dial-up group, and the research dial-up group each contain the numbers of designated outside entities, and each of these groups are contained within the authorized dial-up group 324. As will be described with reference to execution of the security rule base 302 and FIGS. 7A-D, the system 10 uses these specifically identified outside numbers to provide enhanced monitoring and/or access control and telephony resource management.

In FIGS. 6A and 6B, extensions with the same end-user station 14 capabilities, and hence the same call-type or function, are grouped together and collectively referred to with aliases which indicate the dedicated call-type of the extension, including the aliases "voice-only," "fax-only," and "video." For example, the "authorized modem" group 320 consists of all extensions within the enterprise with modems that are known to the security administrator, authorized for business use, and securely configured. As shown below with reference to FIGS. 7A and 7B, by grouping and aliasing the extensions by call-type, and by defining rules based on extension call-type, the system 10 terminates and/or identifies any unauthorized modem the first time and every time the modem is used and alerts the designated personnel. Unauthorized or inappropriate use of authorized modems is also terminated, brought to the attention of designated personnel, and prevented from recurring.

Security Policy Configuration—Security Rule Base

FIGS. 7A, 7B, 7C, and 7D together illustrate portions of an exemplary security rule base, such as the security rule base 302, contained within the security policy 202 and configured for use by the system 10 in monitoring and controlling call access and telephony resources, as previously mentioned with reference to step 412 in FIG. 4A. The security rule base 302 defines "rules" that, based upon designated call attributes, for example: "source," "destination," "call-type," "call content," "date," and "time," implement an "action" (allow or deny the call), and initiate additional "tracking" actions which may include: recording, redirecting, content monitoring for keywords, authentication of an inbound call for remote access, encrypting and conducting the call within a VPSTN, logging, and initiating reports and alerts. Additionally, each rule includes the TMAC device 12 location/identifier "install on," allowing the system administrator to implement one security policy 202 containing rules to be applied to designated device(s) 12 in specific locations within the enterprise.

The example rules shown in FIGS. 7A-D are configured for monitoring and/or controlling call access and telephony resource usage. It is understood that the security rule base 302 shown in FIGS. 7A-D may include any number and types of rules, and although not all possible call attributes are used in this example, rules may be constructed using any call attributes contained in the call log 204 and described with reference to FIG. 2.

Additionally, any combination of action(s) or tracking function(s) may be included in the security rule base 302, pursuant to the enterprise's telephony security and resource management needs.

It is further understood that each rule is evaluated in sequential order, and the security rule base 302 is exited after any one rule matches the determined call attributes. Because call-type detection is continuous during the call, change in call-type during a call is detected. Consequently, each rule in the security rule base 302, except for the rule already fired by the call's previous attribute, is re-evaluated in sequential order, using the updated call-type attribute. Actions and track functions are then performed based upon the rule matched with the updated call attribute.

Referring now to FIGS. 7A-D, the Security Rule Base (SRB) 302 Rules 1-20 are explained as follows:

Rule 1:

This rule states "Allow, record, and authenticate remote access for any inbound modem call from any number in the maintenance dial-up group to any extension in the dial-up systems group, monitor call content for modem keywords, generate email, log the event." This rule notifies designated personnel of an authorized modem source attempting to access a remote maintenance and monitoring modem (for PBX, HVAC, and router systems, etc.). This rule implements the company policy to record and monitor the content of non-intra-enterprise modem calls.

Rule 2:

This rule states "Deny any inbound modem call from sources not in the maintenance dial-up group to extensions in the dial-up systems group, generate an email and pager notification, log the event." This rule alerts designated personnel to attempts by an unauthorized source to access maintenance and monitoring modems for PBX, HVAC, and router systems etc., indicating a possible hacking attempt.

Rule 3:

This rule states "Deny any outbound modem call from extensions in the dial-up systems group to any destination, generate an email and pager notification, log the event." This rule alerts designated personnel to unauthorized in-house use of modems dedicated for dial-up system maintenance and monitoring.

Rule 4:

This rule states "Allow, encrypt and conduct within a VPSTN, outbound voice, fax and modem calls from extensions in the voice-only, fax-only, and authorized modem groups to extensions in the branch offices voice-only group, branch offices fax-only group, and branch offices authorized modem groups, log the event." This rule implements the company policy to conduct intra-enterprise voice, fax, and modem calls within a VPSTN.

Rule 5:

This rule states "Allow, encrypt and conduct within a VPSTN, inbound voice, fax and modem calls to extensions in the voice-only, fax-only, and authorized modem groups from extensions in the branch offices voice-only, branch offices fax-only, and branch offices authorized modem groups, log the event." This rule implements the company policy to conduct intra-enterprise voice, fax, and modem calls within a VPSTN. This rule also implements the company policy to monitor all call event records for the presence of patterns of interest.

Rule 6:

This rule states "Deny any outbound modem call from extensions in the engineering modem group to any destination that is not in the engineering dial-up group, adjust the security policy, generate an email and pager notification, log the event." This rule restricts outbound modem calls to only destination numbers of known business contacts, and alerts designated personnel to unauthorized use of modems. The policy of "no unauthorized use of authorized modems" is reinforced by adjusting the security policy (i.e., moving the offending extension into a different group that does not have the modem privileges of the engineering modem group, thereby denying all future modem calls to the offending extension until the system administrator returns the offending extension to the engineering modem group).

Rule 7:

This rule states "Allow and record, outbound modem calls from extensions in the engineering modem group to numbers in the engineering dial-up group, monitor call content for modem keywords, log the event." This rule allows business as usual for authorized modem use and implements the company policy to record and monitor the content of non- intra-enterprise modem calls.

Rule 8:

This rule states "Allow and record, inbound modem calls from authorized outside sources in the authorized dial-up group to extensions in the authorized modem group, monitor call content for modem keywords, log the event." This rule allows business as usual for authorized modem use with known business contacts, and implements the company policy to record and monitor the content of non- intra-enterprise modem calls.

Rule 9:

This rule states "Deny any inbound modem call to an extension not in the authorized modem group, generate an email and pager notification, log the event." This rule alerts designated personnel of attempted access to modems which are not known to exist, or which are known, but have been placed into a group other that the authorized modem group responsive to policy violations (e.g., the unauthorized modem group, the modem content violation group, etc.).

Rule 10:

This rule states "Deny any outbound modem call from any extension not in the authorized modem group to any destination, generate an email and pager notification, log the event." This rule prevents modem calls from unknown modems on extensions dedicated to voice or fax use upon their first use. This rule also prevents use of known modems that have been placed into a group other that the authorized modem group responsive to policy violations (e.g., the unauthorized modem group, the modem content violation group, etc.).

Rule 11:

This rule states "Allow and record outbound fax calls from extensions in the fax-only group to any destination, monitor call content for fax keywords, log the event." This rule allows business as usual for facsimile use and implements the company policy to record and monitor the content of non- intra-enterprise fax calls.

Rule 12:

This rule states "Allow and record inbound fax calls to extensions in the fax-only group from any source, monitor call content for fax keywords, log the event." This rule allows business as usual for facsimile use and implements the company policy to record and monitor the content of non- intra-enterprise fax calls.

Rule 13:

This rule states "Log all inbound calls to extensions in the customer service group that are "hung up" before the call is connected, monitor for the presence of patterns of interest, generate a scheduled report each week." This rule is used to evaluate telephony and personnel resources in the customer service call center by logging and reporting in a weekly scheduled report, all inbound calls that are not connected due to lack of telephony resources (busy), or possible personnel resource/performance issues (unanswered).

Rule 14:

This rule states "Allow and record inbound voice calls to extensions in the customer service group, monitor call content for profane keywords, log the event." This rule allows business as usual for non- intra-enterprise calls to the customer service call center, logging the call for accounting and reports purposes, recording the calls for record purposes, and monitoring the content of the call for profane keywords that indicate a customer or personnel problem.

Rule 15:

This rule states "Allow and record outbound voice calls from extensions in the customer service group, monitor call content for profane keywords, log the event." This rule allows business as usual for non- intra-enterprise voice calls from the customer service call center, logging the call for accounting and reports purposes, recording the calls for record purposes, and monitoring the content of the call for profane keywords that indicate a customer or personnel problem.

Rule 16:

This rule states "Allow inbound voice calls from any source to extensions in the voice-only group, log the event." This rule allows business as usual for all non- intra-enterprise voice calls, while logging the call for accounting and report purposes.

Rule 17:

This rule states "Allow outbound voice calls from extensions in the voice-only group to any destination, log the event." This rule allows business as usual for non- intra-enterprise voice calls while logging the call for accounting and report purposes.

Rule 18:

This rule states "Deny any outbound call from the fax-only group that is not a fax call-type, generate an email, log the event." This rule alerts designated personnel to potential abuse of the fax lines, such as such as attempts to dial out on a fax line using a modem, or using the line for a voice call.

Rule 19:

This rule states "Deny any inbound call to extensions in the voice-only group that is not a voice call-type, generate an email, log the event." This rule alerts designated personnel to potential hacking attempts, such as war dialing.

Rule 20:

This catch-all rule states "Deny and log all calls from anywhere to anywhere at any time of any day, generate an email notification, log the event." At first glance, this rule seems counter-intuitive since it seems to deny any call from anywhere. This is not the case. Each rule is evaluated in sequential order, exiting immediately after any one rule matches the criteria. This rule is typically appended to log all denied calls that do not fit into any of the preceding rules. The firing of this rule may indicate that the security rule base 302 may not be properly configured, so an email to the system administrator is generated.

For the sake of clarity and simplicity, FIGS. 7A-D illustrate a single security rule base 302 containing rules that show all of the actions and tracking functions designated to be executed in response to a match with the designated call attributes. It is contemplated that a single security rule base 302 may be used, or various configurations of "action-specific" and "tracking function-specific" security rule bases 302 may be configured and contained within the security policy 202. Upon a rule-match within the action- or tracking-specific rule base, the system 10 executes the designated action or tracking function. For example, call attributes matching a rule in the "recording security rule base" causes the call content to be recorded and archived, pursuant to the recording security rule base. The same call attributes from the same call matching a rule in the "content monitoring security rule base" causes a TA request 328 and the TMAC device 12 monitors for designated keywords, pursuant to the content monitoring security rule base. Accordingly, it is further contemplated that various configurations of action-specific and tracking function-specific result response policies 304 may be configured and contained within the security policy 202.

Security Policy—Result Response Policy

FIGS. 8A, 8B, and 8C together illustrate portions of an exemplary result response policy, such as the result response policy 304, contained within the security policy 202 and configured for use by the system 10 in monitoring and/or controlling call access and telephony resources, as previously mentioned with reference to step 414 in FIG. 4A.

Configuring the result response policy 304 involves creating a set of response rules, collectively referred to as the result response policy 304, that defines what action(s) will be performed responsive to either the "adjust policy" action in the security rule base 302 rule, or the success or failure of a threat assessment.

The result response policy 304 defines "rules" that, based upon designated call attributes and assessment results, for example, the extension's "current group;" the "adjust policy attribute category/attribute" (i.e., the combined designated call attribute category and the associated designated call attribute, such as the category "destination" and the designated attribute "!engineering dial-up," which if matched in the fired security rule base rule containing "adjust policy" as a track function, initiates adjustment of the security policy); and/or the "TA attempt" that was performed on the call; and the "TA result" of the assessment attempt; implement an "action" (allow or deny the call); and initiate additional "tracking" actions and functions; with an option to automatically "adjust policy;" and the group the extension will "move to" if the policy is adjusted; as well as the location/identifier of the TMAC device 12 on which the result response rule is installed.

It is understood that the result response policy 304 shown in FIGS. 8A-C may include any number and types of rules, and that although not all possible call attributes are used in this example, rules may be constructed using any call attributes contained in the call log 204, as shown and described with reference to FIG. 2. Additionally, any combination of action(s), assessment(s), or tracking function(s) may be included in the result response policy 304, pursuant to the enterprise's security and resource management needs.

It is further understood that each rule is evaluated in sequential order, and the result response policy 304 is exited after any one rule matches the fired security rule base 302 rule criteria and/or the TA result 330. If multiple TA requests 228 are initiated by the fired security rule base rule (as is the case with security rule base Rule 1, by which TA requests 228 for authentication of an inbound call for remote access and call content monitoring for designated keywords are initiated), the initial response is determined based on the first TA result 330 received, and the result response policy 304 is exited after any one rule is matched. When the subsequent TA result 330 is received, (associated with the other TA requests 228), each rule in the result response policy 304, except for the rule already fired by the call's previous TA result 330, is re-evaluated in sequential order, in response to the subsequent TA result 330. Actions and track functions are performed based upon the rule matched with the subsequent TA result 330. If the call is no longer in progress when the subsequent TA result 330 is received, whether because the caller or called party has "hung up," or because the call was terminated, applicable actions and tracking functions associated with the rule fired by the subsequent TA result 330 are performed.

Referring now to FIGS. 8A-C, the result response policy (RRP) 304 Rules 1-7 are explained as follows:

Rule 1:

This rule states "Allow all modem calls from numbers in the maintenance dial-up group that are successfully authenticated, generate an email, log the event"; but "Deny all modem calls from numbers in the maintenance dial-up group that fail authentication, generate a page, log the event." This rule notifies designated personnel that remote access to system maintenance and monitoring modems is business as usual if access is successfully authenticated; but if access can not be authenticated, this rule denies access to the modem in the dial-up systems group and alerts designated personnel of a possible hacking attempt. This result response policy rule is applicable to security rule base Rule 1 in FIG. 7A.

Rule 2:

This rule states "Allow and log all modem calls on extensions in the dial-up systems group when content monitoring has failed to identify keywords from the modem keyword group in the call content"; but "Deny and log all modem calls on extensions in the dial-up systems group when content monitoring has successfully identified keywords from the modem keyword group in the call content, move the violating extension into the modem content violation group, generate an email and pager notification." This rule allows business as usual for dial-up systems group calls that do not contain designated modem keywords, while logging the event for reporting purposes; but if keywords are identified in the call content, this rule terminates the call and alerts designated personnel of the specific keyword identified. This result response policy rule is applicable to security rule base Rule 1 in FIG. 7A.

Rule 3:

This rule states "Move any extension that is in the engineering modem group whose destination dialed is not in the engineering dial-up group to the unauthorized modem group, generate an email, log the event." This rule helps to put "teeth" into the company's policy that modems will be used for business purposes only. This rule places the violating extension in a group listing that prevents future modem traffic until the need to dial an unauthorized destination is explained and the extension is relocated to the engineering modem group by the system administrator. This result response policy rule is applicable to security rule base Rule 6 in FIG. 7B.

Rule 4:

This rule states "Allow and log all modem calls on extensions in the authorized modem group when content monitoring has failed to identify keywords from the modem keyword group in the call content"; but "Deny and log all modem calls on extensions in the authorized modem group when content monitoring has successfully identified keywords from the modem keyword group in the call content, move the violating extension into the modem content violation group, generate an email and pager notification." This rule allows business as usual for authorized non- intra-enterprise modem group calls that do not contain designated modem keywords, while logging the event for reporting purposes; but if keywords are identified in the call content, this rule terminates the call and alerts designated personnel of the specific keyword identified. This result response policy rule is applicable to security rule base Rule 7 in FIG. 7B.

Rule 5:

This rule states "Allow and log all fax calls on extensions in the fax-only group when content monitoring has failed to identify keywords from the fax keyword group in the call content"; but "Deny and log all fax calls on extensions in the fax-only group when the content monitoring has successfully identified keywords from the fax keyword group in the call content, move the violating extension into the fax content violation group, generate an email and pager notification." This rule allows business as usual for fax calls that do not contain designated fax keywords, while logging the event for reporting purposes; but if keywords are identified in the call content, this rule terminates the call, alerts designated personnel of the specific keyword identified, and moves the extension from the fax-only group to the fax content violation group, which prevents future fax traffic. This result response policy rule is applicable to security rule base Rules 11 and 12 in FIG. 7C.

Rule 6:

This rule states "Allow and log all voice calls on extensions in the customer service group when content monitoring has failed to identify keywords from the profanity keyword group in the call content"; but "Allow and log all voice calls on extensions in the customer service group when the content monitoring has successfully identified keywords from the profanity keyword group in the call content, redirect a real-time copy of the call to the customer service supervisor listening station, generate an email and pager notification." This rule allows business as usual for voice calls that do not contain designated profanity keywords, while logging the event for reporting purposes; but if keywords are identified in the call content, this rule alerts designated personnel of the specific keyword identified, and redirects a real-time in-progress copy of the call to a designated listening station to allow the customer service supervisor to monitor the call. This result response policy rule is applicable to security rule base Rules 14 and 15 in FIG. 7D.

Rule 7:

This catch-all rule states "Deny, and log all calls on any extension, generate an email notification." At first glance, this rule seems counter-intuitive since it seems to deny any call on any extension, regardless of the threat assessment results. This is not the case. Each rule is evaluated in sequential order, exiting immediately after any one rule matches the criteria. This rule is typically appended to log all denied calls that do not fit into any of the preceding rules. The firing of this rule may indicate that the result response policy 304 may not be properly configured, so an email to the system administrator is generated.

Automatic Call Correlation

In order to enforce extension-based policy rules, it is necessary to know the source and destination telephone numbers/extensions for inbound and outbound calls. The source and destination telephone numbers/extensions for inbound and outbound calls are known when the line sensor is connected to direct connect lines or to lines on the station-side of the PBX 24, as in the case with the line sensors 16 and 18. When the line sensor is connected to lines on the trunk side of the PBX 24, for inbound calls, this information may be found on the trunks as CND or ANI, and dialed digits represented as DTMF or MF signaling tones. For outbound calls, it is common for PBXs to mask the actual originating number/extension, and send no number or a default number instead. The lack of this information prevents the system 10 from applying rules to inbound and outbound calls when those rules are based upon designated extensions. In these cases, the remote management server 40 uses a weighted correlation algorithm and SMDR or CDR from the PBX 24 to determine the missing information and enforce the security policy 202, as discussed below with reference to FIGS. 9, 10A, 10B, 10C, and 10D.

Figure 9:
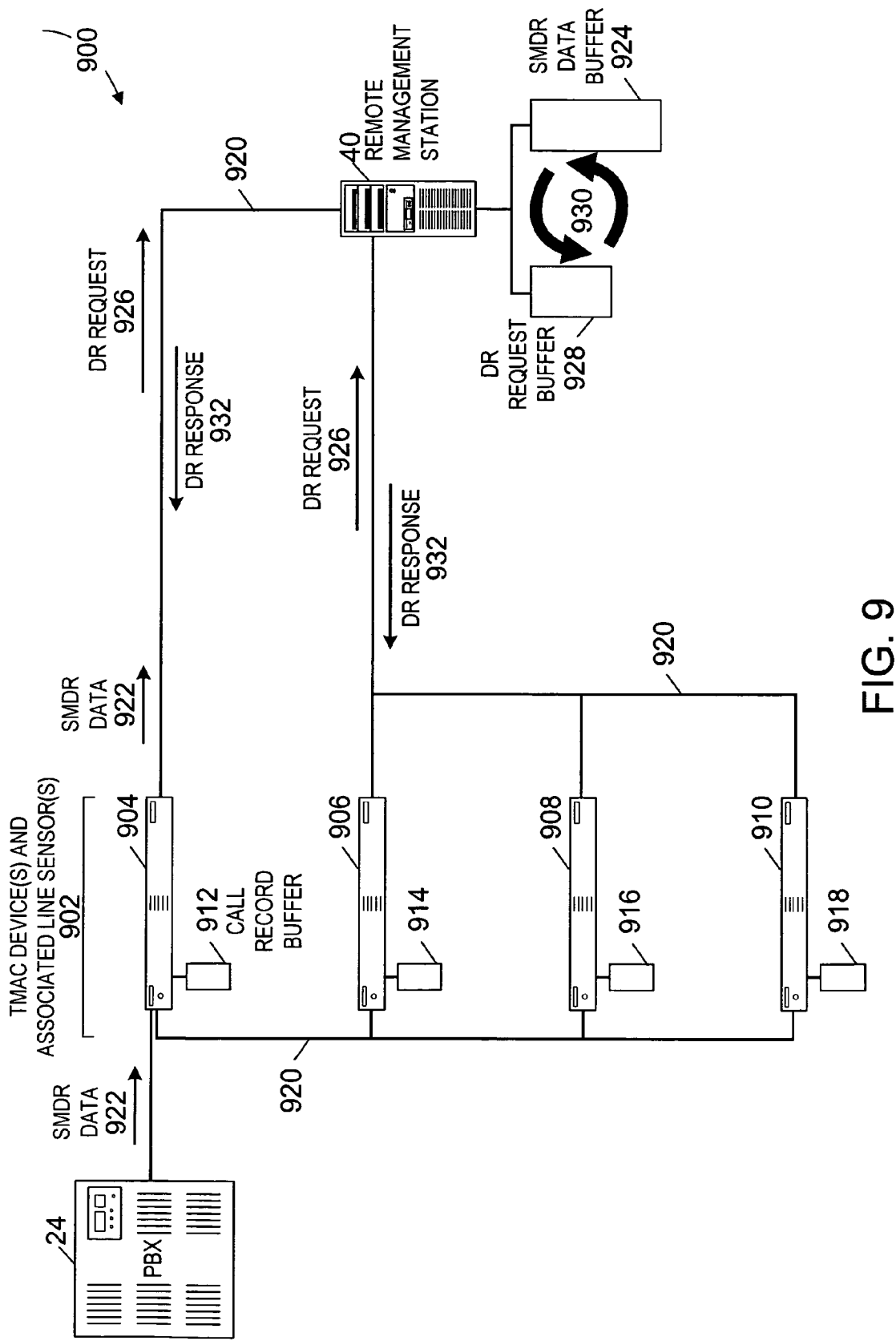
FIG. 9 is a schematic block diagram showing the resolution of missing extension information by the system of FIG. 1.

FIG. 9 shows a schematic block diagram 900 illustrating the resolution of missing extension information by the system 10 of FIG. 1. In one embodiment, the numeral 902 represents at least one of a group of TMAC device(s) 12 and its associated line sensor(s) 20 (not shown), deployed on the trunk side of the PBX 24, and referred to individually as a TMAC device 904, 906, 908, and 910. Each of the TMAC device(s) 904-910 includes a call record buffer 912, 914, 916, and 918 respectively.

An IP network 920 connects the PBX 24, devices 902, and remote management server 40. The device 904 represents the single, designated TMAC device that receives a SMDR data 922 output from the PBX 24. The device 904 routes the SMDR data 922 to the remote management server 40, which maintains the SMDR data 922 within a designated SMDR data buffer 924. When the TMAC device 902 sees a call, it determines the call attributes and creates call event records for the call using those determined attributes. The TMAC device 902 compares the attributes in the call event records to the sequential list of rules in the security rule base 302. If the call event records do not have sufficient information, or information deemed to be of sufficient fidelity to match rule criteria and fire a rule in the security rule base 302, the TMAC device 902 delays execution of policy enforcement on that call, stores the call event records in their respective buffer 912-918, and sends a Detailed Record request (DR request) 926 to the remote management server 40. The remote management server 40 stores the DR request 926 in a designated DR request buffer 928.

A correlation algorithm 930 compares the contents of the SMDR data buffer 924 and the DR request buffer 928 whenever one of the two buffers receives new data. The correlation algorithm 930 matches the known attributes of the call (contained in the DR request 926, and hence the DR request buffer 928), to the SMDR data 922 on that call contained in the SMDR data buffer 924. The DR request buffer 928 will typically be a subset of the calls that are contained in the SMDR data buffer 924, since the SMDR data buffer 924 receives the records of all calls of interest to the correlation algorithm 930 (i.e., records for internal calls may be omitted).

Because the attributes for the SMDR data 922 record vary, the correlation algorithm 930 is weighted to compare start time, source number (if known) or destination number (if known), trunk group, trunk, and channel ID. When the correlation algorithm 930 matches the DR request 926 to the appropriate SMDR data 922 record, the remote management server 40 removes the matching DR request 926 and the SMDR data 922 record from their respective buffers. The remote management server 40 sends a Detailed Record response (DR response) 932 containing the newly identified number/extension to the appropriate TMAC device 902.

The TMAC device 902 receives the DR response 932 and removes the appropriate call record from its call record buffer 912-918. The TMAC device 902 adds the previously missing information to the call records, and resumes policy enforcement on the call.

Some PBXs output the SMDR data 922 in near real-time, while others output the record after the call is complete. When the remote management server 40 receives the data in near-real-time, the remote management server 40 correlates the SMDR data 922 records with the contents of the DR request buffer 928 and the security policy 202 is enforced as soon as possible (in approx. 10 seconds). If the remote management server 40 receives the SMDR data 922 after the call is complete, it is not possible to terminate the call. In this case, the remote management server 40 still correlates the SMDR data 922 with the DR request 926 and applicable actions and track functions are performed in accordance with the security policy 202, such as logging the event, generating an email, adjusting the security policy, etc.

The remote management server 40 automatically deletes unmatched records remaining in the SMDR data buffer 924 and in the DR request buffer 928 after an administrator-configured period of time. Unresolved call records that remain in the call record buffer 912-918 after the designated period of time trigger an ambiguous rule notification by the TMAC device 902 to the remote management server 40. This notification informs the remote management server 40 that, for this specific call, it is not possible to execute the security policy 202. This notification is logged so the system administrator is made aware that rules may be set up incorrectly, or there may be an issue with the SMDR data coming from the PBX 24.

In the preferred embodiment of this invention, the TMAC device 904 receives SMDR records 922 from the PBX 24 and holds the records in an internal SMDR data buffer 924. The TMAC device 904 stores its own DR requests 926 in an internal DR request buffer 928, as well as DR requests 926 sent to it by the other TMAC devices 906, 908, and 910. Additionally, the TMAC device 904 runs the correlation algorithm 930, and compares the contents of its two buffers to provide missing number/extensions. In addition to acting as the central location for correlation of calls, the TMAC device 904 performs all monitoring and enforcement functions of the typical TMAC device.

In an alternate embodiment, the TMAC device 904 is dedicated to providing the missing number/extensions, and does not perform the typical monitoring and enforcement functions of the other TMAC devices 906, 908, and 910. It is understood that although the components of FIG. 1 are shown, distributed deployment is contemplated with all embodiments discussed within this document.

Detecting and Analyzing Call Activity and Security Policy Enforcement

FIGS. 10A, 10B, 10C, and 10D together illustrate a process flow diagram 1000 for detecting and analyzing call activity, determining missing extension information, and enforcing the security policy 202, as previously mentioned in connection with steps 418-448 in FIGS. 4B and 4C.

Figure 10A:
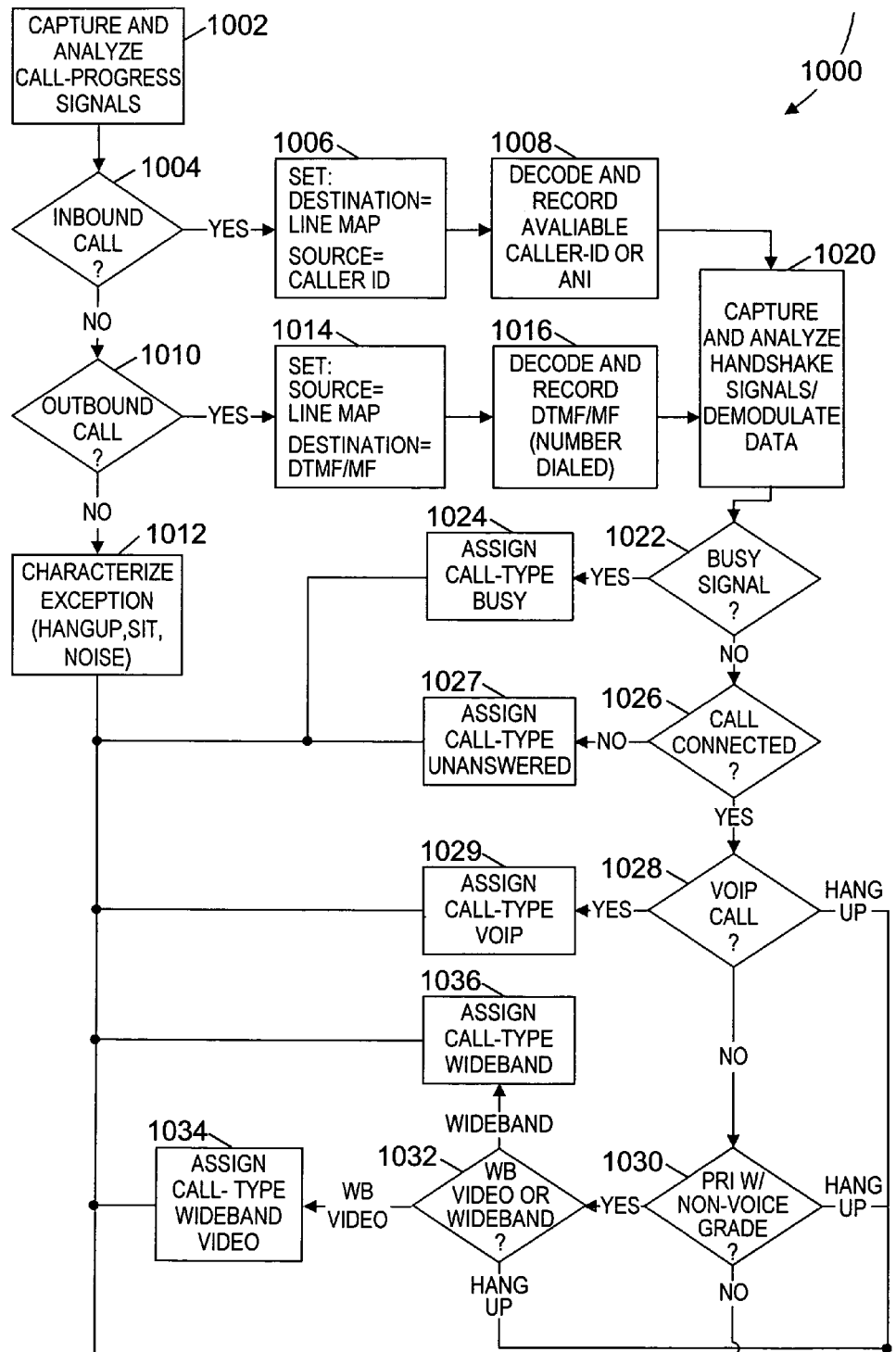
Figure 10B:
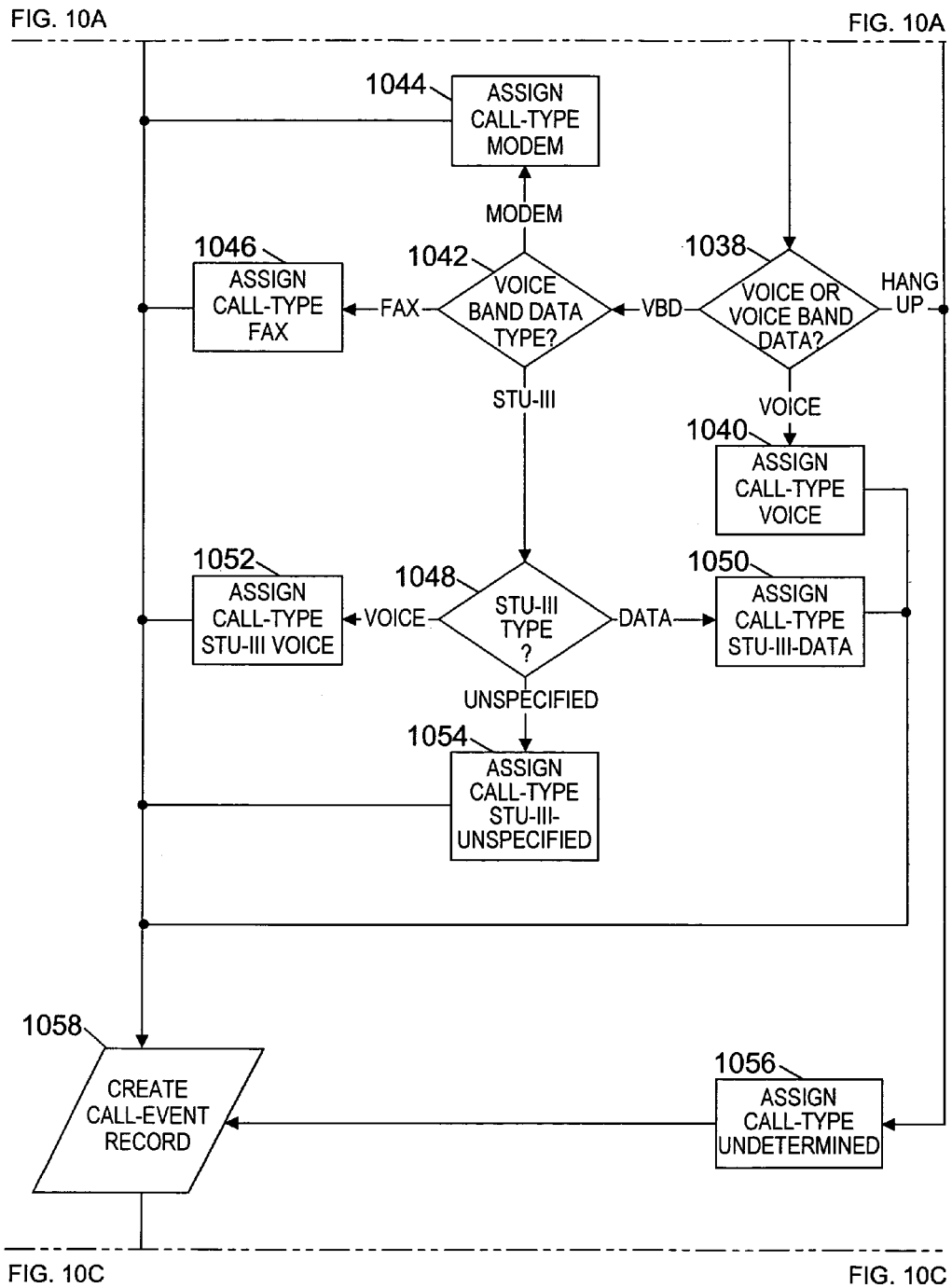

In FIGS. 10A and 10B, steps 1002-1058 illustrate that for each line that is monitored and/or controlled by the system 10, the TMAC device 12 captures and analyzes all available call attributes, then consolidates and reports details of the activity for further processing. In particular, in step 1002, call-progress signals on the line are captured and analyzed. In step 1004, a determination is made whether the call is an inbound call. If so, a call-initiation call event record is created for the call, and execution proceeds to step 1006, in which the destination is set equal to the line map (so the destination extension can be determined according to the line map), and the source is set equal to caller-ID (so that a caller identification device determines the source of the inbound call). In step 1008, the available caller-ID or ANI information is decoded and recorded, a call-attempt call event record is created for the call, and execution proceeds to step 1020.

Referring again to step 1004, if a negative determination is made, execution proceeds to step 1010, in which a determination is made whether the call is an outbound call. If a negative determination is made, execution proceeds to step 1012, in which an exception is characterized in a call-event record. If the call is outbound, a call-initiation call event record is created for the call, and execution proceeds to step 1014, in which the source is set equal to the line map (so the extension from which the call is made can be identified), and the destination is set equal to the dialed digits (indicating that the TMAC device 12 determines the destination of the call). In step 1016, the DTMF/MF signals are decoded and recorded to determine the number that was dialed, a call-attempt call event record is created for the call, and execution proceeds to step 1020, in which handshake signals are captured and analyzed and data is demodulated, in the case of both inbound and outbound calls.

In step 1022, a determination is made whether a busy signal is present on the line, and if so, execution proceeds to step 1024, in which the call-type of "busy" is assigned to the call. If the determination in step 1022 is negative, execution proceeds to step 1026, in which a determination is made whether the call is answered (connected). If the call source hangs up before the call destination answers, the determination is negative and the call-type of "unanswered" is assigned to the call in step 1027.

If a determination is made that the call is connected in step 1026, a call-connect call event record is created for the call, and execution then proceeds to steps 1028-1056, in which the TMAC device 12 discriminates the call-type of the call to be voice, fax, modem, VoIP, STU-III-voice, STU-III-data, STU-III unspecified, wideband (WB), wideband video (WB video), or undetermined. Various methods of call-type discrimination are contemplated, with various levels of acceptable certainty, depending upon an enterprise's desired level of telephony security and telephony resource management needs. Call-type discrimination may be a simple identification of modem call-type by process of elimination, or a more complex discrimination including use of filtered tonal events, raw signal frequency and energy indices, a discrimination state machine, and demodulated signal analysis, as shown and described in U.S. Pat. No. 6,718,024.

In steps 1028, 1030, 1032, 1038, 1042, and 1048, if the call source or call destination hangs up before the call-type is discriminated, execution proceeds to step 1056, in which the call-type "undetermined" is assigned to the call (shown at step 1028, 1030 and 1038, but not shown at step 1042 or 1048).

Now returning to step 1028, a determination is made whether the inbound/outbound call is VoIP, and if so, execution proceeds to step 1029, in which the call-type of "VoIP" is assigned to the call. If the determination in step 1028 is negative, execution proceeds to step 1030.

In step 1030, a determination is made whether the trunk type is ISDN/PRI, or if the trunk type is ISDN/PRI and the signal is carried on one voice-grade channel. If the determination in step 1030 is negative; specifically, the trunk type is not ISDN/PRI, or the trunk type is ISDN/PRI but the signal is carried on only one voice-grade channel, the call-type is not wideband or wideband video, and execution proceeds to step 1038. If in step 1030, a determination is made that the trunk is ISDN/PRI, and the line does have non-voice grade service (i.e., the line does have the bearer channel information transfer capability attribute of either "speech," "3.1 kHz audio," "video," "restricted data," "unrestricted data," or "unrestricted data with tones/announcements," and using multiple channels for the call signal), execution proceeds to step 1032, in which a determination is made whether the call-type is wideband video or wideband.

Now returning to step 1030, if a negative determination is made, specifically if the trunk type is not ISDN/PRI, or if the trunk type is ISDN/PRI but the signal is carried on only one voice-grade channel, the call-type is not wideband or wideband video, and execution proceeds to step 1038.

In step 1032, if the bearer channel information transfer capability attribute is "video," execution proceeds to step 1034, in which the call-type "wideband video" is assigned to the call. If in step 1032, the channel information transfer capability attribute is "speech," "3.1 kHz audio," "restricted data," "unrestricted data," or "unrestricted data with tones/announcements," execution proceeds to step 1036, in which the call-type "wideband" is assigned to the call. It is understood that although the assignment of the broader call-type of "wideband" is described in step 1036, the TMAC device 12 discriminates each information transfer capability attribute described above, and accordingly, may provide a more detailed discrimination and assignment of wideband (i.e., "speech," "3.1 kHz audio," "restricted data," "unrestricted data," or "unrestricted data with tones/announcements"), instead of simply "wideband" call-type, as it does with "wideband video" in step 1034.

Now returning to step 1038, a determination is made whether the call is voice or voice band data (VBD). If the determination is voice, execution proceeds to step 1040, in which the call-type "voice" is assigned to the call. If the determination is voice band data, execution proceeds to step 1042, in which a determination is made whether the voice band data is facsimile voice band data, modem voice band data, or STU-III voice band data. If a determination of modem voice band data is made in step 1042, execution proceeds to step 1044, in which the call-type "modem" is assigned to the call. If a determination of facsimile voice band data is made in step 1042, execution proceeds to step 1046, in which the call-type "fax" is assigned to the call. If a determination of STU-III voice band data is made in step 1042, execution proceeds to step 1048.

In step 1048, a determination is made whether the call is a STU-III unit encrypted voice or data transmission. If a determination of data is made in step 1048, execution proceeds to step 1050, in which the call-type "STU-III-data" is assigned to the call. If a determination of voice is made in step 1048, execution proceeds to step 1052, in which the call-type "STU-III-voice" is assigned to the call. If a discrimination of either STU-III voice or STU-III-data can not be made, execution proceeds to step 1054, in which the call-type "STU-III-unspecified" is assigned to the call.

Upon completion of steps 1012, 1024, 1027, 1029, 1034, 1036, 1040, 1044, 1046, 1050, 1052, 1054, or 1056, execution proceeds to step 1058, in which a call-type call event record is created for the call. Via the process of steps 1002-1056, call attributes for the call, including the source number (if known), destination number (if known), trunk group, trunk, and channel ID are determined, a discrimination between busy, unanswered, VoIP, wideband, wideband video, voice, fax, modem, STU-III-voice, STU-III-data, STU-III-unspecified, and undetermined call-types is performed, and call-type is assigned to the call in step 1058. These and all other available call attributes are consolidated in a concatenated call event record for use in enforcing the security policy 202. From step 1058, execution proceeds to step 1060 (FIG. 10C).

Referring now to FIG. 10C, in step 1060, the TMAC device 12 compares the determined call attributes in the concatenated call event record with rules in the security rule base 302 to execute the security policy 202. Steps 1062-1078 illustrate a process loop that is applied for each rule until one or more action(s), tracking function(s) and/or threat assessments is indicated by the current matched rule in step 1074. Although steps 1064-1072 refer to a match between the determined call attribute and the rule criteria of source, destination, call-type, protocol, date, and time, it is understood that the rules may include any boolean combination (AND, OR, NOT) of the call attributes and rule criteria discussed with reference to FIG. 2 and the call log 204. Rules are evaluated for a call in sequential order until either one rule matches all attributes in the call event record, or no rules match all the attributes.

In particular, in step 1064, a determination is made whether the source matches the rule criteria. If so, execution proceeds to step 1066, in which a determination is made whether the destination matches the rule criteria. If so, execution proceeds to step 1068, in which a determination is made whether the call-type matches the rule criteria. If so, execution proceeds to step 1070, in which a determination is made whether the datacom protocol matches the rule criteria. If so, execution proceeds to step 1072, in which a determination is made whether the date and time fall within the rule criteria. If so, execution proceeds to step 1074, in which the action(s), track function(s) and/or threat assessment(s) associated with the rule are performed. Execution terminates in step 1078.

Referring again to step 1064, if it is determined that the source does not match the rule criteria, execution proceeds to step 1080, in which a process loop is initiated for resolving missing extension information if the call event record does not contain the source extension and the rule being considered for execution does not have a source of "ANY" (i.e., the rule applies to a designated extension or group of extensions, hence requiring the call source be known in order to match the rule). Specifically, in step 1080, a determination is made whether the source extension is missing and the source in the current rule is not designated as "ANY." If not, execution proceeds to step 1076; otherwise, execution proceeds to step 1084 (FIG. 10D).

Referring again to step 1066, if it is determined that the destination does not match the rule criteria, execution proceeds to step 1082, in which a process loop is initiated for the resolution of missing extension information if the call event record does not contain the destination extension and the rule being considered for execution does not have a destination of "ANY" (i.e., the rule applies to a designated extension or group of extensions, hence requiring the call destination be known in order to match the rule). Specifically, in step 1082, a determination is made whether the destination extension is missing and the destination in the current rule is not designated as "ANY." If not, execution proceeds to step 1076; otherwise, execution proceeds to step 1084.

Referring again to steps 1068, 1070, 1072, 1080 and 1082, if a negative determination is made in any of these steps, execution proceeds to step 1076, in which a determination is made whether the current rule is the last rule in the security rule base 302 to be evaluated. If not, execution returns to step 1062 and the next rule is retrieved for comparison with the call attributes; otherwise, execution terminates in step 1078.

Figure 10D:
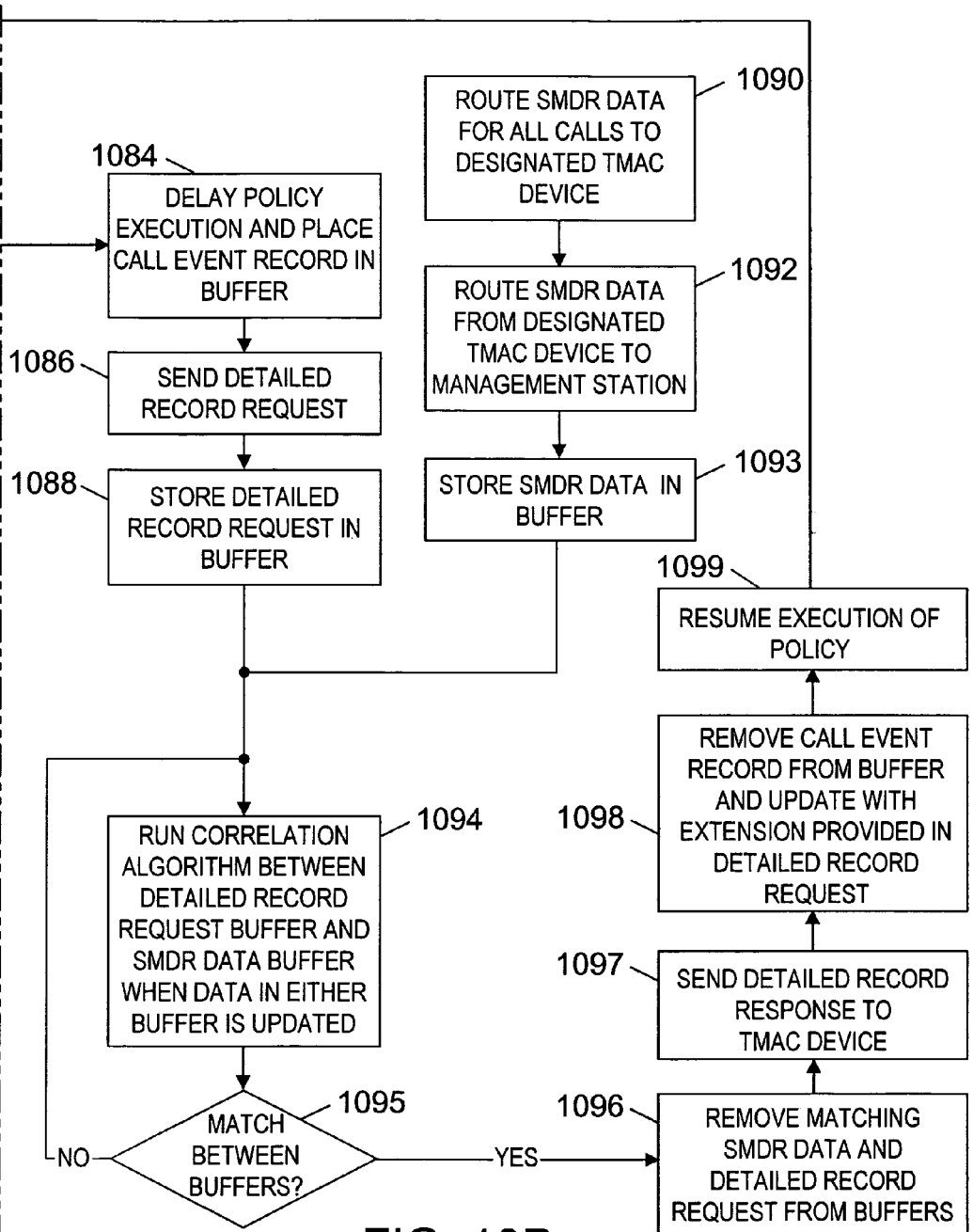

Referring now to FIG. 9 and FIG. 10D, steps 1084-1088 and 1090-1093 illustrate two processes whereby the remote management server 40 populates two buffers for use in determining missing extension information. Steps 1084-1088 illustrate the process whereby the at least one of a group of TMAC device(s) 12 and its associated line sensor(s) 20, hereafter referred to as the TMAC device 902, delays execution of the security rule base 302, moves the call event record to the call record buffer 912, 914, 916, or 918, and sends a DR request 926 to the DR request buffer 928. Steps 1090-1093 illustrate the process whereby the single, designated TMAC device 904 receives from the PBX 24, the SMDR data 922 for all calls and routes the data into the SMDR data buffer 924 in the remote management server 40.

Steps 1094 and 1095 illustrate the process whereby the correlation algorithm 930 compares the data in the DR request buffer 928 against the data in the SMDR data buffer 924, and looks for matches between the contents of the two buffers (step 1095). In step 1095, a determination is made whether a match has been found. If not, execution returns to step 1094 and the correlation algorithm 930 runs again when one of the two buffers receives new data; otherwise, execution proceeds to step 1096.

Steps 1096-1098 illustrate the process whereby the remote management server 40 removes the matching DR request 926 and SMDR data 922 from the buffers (step 1096), the TMAC device 902 receives the missing extension information in the DR response 932 (step 1097), and the TMAC device 902 uses the information to update the call event record (step 1098). In step 1099, the TMAC device 902 resumes the execution of the security policy 202 by applying the call attributes in the updated call event record with rules in the security rule base 302 until a match is found and one or more action(s), tracking function(s) and/or threat assessments is indicated for the current rule, as indicated in step 1074.

Although not shown in FIGS. 10A-10D, it is understood that call attribute detection and identification is continuous during the call. Suspicious call events, including change in call-type during a call and digits entered after call connection, are detected and a call-type change call event record or post-connection digits call event record is created. Pursuant to the security policy 202, actions responsive to change in call-type or digits entered after call connection are performed, otherwise, each rule in the security rule base 302, except for the rule already fired by the call's previous attribute, is re-evaluated in sequential order, using the updated call-type attributes. Actions and track functions are performed based upon the rule matched with the updated call attributes.

Policy-Based Response to Call Events and Threat Assessment Results

Figure 11A:
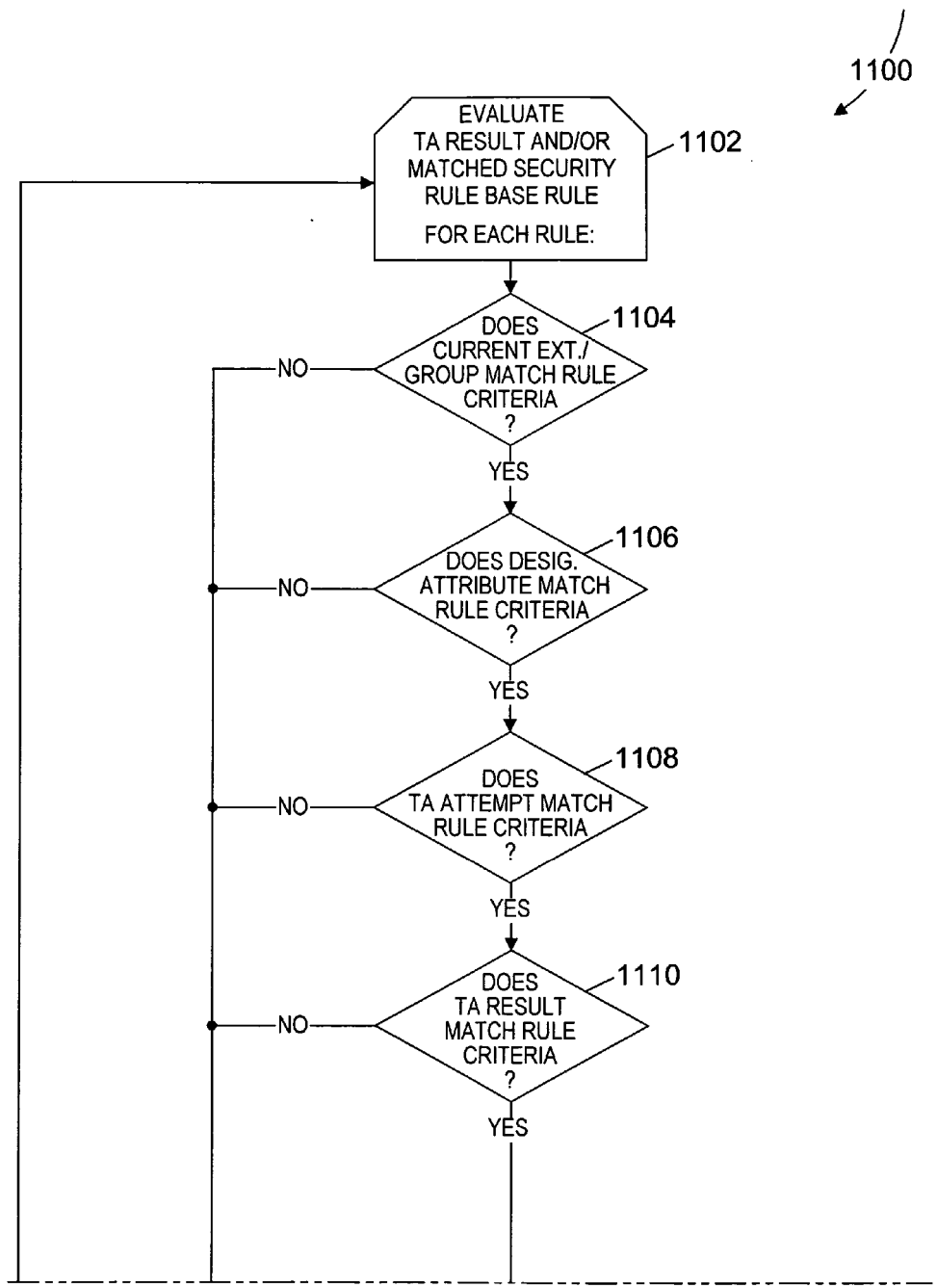
FIGS. 11A and 11B are a process flow diagram illustrating execution of the result response policy of FIGS. 8A-8C by the system of FIG. 1.
Figure 11B:
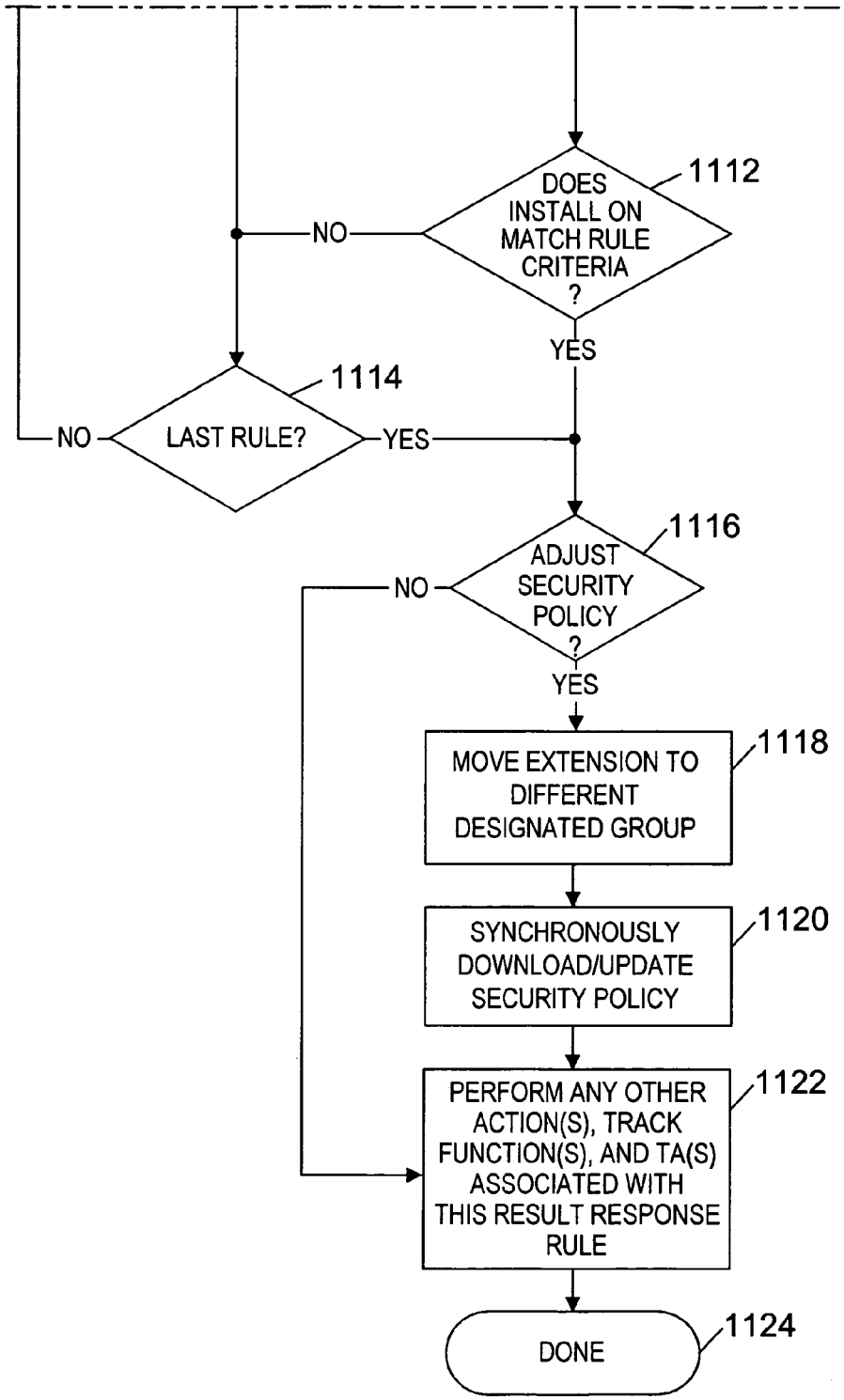

FIGS. 11A and 11B together illustrate a process flow diagram 1100 whereby the system 10 of FIG. 1 performs threat assessments, security policy adjustments, and additional actions and tracking functions pursuant to the result response policy 304 of the security policy 202, as previously discussed with reference to steps 438-448 in FIG. 4C.

In step 1102, the remote management server 40 compares the TA result 330 and/or the criteria of the fired security rule base 302 rule with the rules in the result response policy 304. Steps 1102-1114 illustrate a process loop that is applied for each result response policy 304 rule until a security policy adjustment and/or one or more action(s), tracking function(s), and/or TA(s) (steps 1116 and 1122), is indicated by the current rule. Result response policy 304 rules are evaluated in sequential order until either one rule matches all attributes in the TA result 330 and/or the fired security rule base 302 rule, or no rules match all criteria. The rules may include any boolean combination (AND, OR, NOT) of the call attributes and rule criteria discussed with reference to FIG. 2 and the call log 204. It is understood that the system 10 is capable of operating in a continuous loop, detecting and analyzing call activity while simultaneously performing appropriate actions in accordance with the result response policy.

In particular, in step 1104, a determination is made whether the extension or the current group containing the extension matches the rule criteria. If so, execution proceeds to step 1106, in which a determination is made whether the designated call attribute category and the designated attribute within the result response policy 304 rule matches the determined attribute of that category in the fired security rule base 302 rule, and, if the security rule base 302 rule contained "adjust policy" as a track function. If so, a match in step 1106 triggers a security policy adjustment in step 1116 that is not responsive to the TA result 330. Now, execution proceeds to step 1108, in which a determination is made whether the threat assessment attempt criteria matches the rule criteria. If so, execution proceeds to step 1110, in which a determination is made whether the TA result 330 matches the rule criteria. If so, execution proceeds to step 1112, in which a determination is made whether the TMAC device 12 location/identifier matches the "install on" rule criteria. If so, execution proceeds to step 1116.

Referring again to steps 1104, 1106, 1108, 1110, and 1112, if a negative determination is made in any of these steps, execution proceeds to step 1114, in which a determination is made whether the current rule is the last rule to be evaluated in the result response policy 304. If not, execution returns to step 1102 and the next rule is retrieved for comparison; otherwise, execution proceeds to step 1116.

In step 1116, a determination is made whether adjustment of the security policy 202 is designated by the fired security rule base 302 rule (step 1106) and/or the fired result response policy 304 rule. If so, execution proceeds to step 1118, in which the remote management server 40 moves the extension into a different, designated group, and execution proceeds to step 1120. In step 1120, the remote management server 40 synchronously downloads the updated security policy 202 to the TMAC device(s) 12 using that specific security policy 202. In step 1122, the action(s), track function(s) and/or additional threat assessment(s) associated with the fired result response policy 304 rule are performed. Execution is complete in step 1124.

Distributed Deployment

Figure 12:
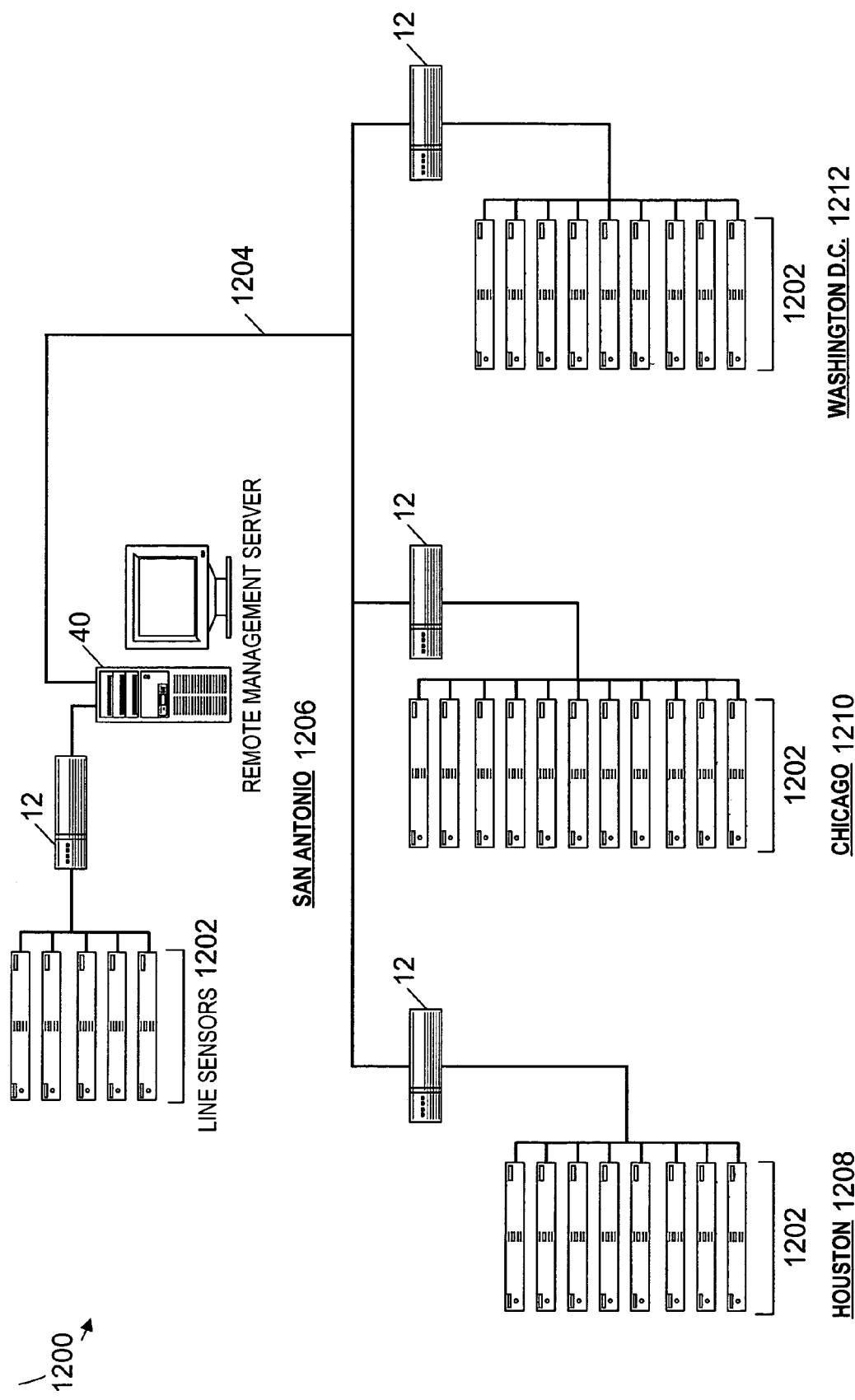
FIG. 12 is a schematic block diagram illustrating an exemplary distributed deployment of the system of FIG. 1.

In FIG. 12, reference numeral 1200 represents an alternative embodiment of the system 10 of FIG. 1, featuring a distributed deployment thereof. It is understood that although the components of FIG. 1 are shown, distributed deployment is contemplated with all embodiments discussed within this document.

Due to their distributed nature, many small- to medium-sized, distributed companies are challenged when trying to enforce a basic, uniform security policy across their entire organization. The distributed deployment of the system 1200 enables a distributed organization to limit duplication of effort and ensure consistent application of the security policy 202 across multiple locations. Although components of the system are necessarily distributed, policy can be designated centrally, and components controlled in a top-down fashion. In order to assess the company-wide security posture, detailed visibility into the telephony resources of the entire organization is provided by collection at the device level, reporting up the management chain, and centrally consolidating multiple reports for viewing, report filtering/configuration, and printing.

In FIG. 12, the numeral 1202 represents at least one of a group of line sensors 16, 18 and/or 20 connected the local TMAC device(s) 12, of which there may be several, controlled and managed via Transmission Control Protocol/Internet Protocol (TCP/IP) 1204 connections; e.g., over internal Local Area Networks (LANs), private Wide Area Networks (WANs), or the Internet; by a remote management server 40, strategically located at San Antonio 1206. The remote management server 40 supports the local TMAC device(s) 12 and line sensor(s) 1202, as well as distribution of one or more TMAC device(s) 12 and line sensor(s) 1202 in a remote location(s) Houston 1208, Chicago 1210, and Washington D.C. 1212.

With the embodiment depicted in FIG. 12, a geographically-separated organization can leverage security expertise in one central location by consolidating the security events and TA results 330 of the distributed TMAC device(s) 12 and associated line sensor(s) 1202 with the responses of the remote management server 40 located in San Antonio 1206. As previously discussed, depending upon an enterprise's specific security needs, different security policies 202 can be enforced at each location, all from the remote management server 40.

Multi-Tiered Policy-Based Enforcement of a Security Policy

Figure 13A:
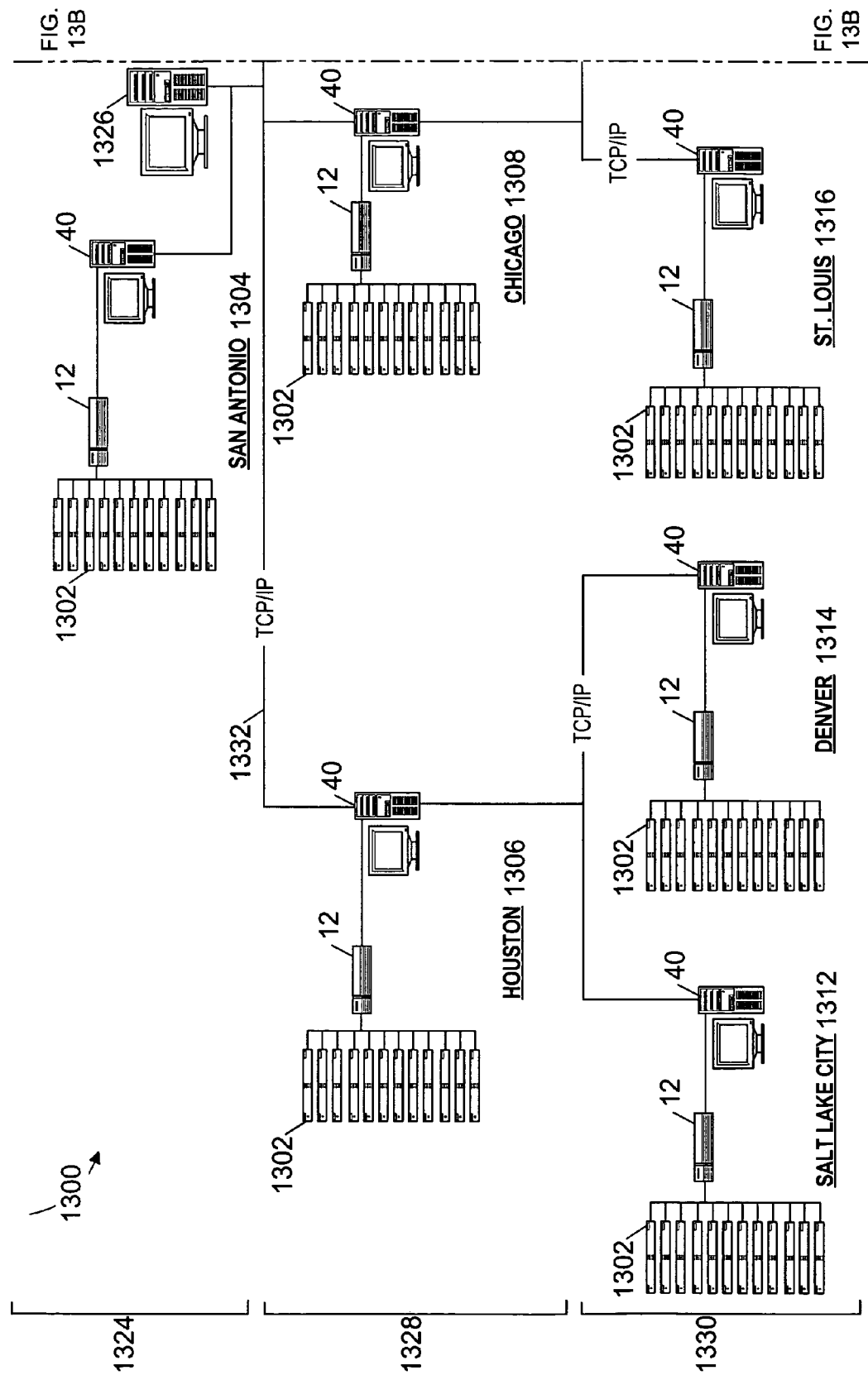
FIGS. 13A and 13B are a schematic block diagram illustrating deployment of the system of FIG. 1, whereby multi-tiered policy-based enforcement of a security policy is implemented across a large, globally distributed enterprise.
Figure 13B:
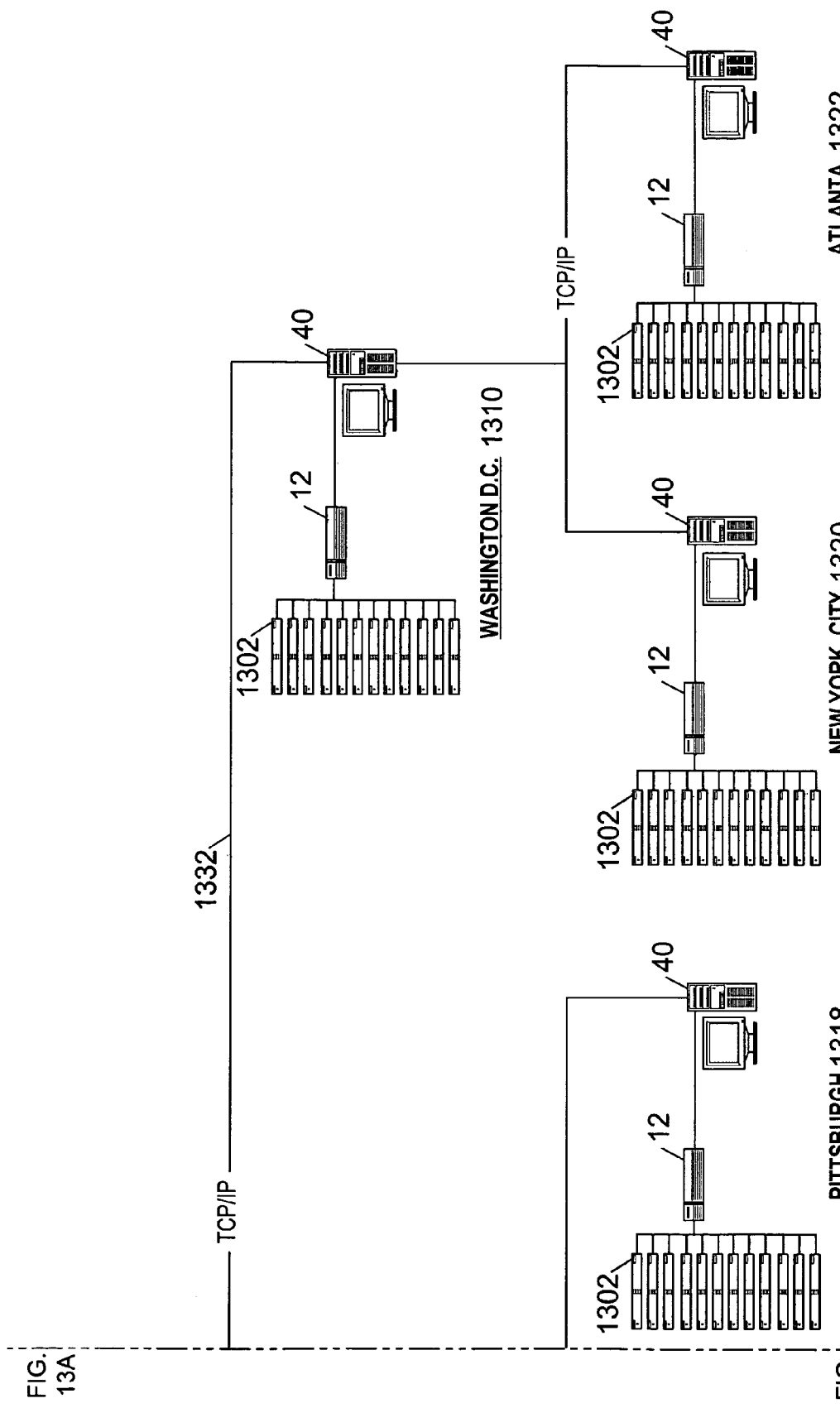

In FIGS. 13A and 13B, reference numeral 1300 represents an alternative embodiment of the system 10 of FIG. 1, featuring a system and method thereof for multi-tiered policy-based enforcement of a security policy 202 across a large, globally distributed enterprise. It is understood that although the components of FIG. 1 are shown, multi-tiered policy-based enforcement of a security policy is contemplated with all embodiments discussed within this document. It is further understood that although only three tiers are shown and discussed in FIGS. 13A and 13B, any number of tiers, in any configuration, may be used to implement multi-tiered policy-based enforcement of the security policy 202 across an enterprise. It is still further understood that although this system and method is explained in FIGS. 13A, 13B, and 16A-E, relative to the security rule base 302, it is applicable to the result response policy 304, and any other policy not mentioned herein, that may contain similar functional and operational characteristics.

The method of distributed deployment, previously shown and discussed with reference to FIG. 12, is applicable for a small- to medium-sized distributed organization, but processing all the security events from the hundreds of line sensors that would be deployed in a medium- to large-sized globally distributed enterprise would quickly overload the lone remote management server 40 located in San Antonio 1206 (FIG. 12). Additionally, the single management server 40 would not provide the enterprise's remote regional and branch locations any degree of control over, or visibility into, their own telephony resources or security status.

As illustrated in FIGS. 13A and 13B, the remote management server 40 installed at each location (such as San Antonio 1304, Houston 1306, Chicago 1308, Washington D.C. 1310, Salt Lake City 1312, Denver 1314, St. Louis 1316, Pittsburgh 1318, New York City 1320, and Atlanta 1322), divides traffic load and allows management and implementation of the telephony resource management and security policy 202 on a more localized basis. Unfortunately, if multiple independent systems 10 are deployed, it becomes difficult to ensure a uniform, basic resource management and security structure across the enterprise. Additionally, consolidation of local logging information to provide visibility at the highest corporate level into important regional and branch local security events is difficult and labor-intensive.

Multi-tiered policy-based enforcement of the security policy 202 within a distributed architecture ensures implementation of a uniform, basic, enterprise-wide resource management and access security policy with a degree of localized policy control, and provides automatic security event log consolidation, and hence and visibility into only important local resource or security events to the highest corporate level.

As shown in FIGS. 13A and 13B, within a multi-tiered management environment, at a "corporate" level 1324, a remote management server 1326 oversees its own local management server 40 at San Antonio 1304, as well as a "regional" level 1328 remote management server 40 at Houston 1306, Chicago 1308, and Washington D.C. 1310. These regional remote management servers 40 oversee one or more "branch" level 1330 remote management servers 40 at Salt Lake City 1312, Denver 1314, St. Louis 1316, Pittsburgh 1318, New York City 1320, and Atlanta 1322.

Each remote management server 40 within the multi-tiered environment enforces the security policy 202 for its one or more local TMAC device(s) 12 and associated group of one or more line sensors 16, 18 and/or 20 (represented by the numeral 1302), and in accordance with the remote management server 40 tier position, may also oversee remote management server(s) 40, TMAC device(s) 12, and line sensors 1302 subordinate to it. Each enterprise location is connected via TCP/IP 1332 connections (e.g., over internal LANs, private WANs, or the Internet). For the purpose of clarity and simplification, the following examples pertain to the corporate level 1324 remote management server 1326 in San Antonio 1304 which oversees the local remote management server 40 in San Antonio 1304, and the regional level 1328 remote management server 40 in Houston 1306, which oversees the branch level 1330 remote management servers 40 in Salt Lake City 1312 and Denver 1314.

Just as a chief executive officer of a company imparts guidelines of conduct to his vice presidents, who in turn impart fundamentally similar guidelines to their directors and managers, so does the corporate level 1324 remote management server 1326 define a basic resource and security policy to the local remote management server 40 in San Antonio 1304 and the regional level 1328 remote management server 40 in Houston 1306, that in turn disseminates a fundamentally similar resource and security policy to the branch level 1330 remote management server 40 at Salt Lake City 1312 and Denver 1314.

The corporate-designated resource and security policy contains basic rules for the security rule base 302, and when applicable, the result response policy 304. These rules are classified as either "required" or "optional." Each level of the hierarchical environment must adhere to a required rule, but can choose to ignore optional rules. Each level of the tier is capable of making their local rules. Each level of the tier is capable of making the rules for the tiers below them more stringent than the corporate-designated rules, but can not make the rules more lax. In this way, a uniform, basic security structure is ensured across the enterprise.

Additionally, the corporate-designated resource and security policy designates what information will be reported upward, thereby providing visibility into only the most important local resource and security events to the corporate level. Just as the corporate-designated rules send resource and security guidelines that may become more stringent as they are passed downward, the policy institutes an information filter that becomes more selective as email, logs, and reports, etc., are routed upward. The tasks in the "Track" column of the corporate-designated rule (such as email notification, pager notification, logging of event, etc.), that are of interest at a local level but are not of interest at higher levels, are designated to be filtered out if notification of a rule firing is designated to be routed up the tier to the corporate level 1324 remote management server 1326. All logging is real-time, both at the location where the event occurs and at upper levels of the organization which, in accordance with the resource and security policy, require notification of the event.

FIGS. 14A, 14B, 14C, 14D, and 14E together illustrate portions of an exemplary security rule base, such as the security rule base 302, configured for use by the system 10 in implementing multi-tiered policy-based enforcement of the security policy 202. As previously mentioned with respect to step 412 in FIG. 4A, and the security rule base 302 shown in FIGS. 7A-D, rules based upon call attributes implement an "action" (allow or deny), may initiate additional actions, threat assessments, and tracking functions. As shown in FIGS. 14A-E, when implementing multi-tier policy-based enforcement, the call attributes in the security rule base 302 and result response policy 304 rules are expanded to include "class," a classification of adherence to a rule as either required (R), optional (O), or local (L). Any rule that is not a corporate-designated rule will be designated as a local (L) rule. Additionally, if notification of a call event and the associated matched rule "firing" is to be routed up the tier to the superior remote management server 40, for example, to the corporate level 1324 remote management server 1326, the tracking function "route" appears in the "track" column, thereby designating that when the regional level 1328 remote management server 40 is notified by the subordinate branch level 1330 remote management server 40 that a rule has fired, the notification will be routed upward to the next higher-tiered remote management server 40, the corporate level 1324 remote management server 1326. Also, if notification of a rule "firing" is to be routed upward, tasks listed in the "track" column are designated to be filtered "(F)" if execution of the task should take place only at the location where the rule originally fired, and should not also be routed upward. By filtering the tasks in the "track" column, the policy designates which tasks (such as alerts and event logging), will be performed at each level of the tier, when a rule "fires" at a subordinate level of the tier.

Rules 1-20 are explained as follows, it being understood that the security rule base 302 for multi-tiered policy-based enforcement of the security policy shown in FIGS. 14A-E may include any number and types of rules, and that each rule is evaluated in sequential order, exiting after any one rule matches the call criteria.

Rule 1:

This rule states "Allow, record, and authenticate remote access for any inbound modem call from any number in the maintenance dial-up group to any extension in the dial-up systems group, monitor call content for modem keywords, generate email, log the event." Adherence to this rule is required. Since the firing of this rule is not of interest to the upper echelon, upper levels of the tier will not be notified that this rule has fired. However, negative results of the TA authenticating access of the inbound call, pursuant to the result response policy 304, would be of interest, and would be reported upward.

Rule 2:

This rule states "Deny any inbound modem call from sources not in the maintenance dial-up group to extensions in the dial-up systems group, generate an email and pager notification, log the event." Adherence to this rule is required. This rule restricts inbound modem calls to authorized maintenance sources. Since this rule alerts designated personnel to potential hacking attempts, it is of interest to the upper echelon. As notification of the rule "firing" is made at each upper level of the hierarchy, the event will be logged, but the email, and pager notifications will be filtered out, as designated by (F), and performed only at the location where the line sensor 1302 notifies the remote management server 40 that the rule has fired.

Rule 3:

This rule states "Deny any outbound modem call from extensions in the dial-up systems group to any destination, generate an email and pager notification, log the event." This rule alerts designated personnel to unauthorized in-house use of modems dedicated for dial-up system maintenance and monitoring. Adherence to this rule is required. This rule prevents outbound modem calls on lines that would have no authorized outbound calling. Since the firing of this rule is an indication of the security posture, it is of interest to the upper echelon. As notification of the rule firing is made at each upper level of the hierarchy, the event will be logged, but all other tracking tasks will be filtered out.

Rule 4:

This rule states "Allow, encrypt and conduct within a VPSTN, outbound voice, fax and modem calls from extensions in the voice-only, fax-only, and authorized modem groups to extensions in the branch offices voice-only group, branch offices fax-only group, and branch offices authorized modem groups, log the event." Adherence to this rule is required. This rule allows business as usual for intra-enterprise communication. Firing of this rule is not a security matter. Since the firing of this rule is not of interest to the upper echelon, upper levels of the tier will not be notified that this rule has fired.

Rule 5:

This rule states "Allow, encrypt and conduct within a VPSTN, inbound voice, fax and modem calls to extensions in the voice-only, fax-only, and authorized modem groups from extensions in the branch offices voice-only, branch offices fax-only, and branch offices authorized modem groups, log the event." This rule implements the company policy to conduct intra-enterprise voice, fax, and modem calls within a VPSTN. This rule also implements the company policy to monitor all call event records for the presence of patterns of interest. Adherence to this rule is required. This rule allows business as usual for intra-enterprise communication. Firing of this rule is not a security matter. Since the firing of this rule is not of interest to the upper echelon, upper levels of the tier will not be notified that this rule has fired.

Rule 6:

This rule states "Deny any outbound modem call from extensions in the engineering modem group to any destination that is not in the engineering dial-up group, adjust the security policy, generate an email and pager notification, log the event." This rule restricts outbound modem calls to only destination numbers of known business contacts, and alerts designated personnel to unauthorized use of modems. Adherence to this rule is required. This rule restricts outbound modem calls to known business contacts, alerts designated personnel to unauthorized use of modems and records the call for evidentiary purposes. Violation of this rule is a misuse of company time and resources but is considered a local resource issue, so upper levels of the tier will not be notified that this rule has fired.

Rule 7:

This rule states "Allow and record, outbound modem calls from extensions in the engineering modem group to numbers in the engineering dial-up group, monitor call content for modem keywords, log the event." This rule allows business as usual for authorized modem use and implements the company policy to record and monitor the content of non- intra-enterprise modem calls. Adherence to this rule is required. This rule allows business as usual for authorized non- intra-enterprise modem calls. Firing of this rule is not a security matter. Since the firing of this rule is not of interest to the upper echelon, upper levels of the tier will not be notified that this rule has fired.

Rule 8:

This rule states "Allow and record, inbound modem calls from authorized outside sources in the authorized dial-up group to extensions in the authorized modem group, monitor call content for modem keywords, log the event." Adherence to this rule is required. This rule allows business as usual for authorized modem use with known business contacts. Firing of this rule is not a security matter. Since the firing of this rule is not of interest to the upper echelon, upper levels of the tier will not be notified that this rule has fired.

Rule 9:

This rule states "Deny any inbound modem call to an extension not in the authorized modem group, generate an email and pager notification, log the event." Adherence to this rule is required. This rule alerts designated personnel to attempted access to modems which should not exist, or have violated policy, and therefore indicates unauthorized modems and/or a possible hacking attempt. Since the firing of this rule is an indication of the security posture, it is of interest to the upper echelon. As notification of the rule firing is made at each upper level of the hierarchy, the event will be logged, but all other tracking tasks will be filtered out.

Rule 10:

This rule states "Deny any outbound modem call from any extension not in the authorized modem group to any destination, generate an email and pager notification, log the event." Adherence to this rule is required. This rule prevents modem calls from unknown modems on extensions dedicated to voice or fax use upon their first use. This rule also prevents use of known modems that have been placed into a group other that the authorized modem group responsive to policy violations (e.g., the unauthorized modem group, the modem content violation group, etc.). Since the firing of this rule is an indication of the security posture, it is of interest to the upper echelon. As notification of the rule firing is made at each upper level of the hierarchy, the event will be logged, but all other tracking tasks will be filtered out.

Rule 11:

This rule states "Allow and record outbound fax calls from extensions in the fax-only group to any destination, monitor call content for fax keywords, log the event." Adherence to this rule is required. This rule allows business as usual for facsimile use and implements the company policy to record and monitor the content of non- intra-enterprise fax calls. Firing of this rule is not a security matter. Since the firing of this rule is not of interest to the upper echelon, upper levels of the tier will not be notified that this rule has fired.

Rule 12:

This rule states "Allow and record inbound fax calls to extensions in the fax-only group from any source, monitor call content for fax keywords, log the event." Adherence to this rule is required. This rule allows business as usual for facsimile use and implements the company policy to record and monitor the content of non- intra-enterprise fax calls. Firing of this rule is not a security matter. Since the firing of this rule is not of interest to the upper echelon, upper levels of the tier will not be notified that this rule has fired.

Rule 13:

This rule states "Log all inbound calls to extensions in the customer service group that are "hung up" before the call is connected, monitor for the presence of patterns of interest, generate a scheduled report each week." Adherence to this rule is optional. This rule is used to evaluate telephony and personnel resources in the customer service call center by logging and reporting in a weekly scheduled report, all inbound calls that are not connected due to lack of telephony resources (busy), or possible personnel resource/performance issues (unanswered). Since this rule helps to assess telephony and personnel resources, but the state of resources is more of a local management issue, upper levels of the tier will not be notified that this rule has fired.

Rule 14:

This rule states "Allow and record inbound voice calls to extensions in the customer service group, monitor call content for profane keywords, log the event." Adherence to this rule is optional. Since this rule alerts management of profane exchanges during a customer service call, it is more of a local management issue than a network security event, therefore the rule is not required. Since firing of the rule is not of interest to the upper echelon, upper levels of the tier will not be notified that this rule has fired.

Rule 15:

This rule states "Allow and record outbound voice calls from extensions in the customer service group, monitor call content for profane keywords, log the event." Adherence to this rule is optional. Since this rule alerts management of profane exchanges during a customer service call, it is more of a local management issue than a network security event, therefore the rule is not required. Since firing of the rule is not of interest to the upper echelon, upper levels of the tier will not be notified that this rule has fired.

Rule 16:

This rule states "Allow inbound voice calls from any source to extensions in the voice-only group, log the event." Adherence to this rule is optional. This rule allows business as usual for all non- intra-enterprise voice calls, while logging the call for accounting and report purposes. Since this rule will allow business as usual, upper levels of the tier will not be notified that this rule has fired.

Rule 17:

This rule states "Allow outbound voice calls from extensions in the voice-only group to any destination, log the event." Adherence to this rule is optional. This rule allows business as usual for non- intra-enterprise voice calls while logging the call for accounting and report purposes. Since this rule will allow business as usual, upper levels of the tier will not be notified that this rule has fired.

Rule 18:

This rule states "Deny any outbound call from the fax-only group that is not a fax call-type, generate an email and pager notification, log the event." Adherence to this rule is required. This rule alerts designated personnel to potential abuse of the fax lines, such as such as attempts to dial out on a fax line using a modem, or using the line for a voice call. Since the firing of this rule is an indication of the security posture, it is of interest to the upper echelon. As notification of the rule firing is made at each upper level of the hierarchy, the event will be logged, but all other tracking tasks will be filtered out.

Rule 19:

This rule states "Deny any inbound call to extensions in the voice-only group that is not a voice call-type, generate an email, log the event." Adherence to this rule is required. This rule alerts designated personnel to potential hacking attempts, such as war dialing. Since the firing of this rule is an indication of the security posture, it is of interest to the upper echelon. As notification of the rule firing is made at each upper level of the hierarchy, the event will be logged, but all other tracking tasks will be filtered out.

Rule 20:

This catch-all rule states "Deny, and log all calls from anywhere to anywhere at any time of any day, generate an email notification." Adherence to this rule is required. This rule is typically appended to log all denied calls that do not fit into any of the preceding rules. The firing of this rule may indicate that the security rule base 302 may not be properly configured. Since the firing of this rule is an indication of the security posture, it is of interest to the upper echelon. As notification of the rule firing is made at each upper level of the hierarchy, the event will be logged, but all other tracking tasks will be filtered out.

Figure 15:
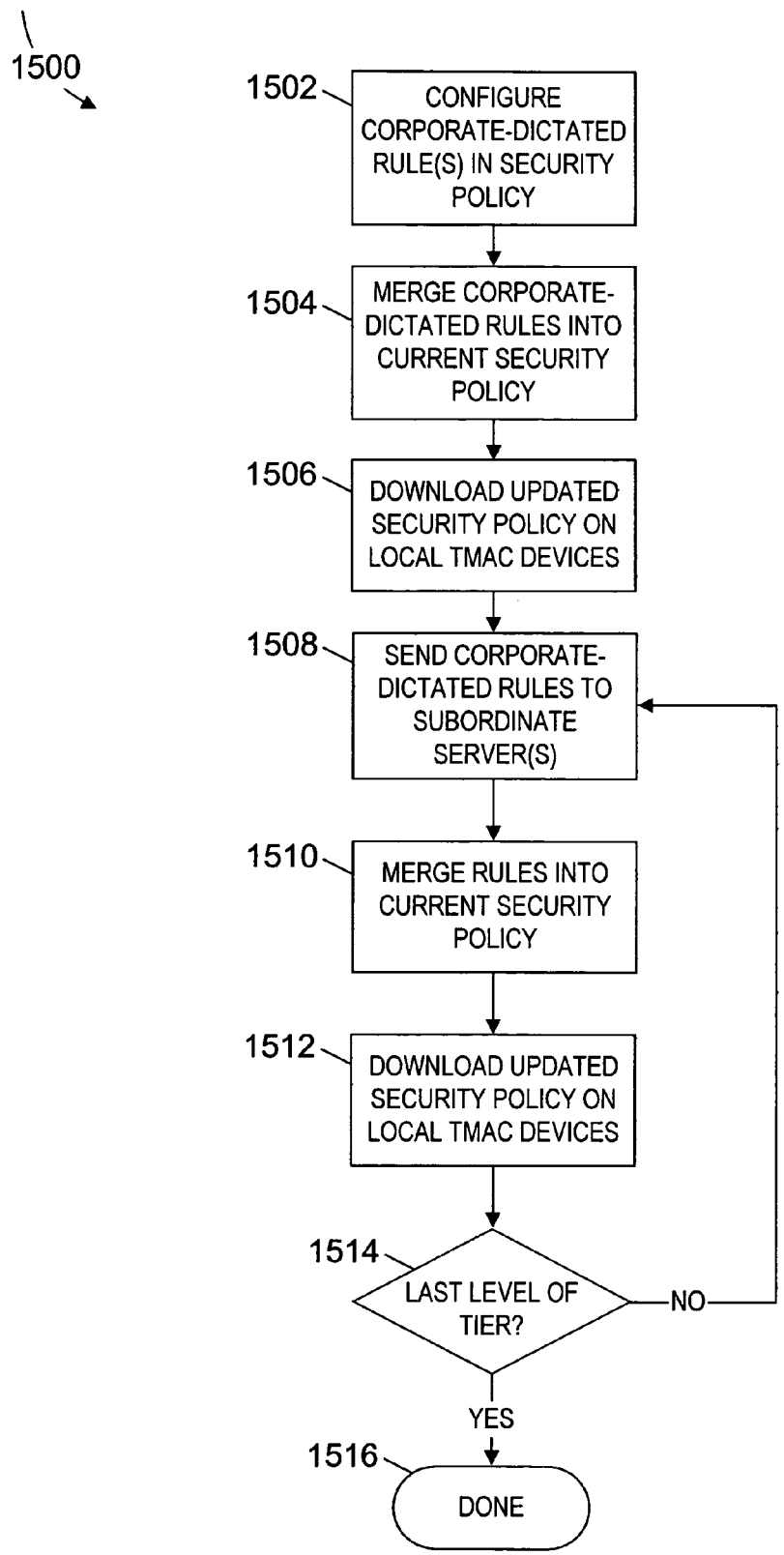
FIG. 15 is a process flow diagram illustrating the implementation of multi-tiered policy-based enforcement of the security policy by the system of FIGS. 13A and 13B.

FIG. 15 is a process flow diagram 1500 illustrating the implementation of multi-tiered policy-based enforcement of the security policy 202. It is understood that this process can be implemented during step 412 and 414 of the installation, configuration and operation process discussed previously in FIGS. 4A and 4B, or at any time afterward, since the corporate-designated rules have priority over and remove any conflicting local rule.

Referring to FIG. 15, in step 1502, corporate-designated security policy 202 rules, similar to those described previously with reference to FIGS. 14A-E, which are to be distributed from the corporate level 1324 remote management server 1326 downward to each remote management server 40 at the regional level 1328, and from there to the remote management servers 40 at the branch level 1330, are configured. In step 1504 the corporate-designated rules are merged into the current security rule base 302 and result response policy 304 of the security policy 202 contained in the remote management server 40 at the corporate level 1324. As mentioned previously, the corporate-designated rules have priority over and remove any conflicting rules. In step 1506, the updated security policy 202 is downloaded to the local corporate level 1324 TMAC device 12.

Steps 1508-1514 illustrate a recursive process by which the updated security policy 202 is downloaded to each remote management server 40 and its associated TMAC device(s) 12 on each level of the tier, until the process has been performed on the lowest level of the tier. For example, in step 1508, the updated security policy 202 is sent to the regional level 1328 remote management server 40 in Houston 1306. In step 1510, the new corporate-designated rules are merged with the currently existing rules in the Houston 1306 remote management server 40. In step 1512, the updated security policy 202 is downloaded to the local TMAC device(s) 12 of the Houston 1306 remote management server 40. In step 1514, a determination is made whether the current level (in this case, the Houston 1306 remote management server 40 level 1328) is the last level of the tier, or whether it has supervisory responsibilities over other remote management servers 40, such as those on the branch level 1330. If a negative determination is made, if the current level is not the last level of the tier (i.e., the current remote management server 40 has supervisory responsibilities), execution returns to step 1508, and steps 1508-1512 will be repeated, as will be the case for the dissemination of the new security policy 202 to the remote management servers 40 in Salt Lake City 1312 and Denver 1314. If a positive determination is made in step 1514, that is, when the corporate-designated rules have been disseminated to the remote management servers 40 and the TMAC device(s) 12 populating each level of the tier, the process is complete and execution terminates in step 1516.

It should be understood that the rules comprising this basic security structure can be modified and sent down the tier at any time. While the corporate-designated rules can be modified completely at the corporate level 1324 and pushed downward, the system administrators on other levels, such as the regional level 1328, can only accept the rules "as is" or make the rules to be sent downward to the branch level 1330 more stringent.

Figure 16:
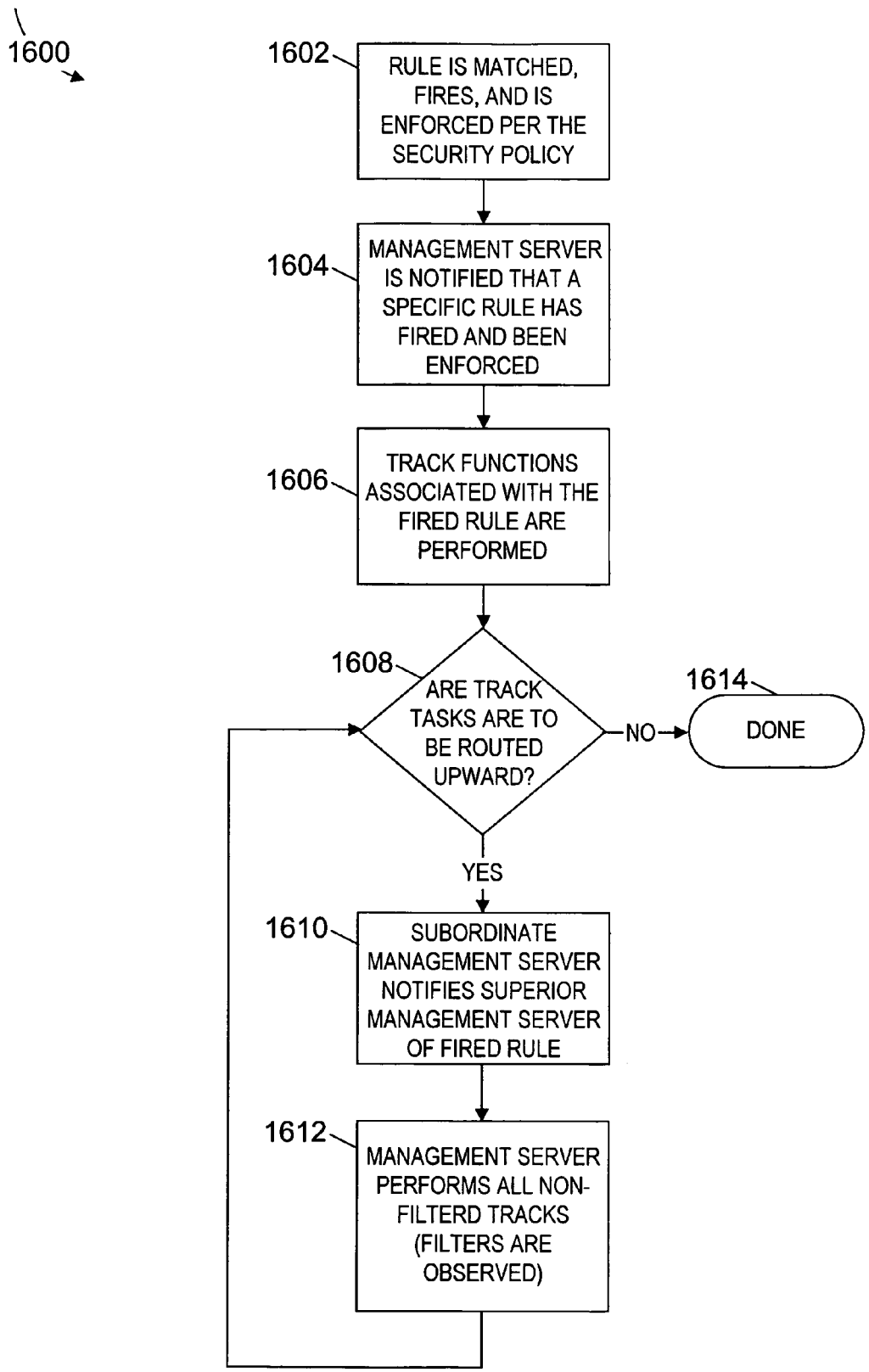
FIG. 16 is a process flow diagram illustrating the implementation of the multi-tiered policy-based enforcement of upward routing and filtering on "Track" tasks by the system of FIGS. 13A and 13B.

FIG. 16 is a process flow diagram 1600 illustrating the implementation of filtering on logging and execution of other tracking functions, such as additional actions (other than allow and deny), alert notifications, and logging in a multi-tiered management environment. It is understood that this filtering process can be applied to any task that may occur in the "track" column of the security rule base 302 or result response policy 304 for execution during step 426, 428, 444, and/or 448 of the operation process discussed previously in FIGS. 4A, 4B, and 4C. Although the following discussion may describe steps relative to the security rule base 302 rules, it is understood that the process 1600 is applicable to the result response policy 304 rules as well.

Referring to FIG. 16, in step 1602 call attributes are matched against the sequential list of rules in the security rule base 302 contained within the security policy 202. When attributes of a call match all criteria in the rule, the rule fires and is enforced. In step 1604, the TMAC device 12 notifies the remote management server 40 that the specific rule has fired, and that the rule has been enforced. In step 1606, in accordance with the fired rule, the tasks designated in the "track" column of the rule are executed, which include the remote management server 40 generating email, pager, console messaging, and SNMP trap notifications, and logging the event.

Steps 1608-1612 illustrate a recursive process by which the remote management server 40 on each level of the multi-tiered hierarchy receives notification of the rule firing, executes non-filtered "track" tasks for the rule, and notifies its supervisory remote management server 40 that the rule has fired, until the notification reaches the top level of the tier. For example, in step 1608, a determination is made whether the fired rule is a corporate-designated rule, and whether notification of the rule firing will be routed up the tier in accordance with the "route" task in the track column. If so, execution proceeds to step 1610, in which the remote management server 40 sends a notification of the rule firing to its supervisory remote management server 40. Execution then proceeds to step 1612, in which, upon receiving notification routed from a subordinate remote management server 40 that a rule has fired, the supervisory remote management server 40 executes its track tasks in the rule that are not filtered, such as logging, and then routes a notification of the rule firing to its supervisory remote management server 40. Execution then returns to step 1608. This recursive process continues until the notification and logging reach the corporate level 1324 remote management server 1326 which consolidates all logging and reports for the entire enterprise. Referring again to step 1608, if a negative determination is made, execution terminates in step 1614.

Figure 17:
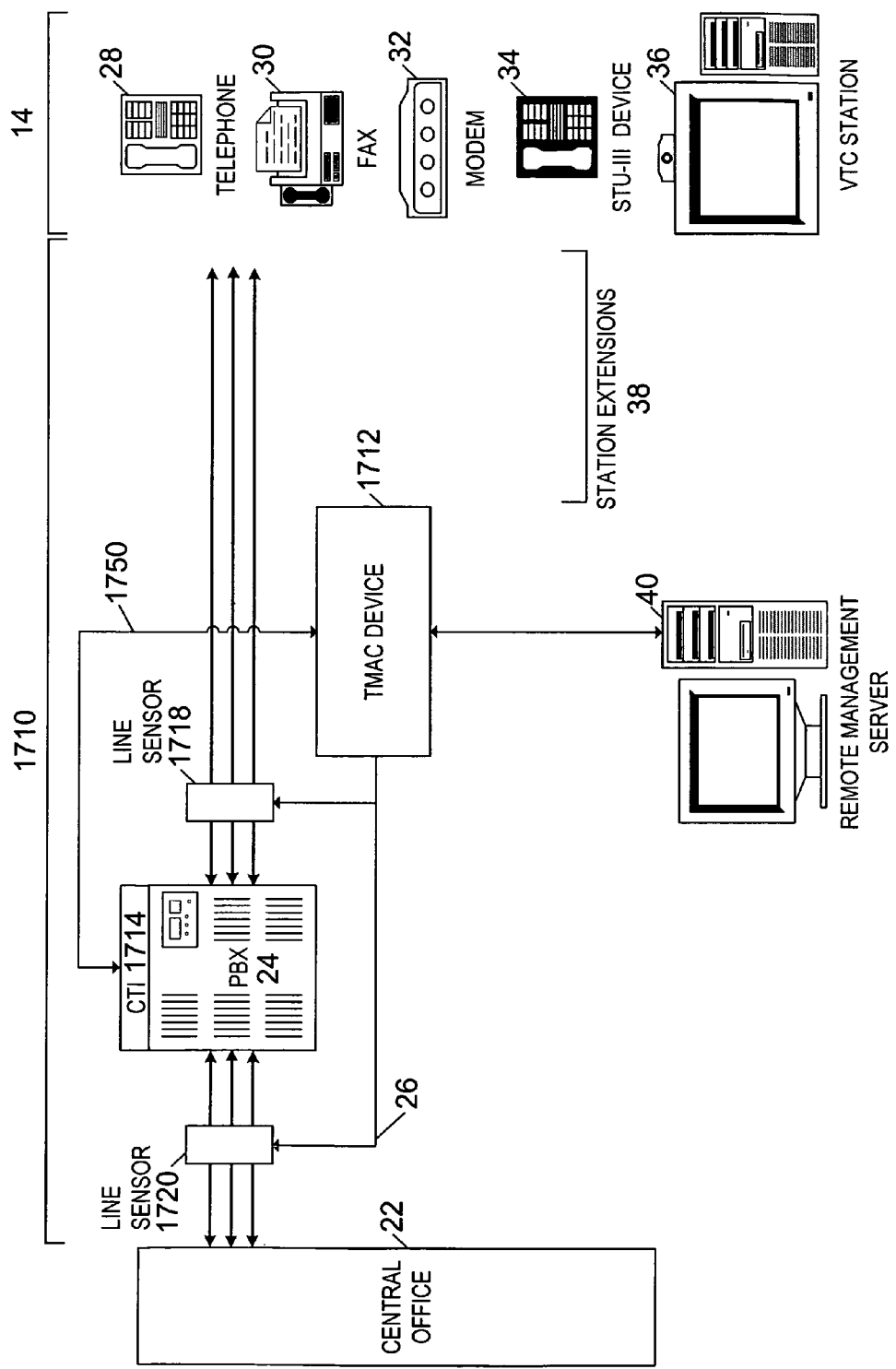
FIG. 17 is a schematic block diagram illustrating use of computer telephony integration to complement the system of FIG. 1.

Telephony Monitoring and Access Control Complemented with Computer Telephony Integration Interface In FIG. 17, the reference numeral 1710 represents an alternate embodiment of the system 10 shown and described in FIG. 1, whereby the system 10 is complemented with computer telephony integration (CTI) interfaces to specific PBXs 24. Accordingly, all previously described operations and functions of the system 10 are hereby inserted by reference into the system 1710.

The system 1710 consists primarily of the TMAC device 1712 connected in-line between the end-user stations 14 of an enterprise and the stations' connections into the PSTN at line sensors 1718 and/or 1720 as described in FIG. 1. Ethernet cabling and a serial port connection (or special connection) 1750 connects the TMAC device 1712 to a CTI interface 1714, which is connected to or located within the PBX 24. Multiple configurations are contemplated, including those wherein: the functions of the TMAC device 1712 may be inserted into the system 1710 (i.e., collocated) at the line sensor(s) 1718 and 1720 (FIG. 20); the functions of the remote management server 40 may be inserted into the system 10 at the TMAC device 1712 (not shown); and the functions of the TMAC device 1712 and the remote management server 40 may be inserted into the system 1710 at the line sensors(s) 1718 and 1720 (not shown).

In this embodiment, the PBX 24 provides call attribute information to the TMAC device 1712 via the CTI interface 1714, for the process of detecting and analyzing call activity discussed previously with reference to step 418 in FIG. 4B, FIGS. 10A, and 10B. Call attributes provided by the PBX 24 to the TMAC device 1712 are limited only by user configuration and the PBX 24 capabilities, and may include, for example: station extension, trunk, channel, inbound call number, outbound call number, call-type, call date, call time, call duration. It is understood that the call attributes described herein as provided by the PBX 24 are expanded upon in accordance with PBX 24 capabilities. Different combinations of TMAC device 1712-provided and PBX 24-provided attributes are contemplated, such that all or only selected attributes are provided by the PBX 24.

Additionally, in this embodiment, the TMAC device 1712 issues commands to the PBX 24 via the CTI interface 1714, and thereby tasks the PBX 24 to perform actions and tracking functions associated with the call, pursuant to the security policy 202, during the process of security policy enforcement discussed previously with reference to steps 420-428 in FIG. 4B, FIGS. 10C, and 10D. Action, threat assessment, and tracking function commands sent to the PBX 24 are limited only by user configuration and the PBX 24 capabilities, and may include, for example: allow the call, deny (terminate) the call, redirect the call, record the call, monitor call content, perform authentication for remote access, conduct the call in encrypted mode within a VPSTN, generate email, pager, console messaging and SNMP notifications, and log the event. It is understood that the actions, threat assessments, and tracking functions described herein as performed by the PBX 24 are expanded upon in accordance with PBX 24 capabilities. Different combinations of TMAC device 1712-performed actions and PBX 24-performed actions are contemplated, such that all or only selected actions, assessments, and track functions are performed by the PBX 24. It is further understood by those skilled in the art that configurations discussed with respect to FIG. 17 are not applicable to the line sensor 1716 (on direct connect lines), since calls on direct connect lines do not pass through the PBX 24.

Telephony Monitoring System Complemented with Computer Telephony Integration Interface As previously mentioned, the security needs of one enterprise may vary considerably from that of another. Therefore, multiple embodiments are contemplated wherein any of the operations and features described within this document, and their associated hardware and software components, may be implemented without a corresponding use of other operations, features and components. For example, not all enterprises require the access control capabilities of the previously described systems 10 and 1710. On the contrary, depending upon the enterprise's security needs, a simplified alternate embodiment, a telephony monitoring system 1810 shown in FIG. 18, may be deployed, which monitors inbound and outbound voice, fax and modem calls for policy enforcement and content monitoring. The system 1810 causes the call to be terminated, generates alert notifications, and logs call events, pursuant to a security policy. Accordingly, all previously described operations and functions of the system 10 necessary to implement the capabilities described below are hereby inserted by reference into the system 1810.

In this embodiment, a telephony monitoring device 1812 is interconnected between the end-user stations 14 and their circuits into the PSTN, providing a facility chokepoint at a sensor point(s) 1818 (station-side of the PBX 24), and/or 1820 (trunk-side of the PBX 24). Cabling 26 connects the telephony monitoring device 1812 to the sensor point(s) 1818, and/or 1820. Ethernet cabling and a serial port connection (or special connection) 1850 connects the telephony monitoring device 1812 to a CTI interface 1814, which is connected to or located within the PBX 24. Multiple configurations are contemplated, including those wherein: the functions of the telephony monitoring device 1812 may be inserted into the system 1810 (i.e., collocated) at the sensor point(s) 1818 and 1820; the functions of the remote management server 1840 may be inserted into the system 1810 at the telephony monitoring device 1812; and the functions of the telephony monitoring device 1812 and the remote management server 1840 may be inserted into the system 1810 at the sensor points(s) 1818 and 1820, (not shown).

When an inbound or outbound voice, fax, or modem call occurs, the telephony monitoring device 1812 collects signaling and call information via the sensor point(s) and/or from the PBX 24 via the CTI device 1814. Pursuant to a security policy 18202, the telephony monitoring device 1812 records and archives call content to be demodulated, decoded, and analyzed for detection and identification of keywords either at the time of the call for enforcement of the security policy 18202 rules or at a future time for forensic purposes.

The system 1810 is passive in that it does not act upon the call directly if the security policy 18202 designates that a call is to be terminated. Rather, commands are sent to the PBX 24 via the CTI device 1814, and the PBX 24 denies (terminates) the call. The system 1810 generates email, pager, console messaging and SNMP notifications, and logs the call pursuant to the security policy 18202.

In this embodiment, the PBX 24 provides call attribute information to the telephony monitoring device 1812 via the CTI interface 1814, for the process of detecting and analyzing call activity. Call attributes provided by the PBX 24 to the telephony monitoring device 1812 are limited only by user configuration and the PBX 24 capabilities, and may include, for example: station extension, trunk, channel, inbound call number, outbound call number, call-type, call date, call time, call duration. It is understood that the call attributes described herein as provided by the PBX 24 are expanded upon in accordance with PBX 24 capabilities. Different combinations of telephony monitoring device 1812-provided and PBX 24-provided attributes are contemplated, such that all or only selected attributes are provided by the PBX 24.

The system administrator may interact with the telephony monitoring device 1812 either at the device 1812 or via a remote management server 40. The remote management server 40 receives call information from the device 1812 and generates alerts, logs, and reports, pursuant to the security policy 18202. The remote management server 40 receives recorded voice and data call content from the device 1812 and provides audio play-back of recorded voice call content, viewing and printing of reconstructed data call content, and consolidation, management, viewing, and printing of reports and call logs. Archiving of recorded call content, reports, and call logs may be accomplished on the remote management server 40, a remote log server 42, or another network-accessible server, pursuant to the security policy 18202.

Figure 18:
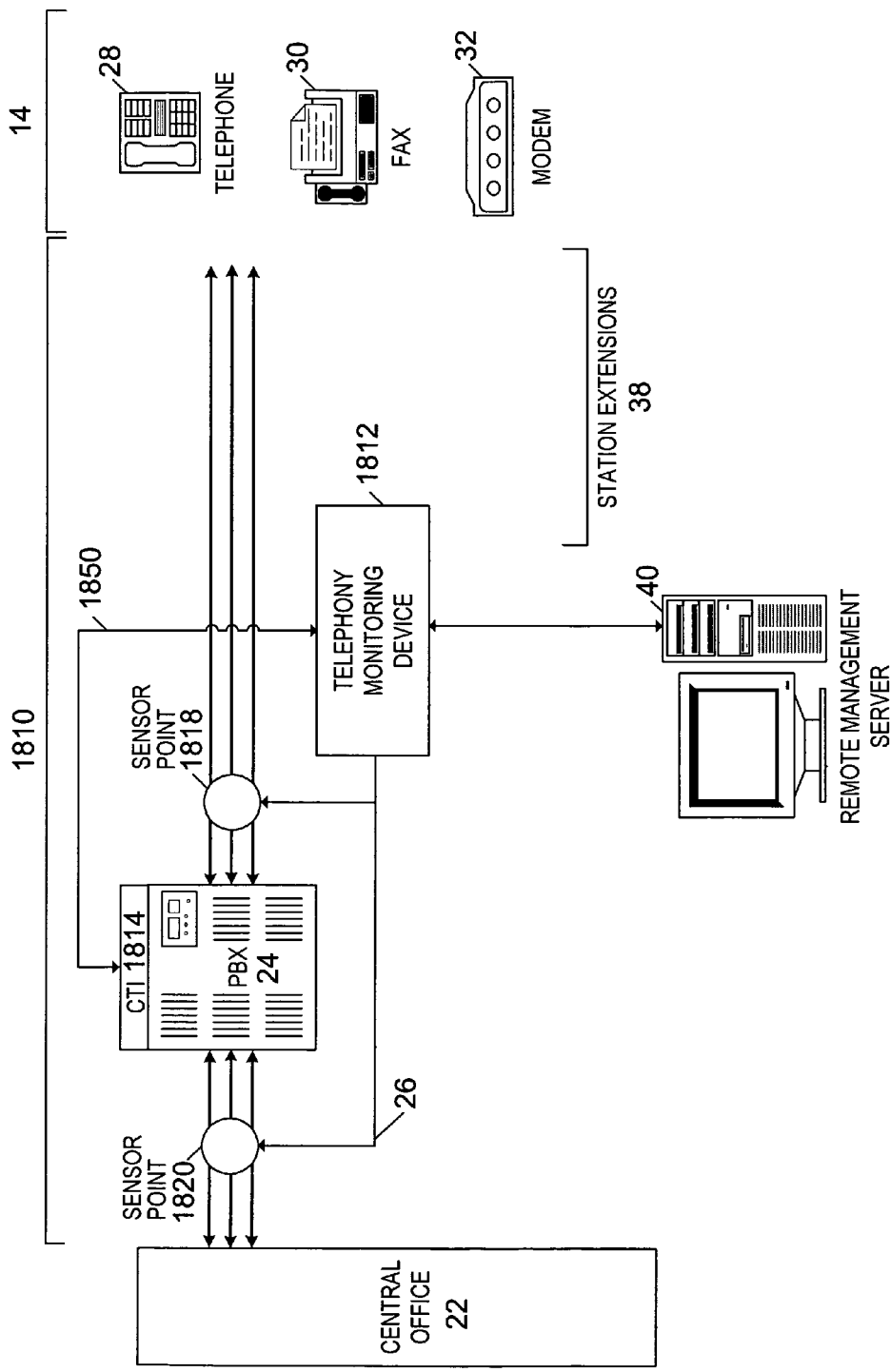
FIG. 18 is a schematic block diagram illustrating an alternate embodiment of the system of FIG. 17.

Additionally, in this embodiment, the telephony monitoring device 1812 issues commands to the PBX 24 via the CTI interface 1814, and thereby tasks the PBX 24 to perform actions and tracking functions associated with the call, during the process of security policy enforcement, pursuant to the security policy 18202. Action and tracking function commands to the PBX include denying the call, are limited only by user configuration and the PBX 24 capabilities, and may include, for example: redirect the call, record the call, generate email, pager, console messaging, and SNMP notifications, and log the event. It is understood that the actions and tracking functions described herein as performed by the PBX 24 are expanded upon in accordance with PBX 24 capabilities. Different combinations of telephony monitoring device 1812-performed actions and PBX 24-performed actions are contemplated, such that all or only selected actions and track functions are performed by the PBX 24. It is further understood by those skilled in the art that configurations discussed with respect to FIG. 18 are not applicable to the line sensor 1816 (on direct connect lines), since calls on direct connect lines do not pass through the PBX 24.

In FIG. 19, the reference numeral 1910 represents a preferred embodiment of the system 10, shown and described in FIG. 1, wherein all functions of the TMAC device 12 are inserted into the system 1910 (i.e., collocated) with a line sensor(s) 1916 (at direct connect lines), 1918 (station-side of the PBX 24), and/or 1920 (trunk-side of the PBX 24). Accordingly, all previously described operations and functions of the system 10 are hereby inserted by reference into the system 1910. Multiple configurations are contemplated, including those wherein the functions of the remote management server 40 may be inserted into the system 1910 at the line sensors(s) 1916, 1918 and 1920.

Figure 20:
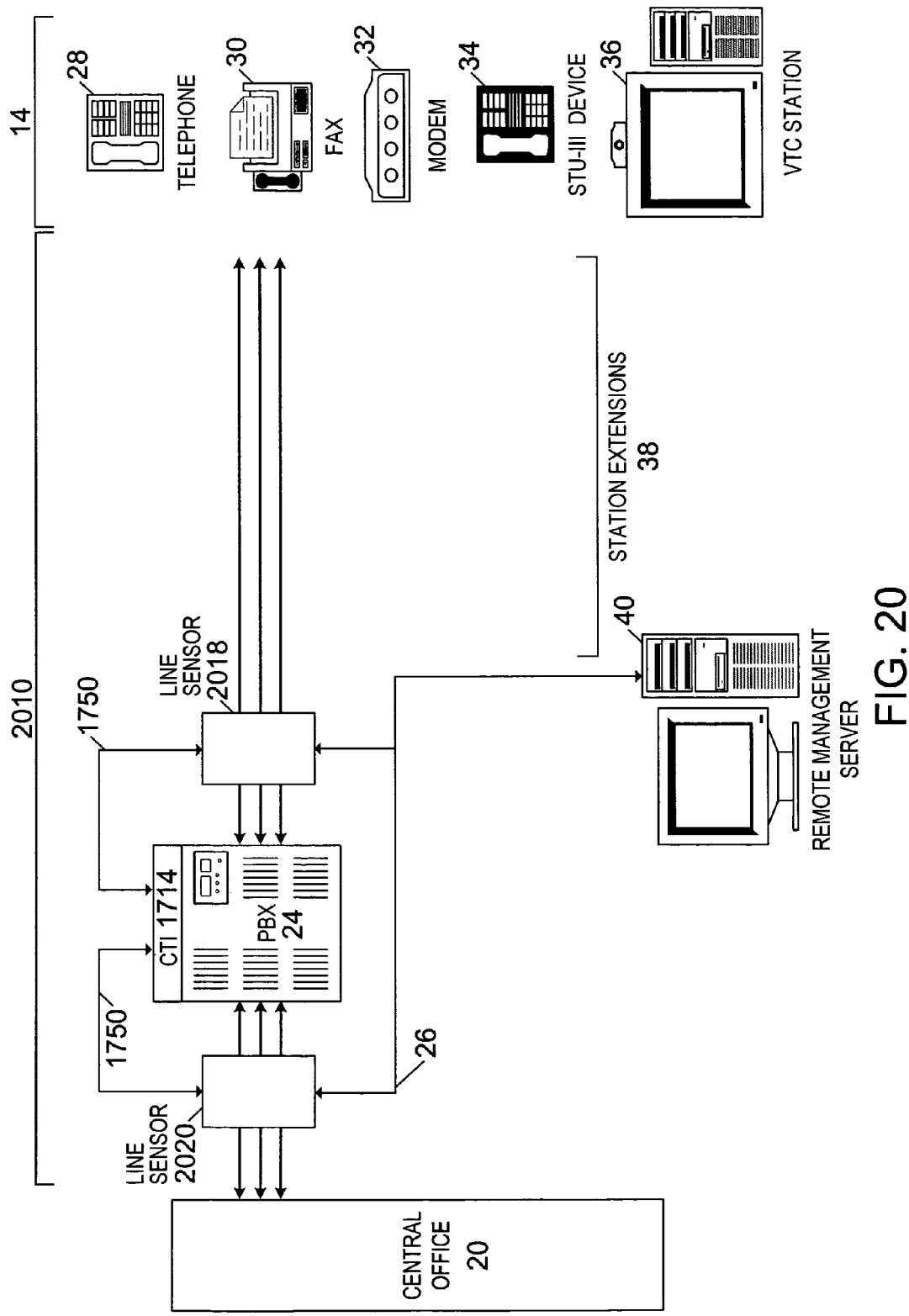
FIG. 20 is a schematic block diagram illustrating use of computer telephony integration to complement the system of FIG. 19.

In FIG. 20, the reference numeral 2010 represents an alternate embodiment of the system 10, shown and described in FIG. 1, wherein all functions of the TMAC device 12 are inserted into the system 2010 (i.e., collocated) with a line sensor(s) 2018 (station-side of the PBX 24), and/or 2020 (trunk-side of the PBX 24), and is complemented with CTI interface 1714 to specific PBXs 24, as described previously at system 1710 in FIG. 17. Accordingly, all previously described operations and functions of the system 10 and the system 1710 are hereby inserted by reference into the system 2010. Multiple configurations are contemplated, including those wherein the functions of the remote management server 40 may be inserted into the system 2010 at the line sensors(s) 2018, and 2020. It is understood by those skilled in the art that configurations discussed with respect to FIG. 20 are not applicable to the line sensor 2016 (on direct connect lines), since calls on direct connect lines do not pass through the PBX 24.

It is understood that the present invention can take many forms and embodiments. The embodiments shown herein are intended to illustrate rather than to limit the invention, it being appreciated that variations may be made without departing from the spirit of the scope of the invention. For example, any number of different rule criteria for the security policy may be defined. Different attribute descriptions and rule descriptions are contemplated. The algorithms and process functions performed by the system may be organized into any number of different modules or computer programs for operation on one or more processors or workstations within the system. Different configurations of computers and processors for the system are contemplated. The programs used to implement the methods and processes of the system may be implemented in any appropriate programming language and run in cooperation with any hardware device. The system may be used for enterprises as small as a private home or business with just a few phone lines as well as for large enterprises with multiple PBX locations around the world, interconnected in one or more private networks or virtual private networks. In the case where multiple extensions are involved, it is understood that the extensions may be PBX extensions or direct line extensions.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A telephony security system located within an enterprise, at one or more of said enterprise's locations, for monitoring and/or controlling calls, wherein said calls is understood to refer to an inbound call, an outbound call, or any combination thereof, between end-user stations within said enterprise and said end-user stations' respective circuits into a Public Switched Telephone Network (PSTN), said system comprising:

one or more rules controlled by a system administrator, said one or more rules designating one or more actions, said one or more actions to include allowing or denying a call, said one or more actions to be performed based upon at least one attribute of said call;

one or more line sensors, said one or more line sensors including:
  determining said at least one attribute of said call, and
  performing said one or more actions based upon said at least one attribute of said call;
said one or more line sensors being constructed and arranged to not interrupt said call unless designated to do so in said one or more rules; and
wherein said one or more rules designating said one or more actions comprises at least one of:
a. redirecting said call,
b. logging said call,
c. recording said call,
d. encrypting said call,
e. generating a report,
f. providing an alert,
g. removing a number, wherein said number is understood to refer to a source number of said call, a destination number of said call, an alias or identifier associated with said call, or any combination thereof, from a current group associated with said number and placing said number into a different group not previously associated with said number,
h. monitoring said call, a plurality of said call, or any combination thereof, for one or more patterns of interest,
i. monitoring said call for one or more data of interest,
j. authenticating said call for remote access, and
k. monitoring said call for one or more sequences of digital data.

2. The system of claim 1 wherein said determination of said at least one attribute of said call includes determining one or more attributes selected from the group consisting of:
  direction of said call,
  source number of said call,
  destination number of said call,
  type of said call,
  PBX trunk group through which said call is processed,
  channel through which said call is processed,
  date said call starts,
  time said call starts,
  digits dialed before said call connects,
  digits dialed prior to a base phone number,
  digits dialed after said base phone number,
  caller ID identifier,
  time said call connects,
  sequences of digital data,
  protocol and/or characteristics of said protocol used for said call,
  host-based software used for said call,
  digits dialed after said call connects,
  date said call ends, and
  time said call ends.

3. The system of claim 1 wherein said determination of said at least one attribute of said call includes determining at least one type of said call selected from the group consisting of:
  voice,
  fax,
  modem,
  STU-III,
  wideband,
  wideband video,
  busy,
  unanswered, and
  undetermined.

4. The system of claim 1 wherein said one or more actions includes generating at least one report selected from the group consisting of:
  post-event report,
  schedule-generated report,
  ad hoc report,
  batch analysis report,
  trend report, and
  difference/comparison report.

5. The system of claim 1 wherein said one or more actions includes providing at least one alert selected from the group consisting of:
  electronic mail notification,
  pager notification,
  console messaging, and
  network management protocol trap notification.

6. The system of claim 1 wherein said determination of said at least one attribute of said call includes one or more processes selected from the group consisting of:
  monitoring call progress,
  decoding caller identification,
  decoding automatic number identification,
  reception of digital line protocol,
  decoding,
  demodulation,
  detection of pulse dial,
  detection of tone,
  matching patterns,
  recognition of spoken words,
  recognition of words spoken in foreign languages,
  voice decompression,
  detection of voice compression,
  detection of encryption,
  decryption,
  translation of call addresses, and
  detection of voice activity.

7. The system of claim 1 wherein said one or more line sensors are constructed and arranged so as to monitor and/or control said calls into and/or out of said enterprise on a per-call basis.

8. The system of claim 1 wherein said one or more actions includes redirecting said call and/or a copy of said call to an apparatus selected from the group consisting of:
  listening station,
  honeypot,
  network intrusion detection system,
  recorder,
  said end-user station different from a caller's intended destination of said call,
  encrypter/decrypter,
  data of interest detector,
  pattern of interest detector,
  remote access authenticator, and
  digital data sequence detector.

9. A method of monitoring and/or controlling call access between an enterprise's end-user stations and said end-user stations' respective circuits into a Public Switched Telephone Network (PSTN), said method comprising the steps of:
  using a system administrator for defining one or more rules, said one or more rules designating one or more actions, said one or more actions including at least allowing or denying said call access, said one or more actions to be performed based upon at least one attribute of a call, wherein said call is understood to refer to an inbound call, an outbound call, or any combination thereof;

determining said at least one attribute of said call;
performing said one or more actions based upon said at least one attribute of said call, wherein said call is not interrupted unless said one or more actions designate to interrupt said call; and
wherein said one or more rules designating said one or more actions comprises at least one of:
  a. redirecting said call,
  b. logging said call,
  c. recording said call,
  d. encrypting said call,
  e. generating a report,
  f. providing an alert,
  g. removing a number, wherein said number is understood to refer to a source number of said call, a destination number of said call, an alias or identifier associated with said call, or any combination thereof, from a current group associated with said number and placing said number into a different group not previously associated with said number,
  h. monitoring said call, a plurality of said call, or any combination thereof, for one or more patterns of interest,
  i. monitoring said call for one or more data of interest,
  j. authenticating said call for remote access, and
  k. monitoring said call for one or more sequences of digital data.

10. The method of claim 9 wherein said determination of said at least one attribute of said call includes determining one or more attributes selected from the group consisting of:
  direction of said call,
  source number of said call,
  destination number of said call,
  type of said call,
  PBX trunk group through which said call is processed,
  channel through which said call is processed,
  date said call starts,
  time said call starts,
  digits dialed before said call connects,
  digits dialed prior to a base phone number,
  digits dialed after said base phone number,
  caller ID identifier,
  time said call connects,
  sequences of digital data,
  protocol and/or characteristics of said protocol used for said call,
  host-based software used for said call,
  digits dialed after said call connects,
  date said call ends, and
  time said call ends.

11. The method of claim 9 wherein said determination of said at least one attribute of said call includes determining at least one type of said call selected from the group consisting of:
  voice,
  fax,
  modem,
  STU-III,
  wideband,
  wideband video,
  busy,
  unanswered, and
  undetermined.

12. The method of claim 9 wherein said definition of said one or more rules further includes said designation of one or more actions to be performed based on at least one determined result of said one or more actions previously performed in association with said call, said one or more actions to be performed based on at least one determined result includes one or more actions selected from the group consisting of:
  allowing said call,
  denying said call,
  redirecting said call,
  logging said call,
  recording said call,
  encrypting said call,
  generating a report,
  providing an alert,
  removing a number, wherein said number is understood to refer to a source number of said call, a destination number of said call, an alias or identifier associated with said call, or any combination thereof, from a current group associated with said number and placing said number into a different group not previously associated with said number,
  monitoring said call, a plurality of said call, or any combination thereof, for one or more patterns of interest,
  monitoring said call for one or more data of interest,
  authenticating said call for remote access, and
  monitoring said call for one or more sequences of digital data.

13. The method of claim 9 wherein a management server, one or more peripheral devices, or any combination thereof, performs one or more actions selected from the group consisting of:
  logging said call,
  recording said call,
  generating a report,
  providing an alert,
  removing a number, wherein said number is understood to refer to a source number of said call, a destination number of said call, an alias or identifier associated with said call, or any combination thereof, from a current group associated with said number and placing said number into a different group not previously associated with said number,
  monitoring said call, a plurality of said call, or any combination thereof, for one or more patterns of interest,
  monitoring said call for one or more data of interest, and
  monitoring said call for one or more sequences of digital data.

14. The method of claim 9 wherein said performance of said one or more actions may be preempted and/or complemented by said system administrator with one or more actions selected from the group consisting of:
  allowing said call,
  denying said call,
  redirecting said call,
  logging said call,
  recording said call,
  encrypting said call,
  generating a report,
  providing an alert,
  removing a number, wherein said number is understood to refer to a source number of said call, a destination number of said call, an alias or identifier associated with said call, or any combination thereof, from a current group associated with said number and placing said number into a different group not previously associated with said number,
  monitoring said call, a plurality of said call, or any combination thereof, for one or more patterns of interest,
  monitoring said call for one or more data of interest, authenticating said call for remote access, and
monitoring said call for one or more sequences of digital data.

15. The method of claim 9 wherein said one or more actions includes generation of at least one report selected from the group consisting of:
post-event report,
schedule-generated report,
ad hoc report,
batch analysis report,
trend report, and
difference/comparison report.

16. The method of claim 9 wherein said one or more actions includes provision of at least one alert selected from the group consisting of:
electronic mail notification,
pager notification,
console messaging, and
network management protocol trap notification.

17. The method of claim 9 wherein said determination of said at least one attribute of said call includes one or more processes selected from the group consisting of:
monitoring call progress,
decoding caller identification,
decoding automatic number identification,
reception of digital line protocol,
decoding,
demodulation,
detection of pulse dial,
detection of tone,
matching patterns,
recognition of spoken words,
recognition of words spoken in foreign languages,
voice decompression,
detection of voice compression,
detection of encryption,
decryption,
translation of call addresses, and
detection of voice activity.

18. The method of claim 9 wherein said determination of said at least one attribute of said call and said performance of said one or more actions is executed on a per-call basis.

19. The method of claim 9 wherein said one or more actions includes redirecting said call and/or a copy of said call to an apparatus selected from the group consisting of:
listening station,
honeypot,
network intrusion detection system,
recorder,
said end-user station different from a caller's intended destination of said call,
encrypter/decrypter,
data of interest detector,
pattern of interest detector,
remote access authenticator, and
digital data sequence detector.

20. A system for monitoring and/or controlling call access between an enterprise's end-user stations and said end-user stations' respective circuits into a Public Switched Telephone Network (PSTN), said system comprising:
means for defining one or more rules, said one or more rules designating one or more actions to include allowing or denying said call access, said one or more actions to be performed based upon at least one attribute of a call, wherein said call is understood to refer to an inbound call, an outbound call, or any combination thereof;
means for determining said at least one attribute of said call;
means for performing said one or more actions based upon said at least one attribute of said call, wherein said means for performing said one or more actions does not interrupt said call unless designated to do so in said one or more rules; and
wherein said one or more rules designating said one or more actions comprises at least one of:
a. redirecting said call,
b. logging said call,
c. recording said call,
d. encrypting said call,
e. generating a report,
f. providing an alert,
g. removing a number, wherein said number is understood to refer to a source number of said call, a destination number of said call, an alias or identifier associated with said call, or any combination thereof, from a current group associated with said number and placing said number into a different group not previously associated with said number,
h. monitoring said call, a plurality of said call, or any combination thereof, for one or more patterns of interest,
i. monitoring said call for one or more data of interest,
j. authenticating said call for remote access, and
k. monitoring said call for one or more sequences of digital data.

21. The system of claim 20 wherein said means for determining said at least one attribute of said call includes determining one or more attributes selected from the group consisting of:
direction of said call,
source number of said call,
destination number of said call,
type of said call,
PBX trunk group through which said call is processed,
channel through which said call is processed,
date said call starts,
time said call starts,
digits dialed before said call connects,
digits dialed prior to a base phone number,
digits dialed after said base phone number,
caller ID identifier,
time said call connects,
sequences of digital data,
protocol and/or characteristics of said protocol used for said call,
host-based software used for said call,
digits dialed after said call connects,
date said call ends, and
time said call ends.

22. The system of claim 20 wherein said means for determining said at least one attribute of said call includes determining at least one type of said call selected from the group consisting of:
voice,
fax,
modem,
STU-III,
wideband,
wideband video,
busy,
unanswered, and
undetermined.

23. The system of claim 20 wherein said means for defining said one or more rules further includes designating one or more actions to be performed based on at least one determined result of said one or more actions previously performed in association with said call, said one or more actions to be performed based on at least one determined result includes one or more actions selected from the group consisting of:
- allowing said call,
- denying said call,
- redirecting said call,
- logging said call,
- recording said call,
- encrypting said call,
- generating a report,
- providing an alert,
- removing a number, wherein said number is understood to refer to a source number of said call, a destination number of said call, an alias or identifier associated with said call, or any combination thereof, from a current group associated with said number and placing said number into a different group not previously associated with said number,
- monitoring said call, a plurality of said call, or any combination thereof, for one or more patterns of interest,
- monitoring said call for one or more data of interest,
- authenticating said call for remote access, and
- monitoring said call for one or more sequences of digital data.

24. The system of claim 20 wherein a management server, one or more peripheral devices, or any combination thereof, performs one or more actions selected from the group consisting of:
- logging said call,
- recording said call,
- generating a report,
- providing an alert,
- removing a number, wherein said number is understood to refer to a source number of said call, a destination number of said call, an alias or identifier associated with said call, or any combination thereof, from a current group associated with said number and placing said number into a different group not previously associated with said number,
- monitoring said call, a plurality of said call, or any combination thereof, for one or more patterns of interest,
- monitoring said call for one or more data of interest, and
- monitoring said call for one or more sequences of digital data.

25. The system of claim 20 further including means for preempting and/or complementing performance of said one or more actions with one or more actions selected from the group consisting of:
- allowing said call,
- denying said call,
- redirecting said call,
- logging said call,
- recording said call,
- encrypting said call,
- generating a report,
- providing an alert,
- removing a number, wherein said number is understood to refer to a source number of said call, a destination number of said call, an alias or identifier associated with said call, or any combination thereof, from a current group associated with said number and placing said number into a different group not previously associated with said number,
- monitoring said call, a plurality of said call, or any combination thereof, for one or more patterns of interest,
- monitoring said call for one or more data of interest,
- authenticating said call for remote access, and
- monitoring said call for one or more sequences of digital data.

26. The system of claim 20 wherein said one or more actions includes generating at least one report selected from the group consisting of:
- post-event report,
- schedule-generated report,
- ad hoc report,
- batch analysis report,
- trend report, and
- difference/comparison report.

27. The system of claim 20 wherein said one or more actions includes providing at least one alert selected from the group consisting of:
- electronic mail notification,
- pager notification,
- console messaging, and
- network management protocol trap notification.

28. The system of claim 20 wherein said means for determining said at least one attribute of said call includes means for one or more processes selected from the group consisting of:
- monitoring call progress,
- decoding caller identification,
- decoding automatic number identification,
- reception of digital line protocol,
- decoding,
- demodulation,
- detection of pulse dial,
- detection of tone,
- matching patterns,
- recognition of spoken words,
- recognition of words spoken in foreign languages,
- voice decompression,
- detection of voice compression,
- detection of encryption,
- decryption,
- translation of call addresses, and
- detection of voice activity.

29. The system of claim 20 wherein said means for determining said at least one attribute of said call and said means for performing said one or more actions is constructed and arranged so as to monitor and/or control said call access into and/or out of said enterprise on a per-call basis.

30. The system of claim 20 wherein said one or more actions includes redirecting said call and/or a copy of said call to an apparatus selected from the group consisting of:
- listening station,
- honeypot,
- network intrusion detection system,
- recorder,
- said end-user station different from a caller's intended destination of said call,
- encrypter/decrypter,
- data of interest detector,
- pattern of interest detector,
- remote access authenticator, and
- digital data sequence detector.

* * * * *